US010776991B2

(12) United States Patent
Terahata

(10) Patent No.: US 10,776,991 B2
(45) Date of Patent: *Sep. 15, 2020

(54) METHOD OF PROVIDING VIRTUAL SPACE, METHOD OF PROVIDING VIRTUAL EXPERIENCE, SYSTEM AND MEDIUM FOR IMPLEMENTING THE METHODS

(71) Applicant: COLOPL, Inc., Tokyo (JP)

(72) Inventor: Shuhei Terahata, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,012

(22) Filed: Dec. 17, 2018

(65) Prior Publication Data

US 2019/0122420 A1 Apr. 25, 2019

Related U.S. Application Data

(63) Continuation of application No. 15/654,652, filed on Jul. 19, 2017, now Pat. No. 10,198,855.

(30) Foreign Application Priority Data

Jul. 20, 2016 (JP) .................................. 2016-142759
Jul. 20, 2016 (JP) .................................. 2016-142761
Jul. 20, 2016 (JP) .................................. 2016-142762

(51) Int. Cl.
*G06T 15/20* (2011.01)
*G02B 27/01* (2006.01)
(Continued)

(52) U.S. Cl.
CPC .......... *G06T 15/20* (2013.01); *G02B 27/0093* (2013.01); *G02B 27/017* (2013.01);
(Continued)

(58) Field of Classification Search
CPC ........ G06T 7/13; G06T 19/006; G02B 27/017
See application file for complete search history.

(56) References Cited

U.S. PATENT DOCUMENTS

2006/0200314 A1 9/2006 Ajioka et al.
2009/0066725 A1* 3/2009 Nogami .................. A63F 13/10
345/632
(Continued)

FOREIGN PATENT DOCUMENTS

JP 2006-244046 A 9/2006
JP 2007-209483 A 8/2007
(Continued)

OTHER PUBLICATIONS

Office Action in CN Application No. 201780038446.5 dated Sep. 6, 2019. 17pp.
(Continued)

*Primary Examiner* — Samantha (Yuehan) Wang
(74) *Attorney, Agent, or Firm* — Hauptman Ham, LLP

(57) ABSTRACT

A method of providing a virtual experience to a user includes identifying a plurality of virtual objects. The method further includes detecting a position of a part of the user's body other than the user's head. The method further includes detecting a reference line of sight of the user. The method further includes setting an extension direction for a first virtual object of the plurality of virtual objects based on a direction of the reference line of sight. The method further includes setting a region for a first virtual object of the plurality of virtual objects, wherein the region comprises a part extending in the extension direction. The method further includes determining whether the first virtual object and a virtual representation of the part of the body have touched based on a positional relationship between the region and a position of the virtual representation of the part of the body.

6 Claims, 28 Drawing Sheets

(51) Int. Cl.
  *G02B 27/00* (2006.01)
  *G06T 7/70* (2017.01)
  *G06F 3/01* (2006.01)
  *G06F 3/0346* (2013.01)
  *G06T 19/20* (2011.01)
  *H04N 13/344* (2018.01)
  *G06T 7/12* (2017.01)
  *G06T 7/13* (2017.01)

(52) U.S. Cl.
  CPC .............. *G06F 3/011* (2013.01); *G06F 3/013* (2013.01); *G06F 3/0346* (2013.01); *G06T 7/70* (2017.01); *G06T 19/20* (2013.01); *G02B 2027/014* (2013.01); *G02B 2027/0138* (2013.01); *G06T 7/12* (2017.01); *G06T 7/13* (2017.01); *G06T 2219/2016* (2013.01); *H04N 13/344* (2018.05)

(56) References Cited

U.S. PATENT DOCUMENTS

| | | | |
|---|---|---|---|
| 2009/0247251 A1 | 10/2009 | Ito et al. | |
| 2012/0056992 A1* | 3/2012 | Kuroda | G06T 19/006 348/46 |
| 2013/0335302 A1* | 12/2013 | Crane | H04N 5/2354 345/8 |
| 2014/0306886 A1 | 10/2014 | Hanawa et al. | |
| 2015/0352437 A1* | 12/2015 | Koseki | A63F 13/25 463/31 |
| 2016/0267720 A1 | 9/2016 | Mandella et al. | |
| 2018/0025531 A1* | 1/2018 | Terahata | G02B 27/017 345/421 |

FOREIGN PATENT DOCUMENTS

| | | |
|---|---|---|
| JP | 2009-69918 A | 4/2009 |
| JP | 2009-233217 A | 10/2009 |
| JP | 2011-210019 A | 10/2011 |
| JP | 2012-58968 A | 3/2012 |
| JP | 2015-232783 A | 12/2015 |
| JP | 2016-126687 A | 7/2016 |

OTHER PUBLICATIONS

Office Action in JP Application No. 2016-142759, dated Feb. 14, 2017, 6 pp.
Notice of Allowance in JP Application No. 2016-142759, dated Jul. 4, 2017, 6 pp.
Office Action in JP Application No. 2016-142761, dated Mar. 14, 2017, 4 pp.
Office Action in JP Application No. 2016-142761, dated Jan. 10, 2017, 6 pp.
Notice of Allowance in JP Application No. 2016-142761, dated Jul. 4, 2017.
Office Action in JP Application No. 2016-142762, dated Feb. 21, 2017, 6 pp.
Notice of Allowance in JP Application No. 2016-142762, dated Jul. 4, 2017, 6 pp.
Toybox Demo for Oculus Touch—Inside Look [online], Published Oct. 13, 2015, [Searched Jul. 19, 2017], Internet, <URL: https://www.youtube.com/watch?v=dbYP4bhKr2M>, 4 pp.
Office Action in CN Application No. 201780038446.5, dated Jan. 21, 2020. 16pp.
Office Action in CN Application No. 201780038446.5, dated Jun. 4, 2020. 18pp.

* cited by examiner

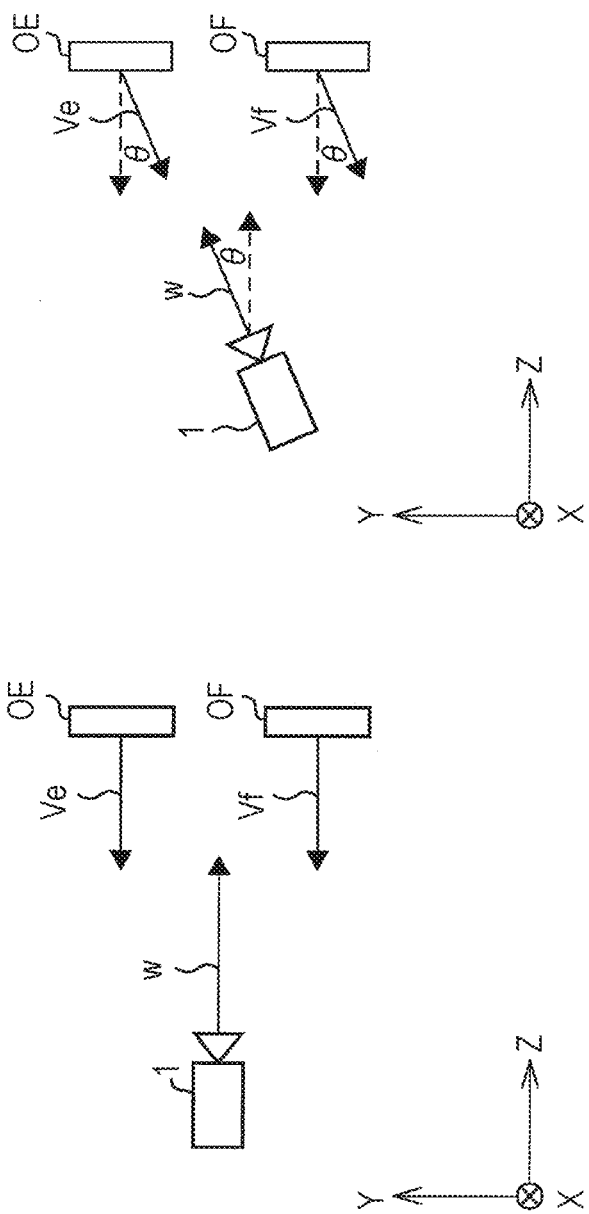

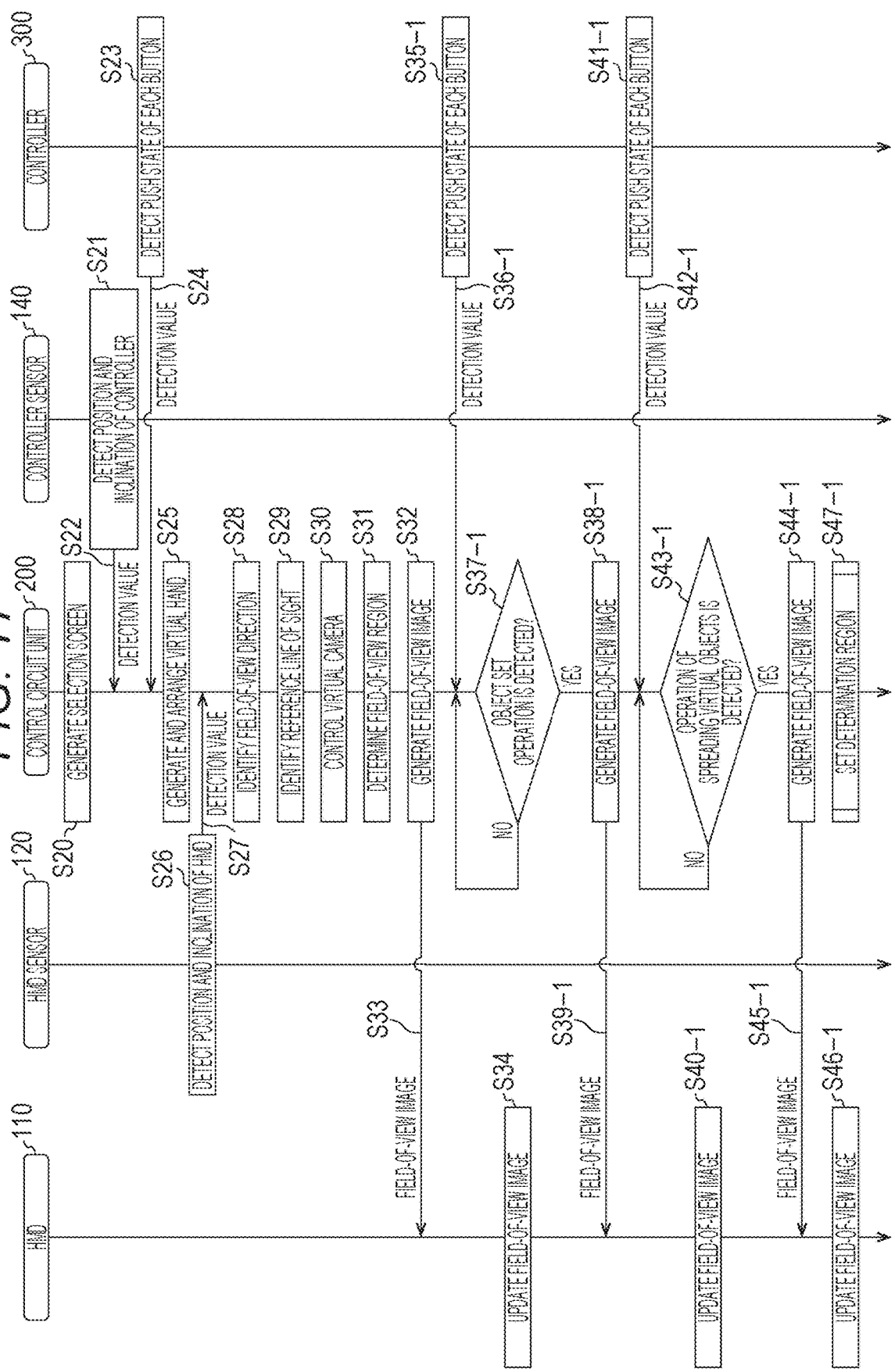

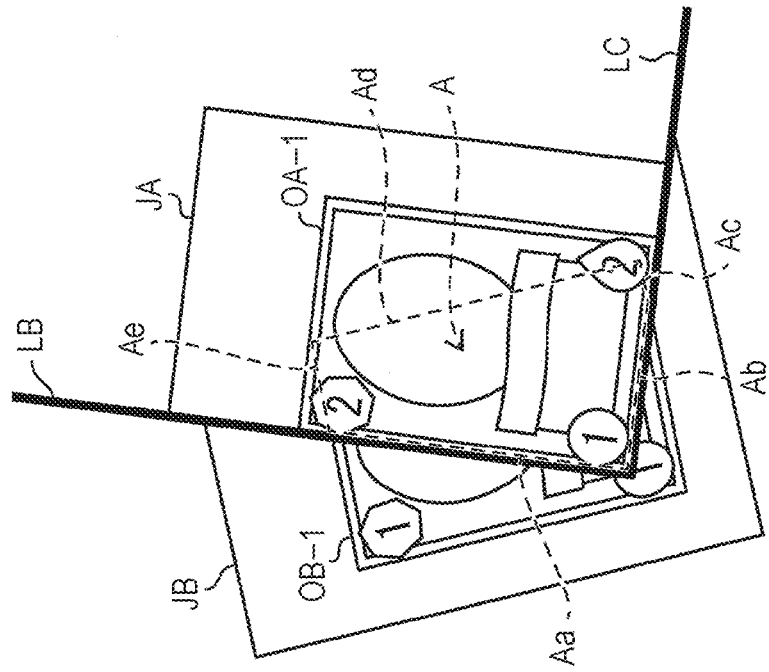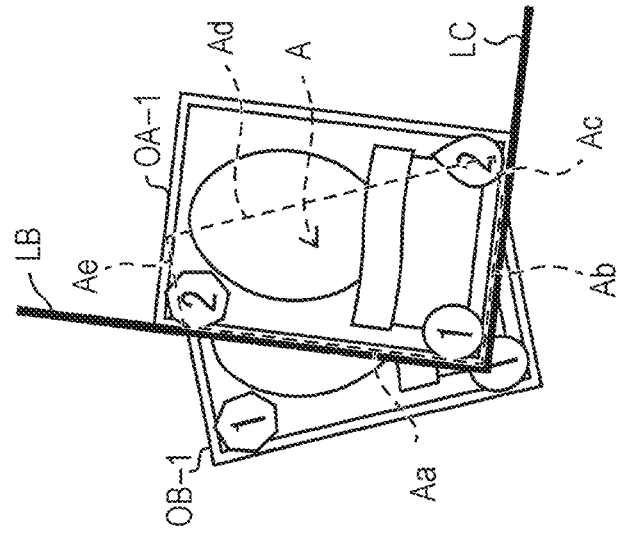

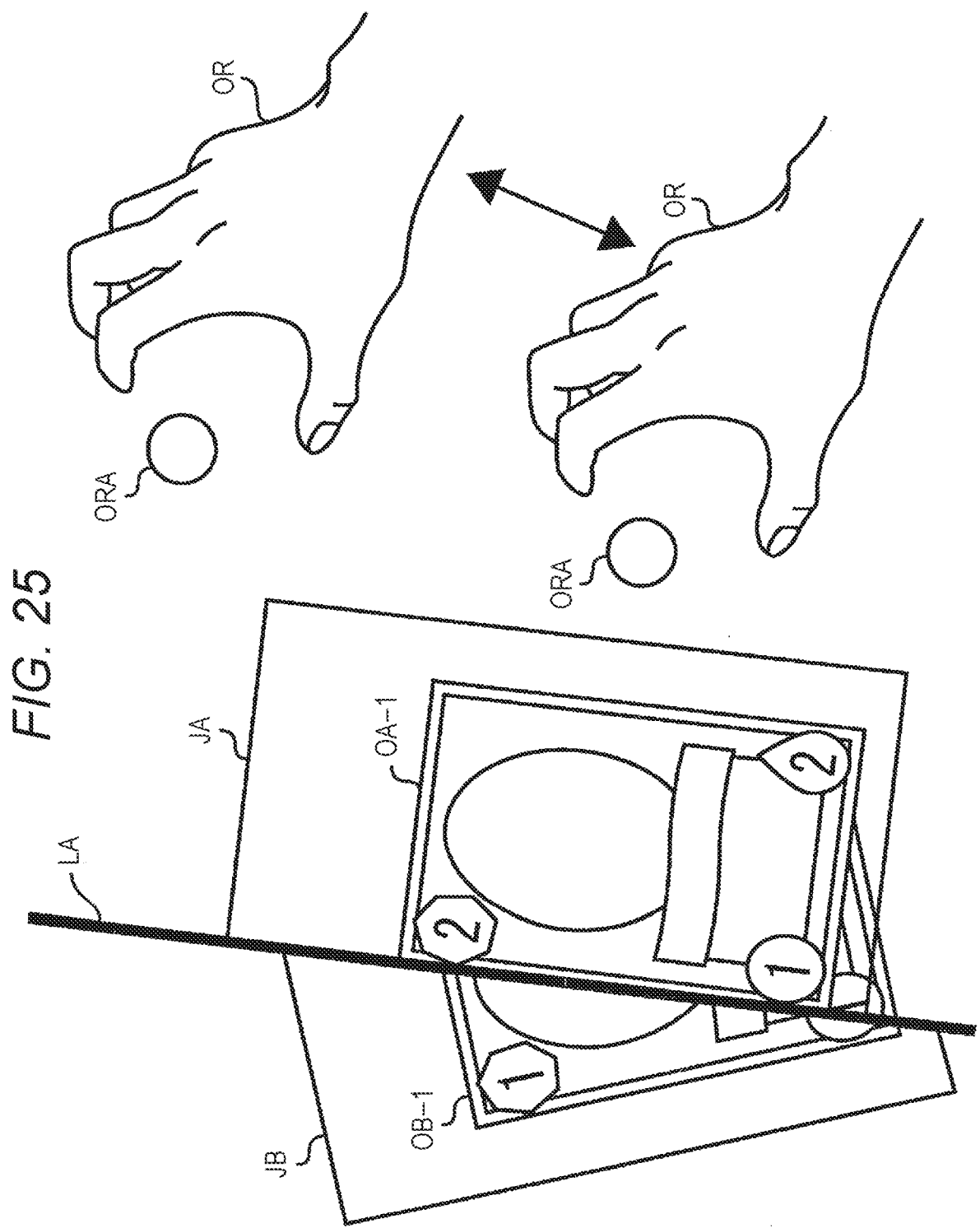

METHOD OF PROVIDING VIRTUAL SPACE, METHOD OF PROVIDING VIRTUAL EXPERIENCE, SYSTEM AND MEDIUM FOR IMPLEMENTING THE METHODS

RELATED APPLICATIONS

The present application is a continuation of U.S. patent application Ser. No. 15/654,652 filed Jul. 19, 2017, which claims priority to Japanese Patent Applications Nos. 2016-142759 and 2016-142761 and 2016-142762, filed Jul. 20, 2016. The disclosures of all of the above-listed prior-filed applications are hereby incorporated by reference herein in their entirety.

TECHNICAL FIELD

This disclosure relates to a method of providing a virtual space, a method of providing a virtual experience, a system, and a medium for implementing the methods.

BACKGROUND

Non Patent Literature 1 describes a technology of enabling a grasp or throw of a block arranged in a virtual space by a virtual hand of a user arranged in the virtual space.

RELATED ART

Non-Patent Documents

[Non-Patent Document 1] "Toybox Demo for Oculus Touch—Inside Look", [online], Oct. 13, 2015, [retrieved on Jun. 13, 2016], Internet <https://www.youtube.com/watch?v=dbYP4bhKr2M>

SUMMARY

In a virtual space, when a user tries to touch a virtual object for operation, the user sometimes fails to operate the virtual object intuitively because the user has a different sense of distance in the virtual space compared to a real space. Similar problems may occur also when a virtual object is arranged in such a manner as to be superimposed on the real space to provide a virtual experience to the user.

In the virtual space, in a case where the user tries to touch a virtual object for operation, the user is predicted to fail to touch a desired virtual object by an intuitive operation when there are a plurality of virtual objects. Similar problems may occur also when virtual objects are arranged in such a manner as to be superimposed on the real space to provide a virtual experience to the user. This disclosure has been made to help solve the above-mentioned problem, and an object of at least one embodiment is to enable a user to touch a desired virtual object by an intuitive operation.

This disclosure provides a technology that is improved, in comparison with other approaches, in terms of at least one perspective described above.

In order to help solve the above-mentioned problem, according to at least one embodiment of this disclosure, there is provided a method of providing a virtual space to a user wearing a head mounted display on a head. The method includes identifying a plurality of virtual objects arranged in the virtual space and arranging, in the virtual space, an operation target object configured to operate in synchronization with movement of a part of a body other than the head of the user. The method further includes identifying a reference line of sight of the user in the virtual space. The method further includes identifying a virtual camera arranged in the virtual space and configured to define a field-of-view region to be recognized by the user based on the reference line of sight. The method further includes setting a region for determining touch with the operation target object to at least one of the plurality of virtual objects, the region containing at least a part extending in an extension direction that is based on a position of the virtual camera or a direction of the reference line of sight. The method further includes determining whether or not the at least one of the plurality of virtual objects to which the region is set and the operation target object have touched each other based on a positional relationship between the region and the operation target object.

According to at least one embodiment of this disclosure, the technology that is improved, in comparison with other approaches, in terms of at least one perspective described above is provided.

BRIEF DESCRIPTION OF THE DRAWINGS

FIG. 14A A diagram of the method of adjusting the reference vector that is based on the direction of the virtual camera and including the virtual object and the virtual camera as viewed in an X-axis direction of the virtual space according to at least one embodiment.

FIG. 14B A diagram of the method of adjusting the reference vector that is based on the direction of the virtual camera and including the virtual object and the virtual camera as viewed in an X-axis direction of the virtual space according to at least one embodiment.

FIG. 17 A sequence diagram of a flow of processing performed during the game in the virtual space according to at least one embodiment.

FIG. 22A A diagram of an example of setting the determination region to each of the virtual card objects according to at least one embodiment.

FIG. 22B A diagram of an example of setting the determination region to each of the virtual card objects according to at least one embodiment.

FIG. 25 A diagram of an example of an auxiliary object, according to at least one embodiment.

DETAILED DESCRIPTION

Specific examples of a method of providing a virtual space and a system therefor according to at least one embodiment of this disclosure are described below with reference to the drawings. This disclosure is not limited to those examples, and is defined by the appended claims. This disclosure includes all modifications within the appended claims and the equivalents thereof. In the following description, like elements are denoted by like reference symbols in the description of the drawings, and redundant description thereof is not repeated.

(Configuration of HMD System 100)

Figure 1:
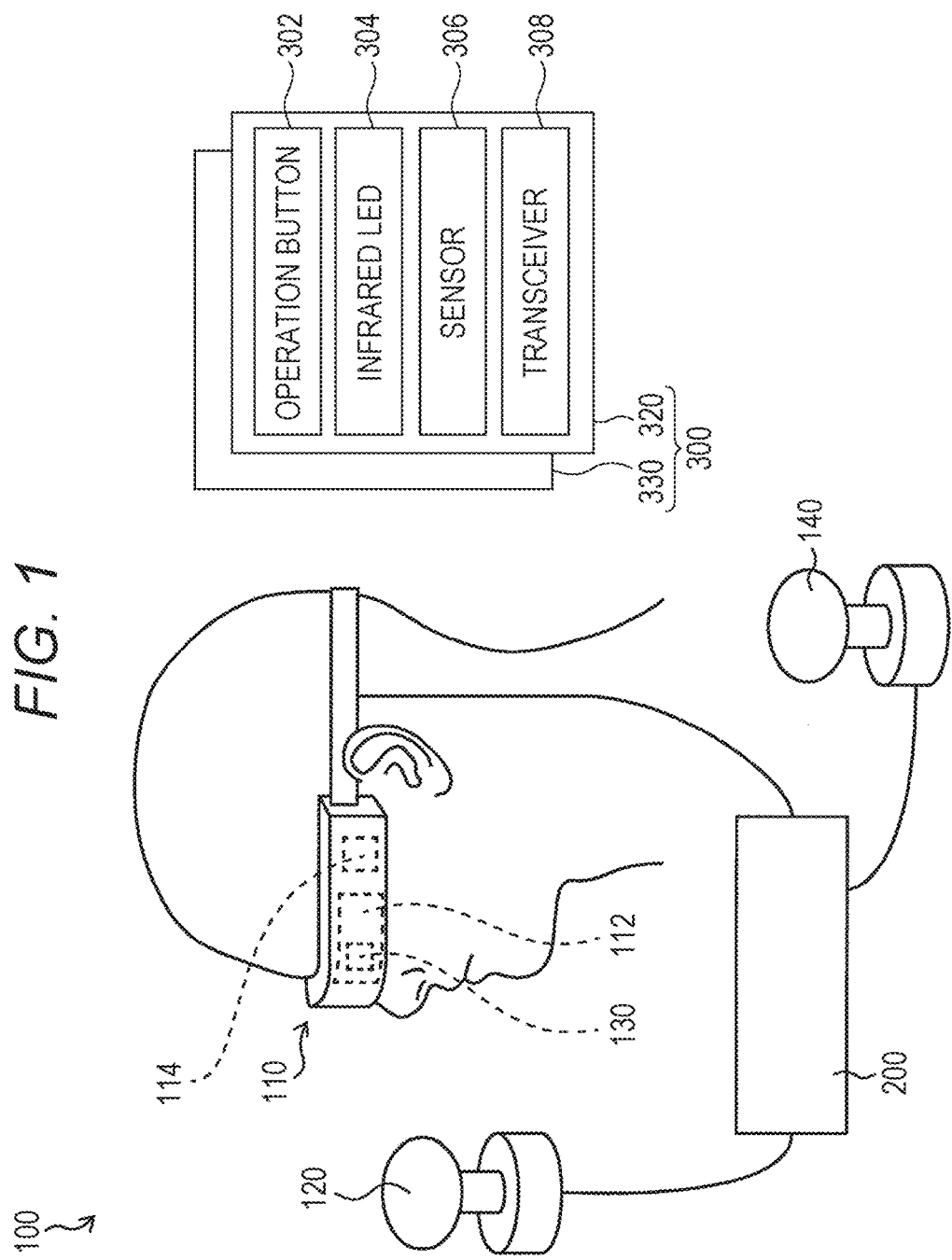
FIG. 1 A diagram of a configuration of a head mounted display (HMD) system according to at least one embodiment.

FIG. 1 is a diagram of a configuration of a head mounted display (HMD) system 100 according to at least one embodiment. In FIG. 1, the HMD system 100 includes an HMD 110, an HMD sensor 120, a controller sensor 140, a control circuit unit 200, and a controller 300.

The HMD 110 is worn on a head of a user. The HMD 110 includes a display 112 that is a non-transmissive display device (or a transmissive display device), a sensor 114, and an eye gaze sensor 130. The HMD 110 is configured to cause the display 112 to display each of a right-eye image and a left-eye image, to thereby enable the user to visually recognize a three-dimensional image to be three-dimensionally visually recognized by the user based on binocular parallax of both eyes of the user. A virtual space is provided to the user in this way. The display 112 is arranged right, in front of the user's eyes, and hence the user can be immersed in the virtual space via an image displayed on the display 112. With this, the user can experience a virtual reality (VR). The virtual space may include a background, various objects that can be operated by the user, menu images, and the like.

The display 112 may include a right-eye sub-display configured to display a right-eye image, and a left-eye sub-display configured to display a left-eye image. Alternatively, the display 112 may be constructed of one display device configured to display the right-eye image and the left-eye image on a common screen. Examples of such a display device include a display device configured to switch at high speed a shutter that enables recognition of a display image with only one eye, to thereby independently and alternately display the right-eye image and the left-eye image.

Further, in at least one embodiment, a transmissive display may be used as the HMD 110. In other words, the HMD 110 may be a transmissive HMD. In this case, a virtual object described later can be arranged virtually in the real space by displaying the three-dimensional image on the transmissive display. With this, the user can experience a mixed reality (MR) in which the virtual object is displayed in combination with the real space. In at least one embodiment, virtual experiences such as a virtual reality and a mixed reality for enabling the user to interact, with the virtual object may be referred to as a "virtual experience". In the following, a method of providing a virtual reality is described in detail as an example. One of ordinary skill in the art would understand that the following description is also applicable to mixed reality.

(Hardware Configuration of Control Circuit Unit 200)

Figure 2:
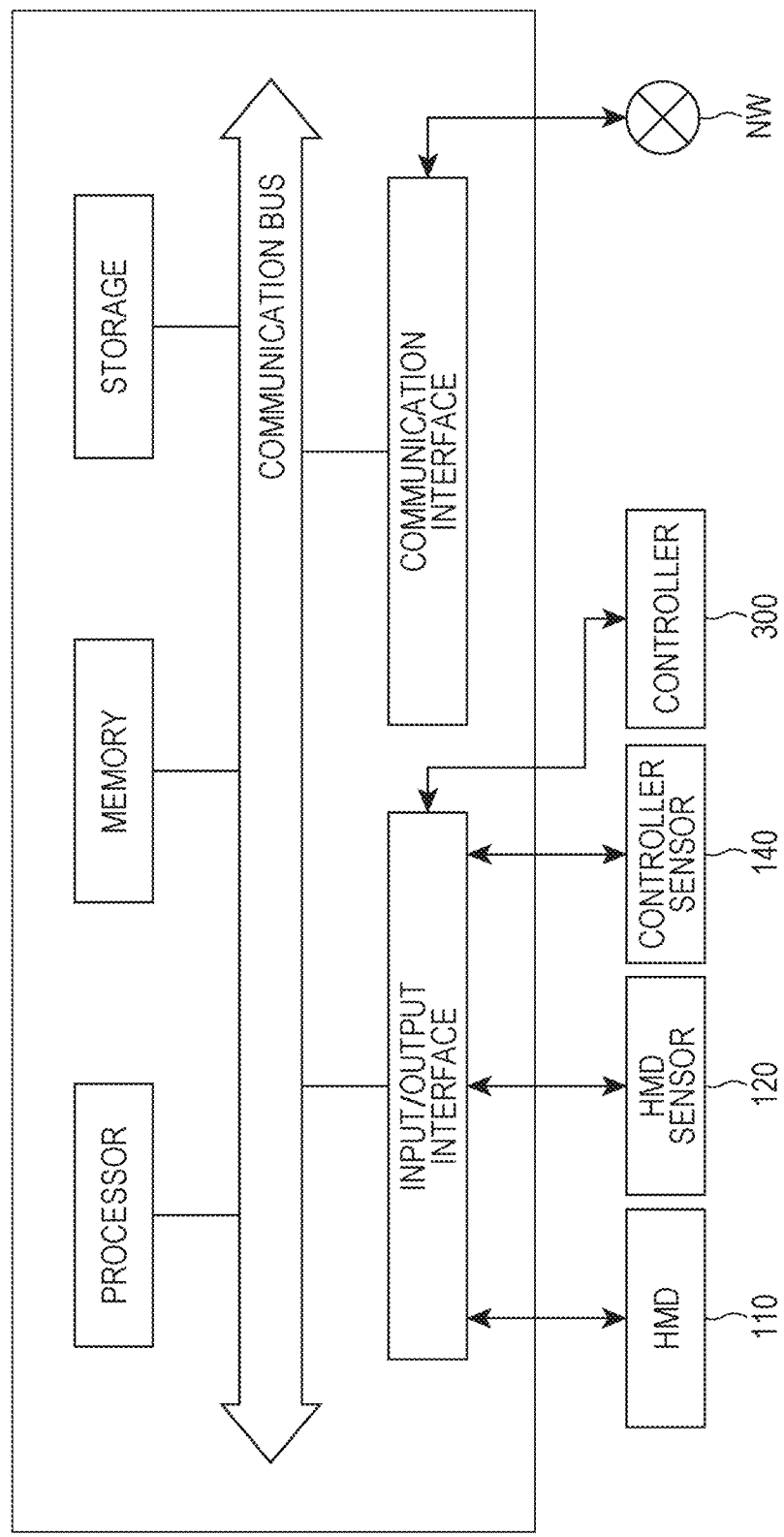
FIG. 2 A diagram of a hardware configuration of a control circuit unit according to at least one embodiment.

FIG. 2 is a diagram of a hardware configuration of the control circuit unit 200 according to at least one embodiment. The control circuit unit 200 is a computer for causing the HMD 110 to provide a virtual space. In FIG. 2, the control circuit unit 200 includes a processor, a memory, a storage, an input/output interface, and a communication interface. Those components are connected to each other in the control circuit unit 200 via a bus serving as a data transmission path.

The processor includes a central processing unit (CPU), a micro-processing unit (MPU), a graphics processing unit (GPU), or the like, and is configured to control the operation of the entire control circuit unit 200 and HMD system 100.

The memory functions as a main storage. The memory stores programs to be processed by the processor and control data (for example, calculation parameters). The memory may include a read only memory (ROM), a random access memory (RAM), or the like.

The storage functions as an auxiliary storage. The storage stores programs for controlling the operation of the entire HMD system 100, various simulation programs and user authentication programs, and various kinds of data (for example, images and objects) for defining the virtual space. Further, a database including tables for managing various kinds of data may be constructed in the storage. The storage may include a flash memory, a hard disc drive (HDD), or the like.

The input/output interface includes various wire connection terminals such as a universal serial bus (USB) terminal, a digital visual interface (DVI) terminal, and a high-definition multimedia interface (HDMI)® terminal, and various processing circuits for wireless connection. The input/output interface is configured to connect the HMD 110, various sensors including the HMD sensor 120 and the controller sensor 140, and the controller 300 to each other.

The communication interface includes various wire connection terminals for communicating to/from an external apparatus via a network NW, and various processing circuits for wireless connection. The communication interface is configured to adapt to various communication standards and protocols for communication via a local area network (LAN) or the Internet.

The control circuit unit 200 is configured to load a predetermined application program stored in the storage to the memory to execute the program, to thereby provide the virtual space to the user. Further, at the time of execution of the program, the memory and the storage store various programs for operating various objects to be arranged in the virtual space, or for displaying and controlling various menu images and the like.

The control circuit unit 200 may be mounted on the HMD 110, or may not be mounted thereon. That is, according to at least one embodiment the control circuit unit 200 may be constructed as different hardware independent of the HMD 110 (for example, a personal computer, or a server apparatus that can communicate to/from the HMD 110 via a network). The control circuit unit 200 may be a device in the form in which one or more functions are implemented through cooperation between a plurality of pieces of hardware. Alternatively, only apart of all the functions of the control circuit unit 200 may be executed by a device on the HMD 110, and other functions thereof may be executed by a different hardware device.

In each element, for example, the HMD 110, constructing the HMD system 100, a global coordinate system (reference coordinate system, xyz coordinate system) is set in advance. The global coordinate system has three reference directions (axes) that are respectively parallel to a vertical direction, a lateral direction orthogonal to the vertical direction, and a front-rear direction orthogonal to both of the vertical direction and the lateral direction in a real space. In at least one embodiment, the global coordinate system is one type of point-of-view coordinate system, and hence the lateral direction, the vertical direction (up-down direction), and the front-rear direction of the global coordinate system are referred to as an x axis, a y axis, and a z axis, respectively. Specifically, the x axis of the global coordinate system is parallel to the lateral direction of the real space, the y axis thereof is parallel to the vertical direction of the real space, and the z axis thereof is parallel to the front-rear direction of the real space.

The HMD sensor 120 has a position tracking function for detecting the movement of the HMD 110. The HMD sensor 120 is configured to detect the position and the inclination of the HMD 110 in the real space with this function. In order to enable this detection, the HMD 110 includes a plurality of light sources (not shown). Each of the light sources is, for example, an LED configured to emit an infrared ray. The HMD sensor 120 includes, for example, an infrared sensor. The HMD sensor 120 is configured to detect the infrared ray emitted from the light source of the HMD 110 by the infrared sensor, to thereby detect a detection point of the HMD 110. Further, the HMD sensor 120 is configured to detect, based on a detection value of the detection point of the HMD 110, the position and the inclination of the HMD 110 in the real space based on the movement of the user. The HMD sensor 120 can determine a time change of the position and the inclination of the HMD 110 based on a temporal change of the detection value.

The HMD sensor 120 may include an optical camera. In this case, the HMD sensor 120 detects the position and the inclination of the HMD 110 based on image information of the HMD 110 obtained by the optical camera.

The HMD 110 may use the sensor 114 instead of the HMD sensor 120 to detect the position and the inclination of the HMD 110. In this case, the sensor 114 may be, for example, an angular velocity sensor, a geomagnetic sensor, an acceleration sensor, or a gyrosensor. The HMD 110 uses at least one of those sensors. When the sensor 114 is the angular velocity sensor, the sensor 114 detects over time the angular velocity about three axes in the real space of the HMD 110 in accordance with the movement of the HMD 110. The HMD 110 can determine the time change of the angle about the three axes of the HMD 110 based on the detection value of the angular velocity, and can detect the inclination of the HMD 110 based on the time change of the angle.

When the HMD 110 detects the position and the inclination of the HMD 110 based on the detection value of the sensor 114, the HMD system 100 does not require the HMD sensor 120. On the other hand, when the HMD sensor 120 arranged at a position away from the HMD 110 detects the position and the inclination of the HMD 110, the HMD 110 does not require the sensor 114.

As described above, the global coordinate system is parallel to the coordinate system of the real space. Therefore, each inclination of the HMD 110 detected by the HMD sensor 120 corresponds to each inclination about the three axes of the HMD 110 in the global coordinate system. The HMD sensor 120 is configured to set an uvw visual-field coordinate system to the HMD 110 based on the detection value of the inclination of the HMD sensor 120 in the global coordinate system. The uvw visual-field coordinate system set in the HMD 110 corresponds to the point-of-view coordinate system used when the user wearing the HMD 110 views an object.

(uvw Visual-Field Coordinate System)

Figure 3:
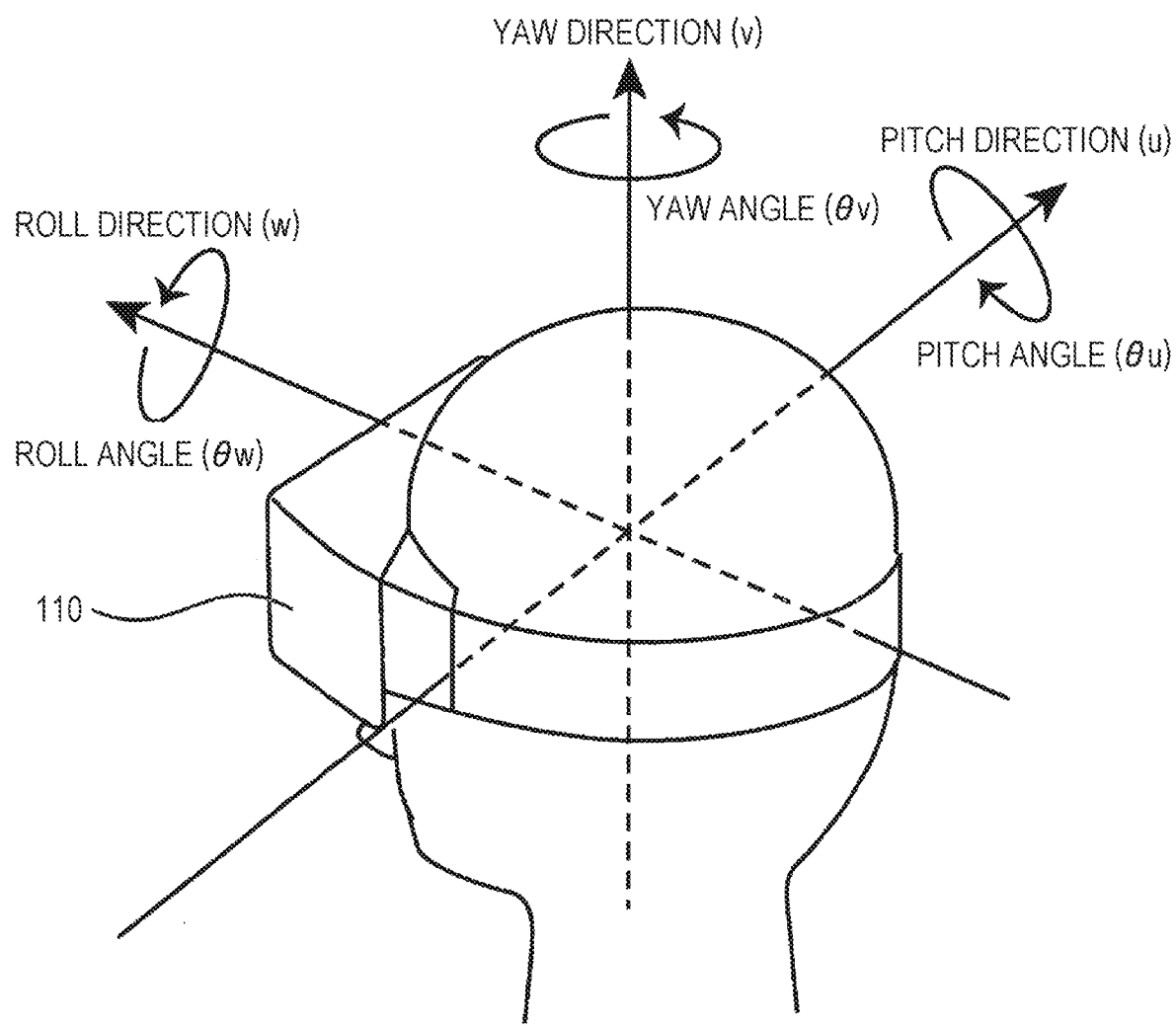
FIG. 3 A diagram of a visual-field coordinate system to be set in an HMD according to at least one embodiment.

FIG. 3 is a diagram of a uvw visual-field coordinate system to be set in the HMD 110 according to at least one embodiment. The HMD sensor 120 detects the position and the inclination of the HMD 110 in the global coordinate system when the HMD 110 is activated. Then, a three-dimensional uvw visual-field coordinate system based on the detection value of the inclination is set to the HMD 110. In FIG. 3, the HMD sensor 120 sets, to the HMD 110, a three-dimensional uvw visual-field coordinate system defining the head of the user wearing the HMD 110 as a center (origin). Specifically, new three directions obtained by inclining the lateral direction, the vertical direction, and the front-rear direction (x axis, y axis, and z axis), which define the global coordinate system, about the respective axes by the inclinations about the respective axes of the HMD 110 in the global coordinate system are set as a pitch direction (u axis), a yaw direction (v axis), and a roll direction (w axis) of the uvw visual-field coordinate system, in the HMD 110.

In FIG. 3, when the user wearing the HMD 110 is standing upright and is visually recognizing the front side, the HMD sensor 120 sets the uvw visual-field coordinate system, that is parallel to the global coordinate system to the HMD 110. In this case, the lateral direction (x axis), the vertical direction (y axis), and the front-rear direction (z axis) of the global coordinate system directly match with the pitch direction (u axis), the yaw direction (v axis), and the roll direction (w axis) of the uvw visual-field coordinate system in the HMD 110.

After the uvw visual-field coordinate system is set to the HMD 110, the HMD sensor 120 can detect, the inclination (change amount of the inclination) of the HMD 110 in the uvw visual-field coordinate system that is currently set based on the movement of the HMD 110. In this case, the HMD sensor 120 detects, as the inclination of the HMD 110, each of a pitch angle ($\theta u$), a yaw angle ($\theta v$), and a roll angle ($\theta w$) of the HMD 110 in the uvw visual-field coordinate system that is currently set. The pitch angle ($\theta u$) is an inclination angle of the HMD 110 about the pitch direction in the uvw visual-field coordinate system. The yaw angle ($\theta v$) is an inclination angle of the HMD 110 about the yaw direction in the uvw visual-field coordinate system. The roll angle ($\theta w$) is an inclination angle of the HMD 110 about the roll direction in the uvw visual-field coordinate system.

The HMD sensor 120 newly sets, based on the detection value of the inclination of the HMD 110, the uvw visual-field coordinate system of the HMD 110 obtained after the movement to the HMD 110. The relationship between the HMD 110 and the uvw visual-field coordinate system of the HMD 110 is always constant regardless of the position and the inclination of the HMD 110. When the position and the inclination of the HMD 110 change, the position and the inclination of the uvw visual-field coordinate system of the HMD 110 in the global coordinate system similarly change in synchronization therewith.

The HMD sensor 120 may identify the position of the HMD 110 in the real space as a position relative to the HMD sensor 120 based on the light intensity of the infrared ray or a relative positional relationship between a plurality of detection points (for example, a distance between the detection points), which is acquired by the infrared sensor. Further, the origin of the uvw visual-field coordinate system of the HMD 110 in the real space (global coordinate system) may be determined based on the identified relative position. Further, the HMD sensor 120 may detect the inclination of the HMD 110 in the real space based on the relative positional relationship between the plurality of detection points, and further determine the direction of the uvw visual-field coordinate system of the HMD 110 in the real space (global coordinate system) based on the detection value of the inclination.

(Overview of Virtual Space 2)

Figure 4:
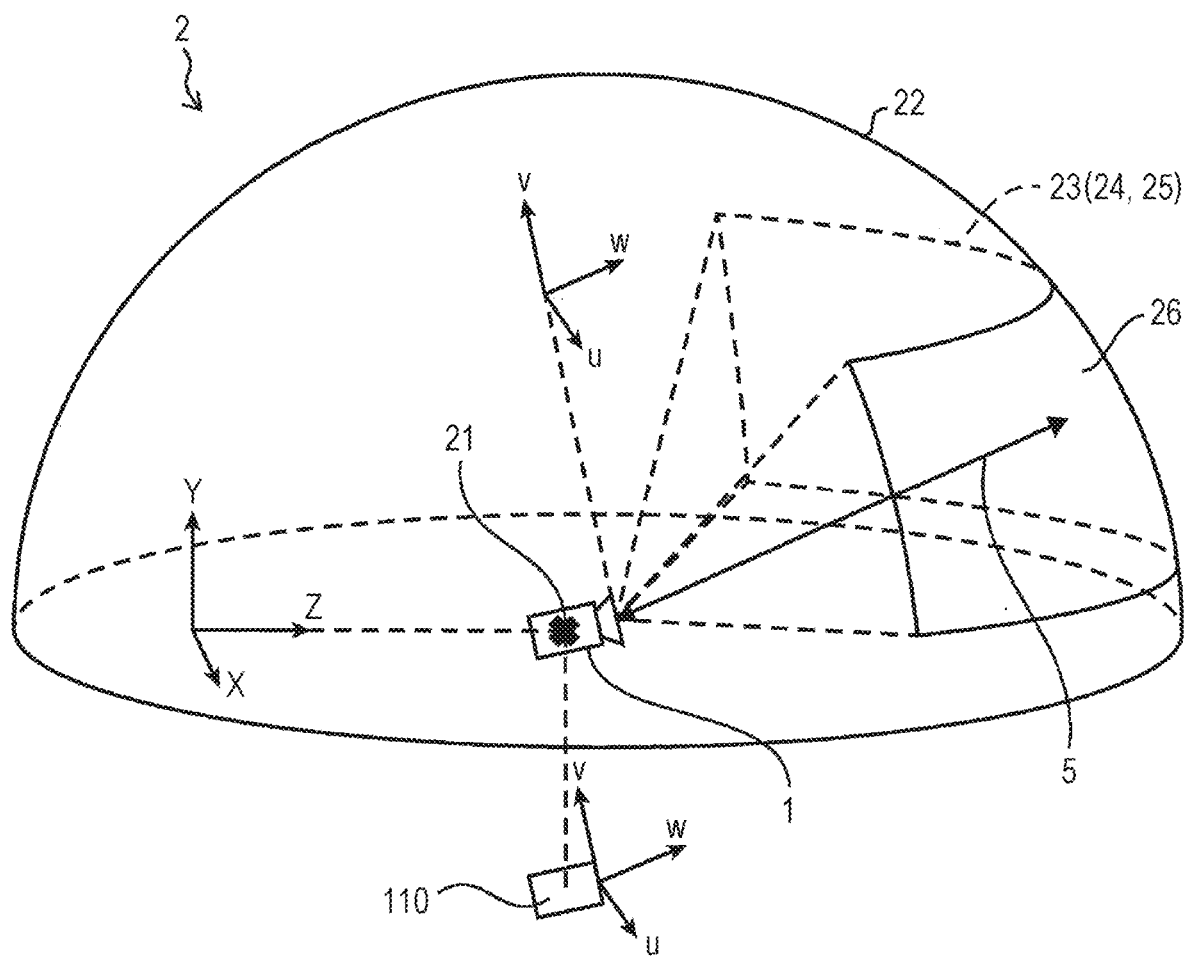
FIG. 4 A diagram, of an overview of a virtual space to be provided to a user according to at least one embodiment.

FIG. 4 is a diagram of an overview of a virtual space 2 to be provided to the user according to at least one embodiment. In FIG. 4, the virtual space 2 has a structure with an entire celestial sphere shape covering a center 21 in all 360-degree directions. In FIG. 4, only the upper-half celestial sphere of the entire virtual space 2 is shown for clarity. A plurality of substantially-square or substantially-rectangular mesh sections are associated with the virtual space 2. The position of each mesh section in the virtual space 2 is defined in advance as coordinates in a spatial coordinate system (XYZ coordinate system) defined in the virtual space 2. The control circuit unit 200 associates each partial image forming content (for example, still image or moving image) that can be developed in the virtual space 2 with each corresponding mesh sect ion in the virtual space 2, to thereby provide, to the user, the virtual space 2 in which a virtual space image 22 that can be visually recognized by the user is developed.

In the virtual space 2, an XYZ spatial coordinate system having the center 21 as the origin is defined. The XYZ coordinate system is, for example, parallel to the global coordinate system. The XYZ coordinate system is one type of the point-of-view coordinate system, and hence the lateral direction, the vertical direction (up-down direction), and the front-rear direction of the XYZ coordinate system are referred to as an X axis, a Y axis, and a Z axis, respectively. That is, the X axis (lateral direction) of the XYZ coordinate system is parallel to the x axis of the global coordinate system, the Y axis (up-down direction) of the XYZ coordinate system is parallel to the y axis of the global coordinate system, and the Z axis (front-rear direction) of the XYZ coordinate system is parallel to the z axis of the global coordinate system.

When the HMD 110 is activated (in an initial state), a virtual camera 1 is arranged at the center 21 of the virtual space 2. In synchronization with the movement of the HMD 110 in the real space, the virtual camera 1 similarly moves in the virtual space 2. With this, the change in position and direction of the HMD 110 in the real space is reproduced similarly in the virtual space 2.

The uvw visual-field coordinate system is defined in the virtual camera 1 similarly to the HMD 110. The uvw visual-field coordinate system of the virtual camera 1 in the virtual space 2 is defined so as to be synchronized with the uvw visual-field coordinate system of the HMD 110 in the real space (global coordinate system). Therefore, when the inclination of the HMD 110 changes, the inclination of the virtual camera 1 also changes in synchronization therewith. The virtual camera 1 can also move in the virtual space 2 in synchronization with the movement of the user wearing the HMD 110 in the real space.

The direction of the virtual camera 1 in the virtual space 2 is determined based on the position and the inclination of the virtual camera 1 in the virtual space 2. With this, a line of sight (reference line of sight 5) serving as a reference when the user visually recognizes the virtual space image 22 developed in the virtual space 2 is determined. The control circuit unit 200 determines a field-of-view region 23 in the virtual space 2 based on the reference line of sight 5. The field-of-view region 23 is a region corresponding to a field of view of the user wearing the HMD 110 in the virtual space 2.

Figure 5A:
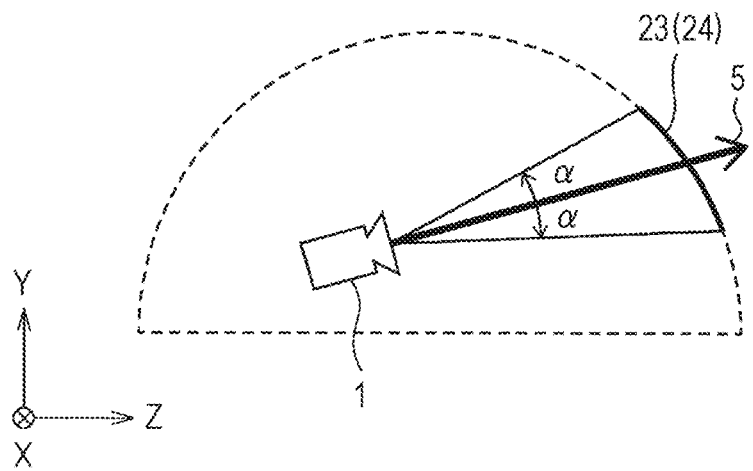
FIG. 5A A diagram of a cross section of a field-of-view region according to at least one embodiment.
Figure 5B:
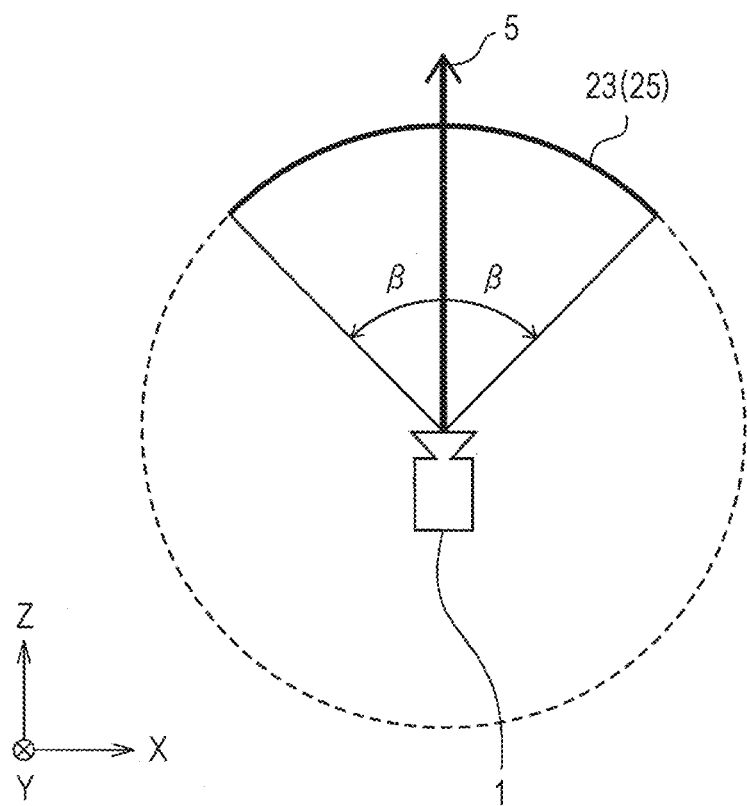
FIG. 5B A diagram of a cross section of a field-of-view region according to at least one embodiment.

FIGS. 5A and 5B are diagrams of cross sections of the field-of-view region 23 according to at least one embodiment. FIG. 5A is a diagram of a YZ cross section of the field-of-view region 23 as viewed from an X direction in the virtual space 2 according to at least one embodiment. FIG. 5B is a diagram of an XZ cross section of the field-of-view region 23 as viewed from a Y direction in the virtual space 2 according to at least one embodiment. The field-of-view region 23 has a first region 24 (see FIG. 5A) that is a range defined by the reference line of sight 5 and the YZ cross section of the virtual space 2, and a second region 25 (see FIG. 5B) that is a range defined by the reference line of sight 5 and the XZ cross section of the virtual space 2. The control circuit unit 200 sets, as the first region 24, a range of a polar angle $\alpha$ from the reference line of sight 5 serving as the center in the virtual space 2. Further, the control circuit unit 200 sets, as the second region 25, a range of an azimuth $\beta$ from the reference line of sight 5 serving as the center in the virtual space 2.

The HMD system 100 provides the virtual space 2 to the user by displaying a field-of-view image 26, which is a part of the virtual space image 22 to be superimposed with the field-of-view region 23, on the display 112 of the HMD 110. When the user moves the HMD 110, the virtual camera 1 also moves in synchronization therewith. As a result, the position of the field-of-view region 23 in the virtual space 2 changes. In this manner, the field-of-view image 26 displayed on the display 112 is updated to an image that is superimposed with a portion (=field-of-view region 23) of the virtual space image 22 to which the user faces in the virtual space 2. Therefore, the user can visually recognize a desired portion of the virtual space 2.

The user cannot see the real world while wearing the HMD 110, and visually recognizes only the virtual space image 22 developed in the virtual space 2. Therefore, the HMD system 100 can provide a high sense of immersion in the virtual space 2 to the user.

The control circuit unit 200 may move the virtual camera 1 in the virtual, space 2 in synchronization with the movement of the user wearing the HMD 110 in the real space. In this case, the control circuit unit 200 identifies the field-of-view region 23 to be visually recognized by the user by being projected on the display 112 of the HMD 110 in the virtual space 2 based on the position and the direction of the virtual camera 1 in the virtual space 2.

In at least one embodiment, the virtual camera 1 includes a right-eye virtual, camera configured to provide a right-eye image and a left-eye virtual camera configured to provide a left-eye image. Further, an appropriate parallax is to be set for the two virtual cameras so that the user can recognize the three-dimensional virtual space 2. In at least one embodiment, as a representative of those virtual cameras, only such a virtual camera 1 that the roll direction (w) generated by combining the roll directions of the two virtual cameras is adapted to the roll direction (w) of the HMD 110 is illustrated and described.

(Detection of Line-of-Sight Direction)

The eye gaze sensor 130 has an eye tracking function of detecting directions (line-of-sight directions) in which the user's right and left eyes are directed. As the eye gaze sensor 130, a known sensor having the eye tracking function can be employed. In at least one embodiment, the eye gaze sensor 130 includes a right-eye sensor and a left-eye sensor. For example, the eye gaze sensor 130 may be a sensor configured to irradiate each of the right eye and the left eye of the user with infrared light to receive reflection light from the cornea and the iris with respect to the irradiation light, to thereby detect a rotational angle of each eyeball. The eye gaze sensor 130 can detect the line-of-sight direction of the user based on each detected rotational angle.

The line-of-sight direction of the user detected by the eye gaze sensor 130 is a direction in the point-of-view coordinate system obtained when the user visually recognizes an object. As described above, the uvw visual-field coordinate system of the HMD 110 is equal to the point-of-view coordinate system used when the user visually recognizes the display 112. Further, the uvw visual-field coordinate system of the virtual camera 1 is synchronized with the uvw visual-field coordinate system of the HMD 110. Therefore, in the HMD system 100, the user's line-of-sight direction detected by the eye gaze sensor 130 can be regarded as the user's line-of-sight direction in the uvw visual-field coordinate system of the virtual camera 1.

Figure 6:
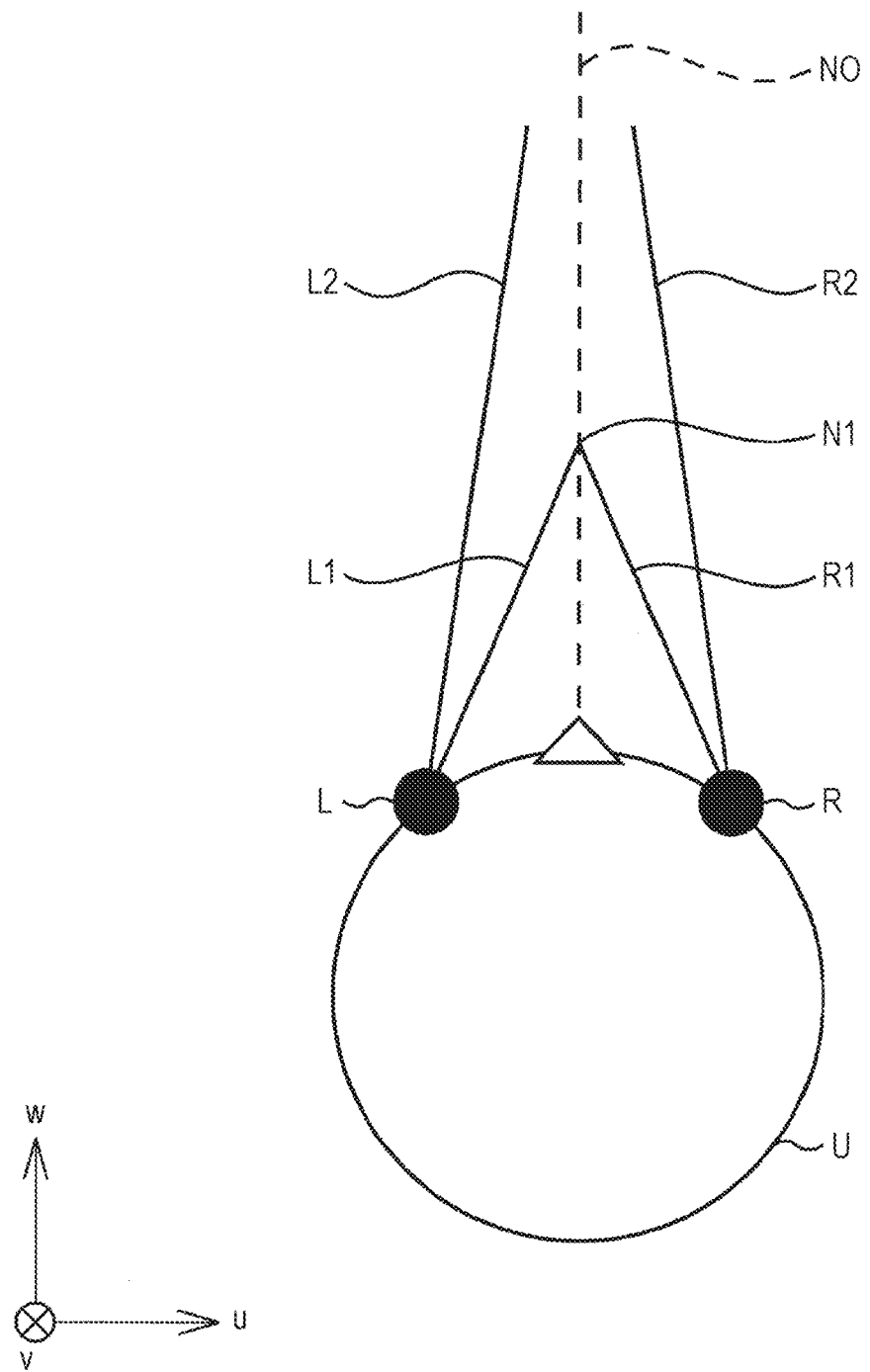
FIG. 6 A diagram of a method of determining a line-of-sight direction of the user according to at least one embodiment.

FIG. 6 is a diagram of a method of determining the line-of-sight direction of the user according to at least one embodiment. In FIG. 6, the eye gaze sensor 130 detects lines of sight of a right eye and a left eye of a user U. When the user U is looking at a near place, the eye gaze sensor 130 detects lines of sight R1 and L1 of the user U. When the user is looking at a far place, the eye gaze sensor 130 identifies lines of sight R2 and L2, which form smaller angles with respect to the roll direction (w) of the HMD 110 as compared to the lines of sight R1 and L1 of the user. The eye gaze sensor 130 transmits the detection values to the control circuit unit 200.

When the control circuit unit 200 receives the lines of sight R1 and L1 as the detection values of the lines of sight, the control circuit unit 200 identifies a point of gaze N1 being an intersection of both the lines of sight R1 and L1. Meanwhile, even when the control circuit unit 200 receives the lines of sight R2 and L2, the control circuit unit 200 identifies a point of gaze N2 (not shown) being an intersection of both the lines of sight R2 and L2. The control circuit unit 200 detects a line-of-sight direction N0 of the user U based on the identified point of gaze N1. The control circuit unit 200 detects, for example, an extension direction of a straight line that passes through the point of gaze N1 and a midpoint of a straight line connecting a right eye R and a left eye L of the user U to each other as the line-of-sight direction N0. The line-of-sight direction N0 is a direction in which the user U actually directs his or her lines of sight with both eyes. The line-of-sight-direction N0 is also a direction in which the user U actually directs his or her lines of sight with respect to the field-of-view region 23.

The HMD system 100 may include microphones and speakers in any element constructing the HMD system 100. With this, the user can issue an instruction with sound to the virtual space 2. Further, the HMD system 100 may include a television receiver in any element in order to receive broadcast, of a television program in a virtual television in the virtual space. Further, the HMD system 100 may have a communication function or the like in order to display an electronic mail or the like sent, to the user.

(Controller 300)

Figure 7A:
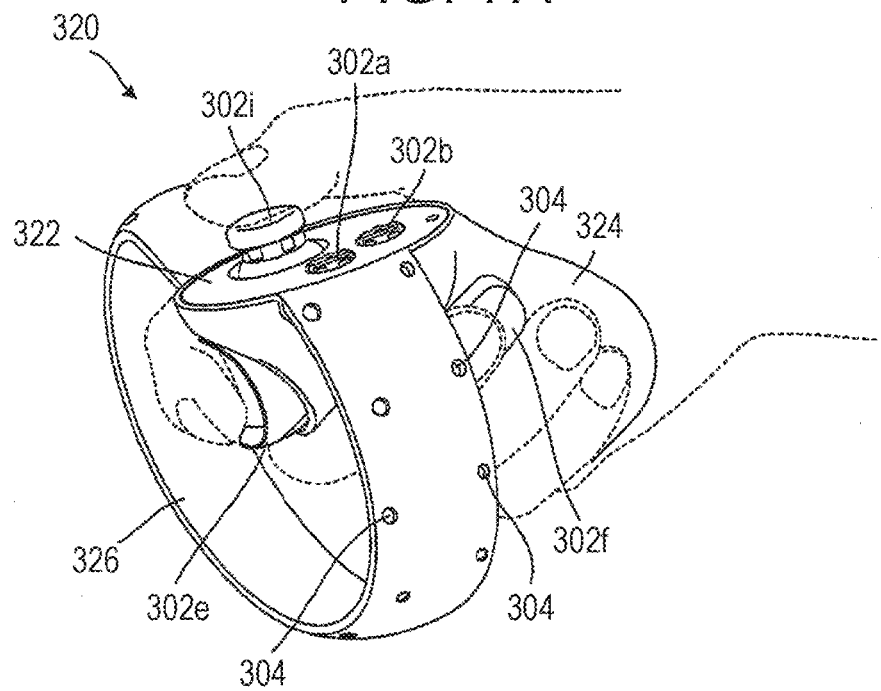
FIG. 7A A diagram of a configuration of a controller according to at least one embodiment.
Figure 7B:
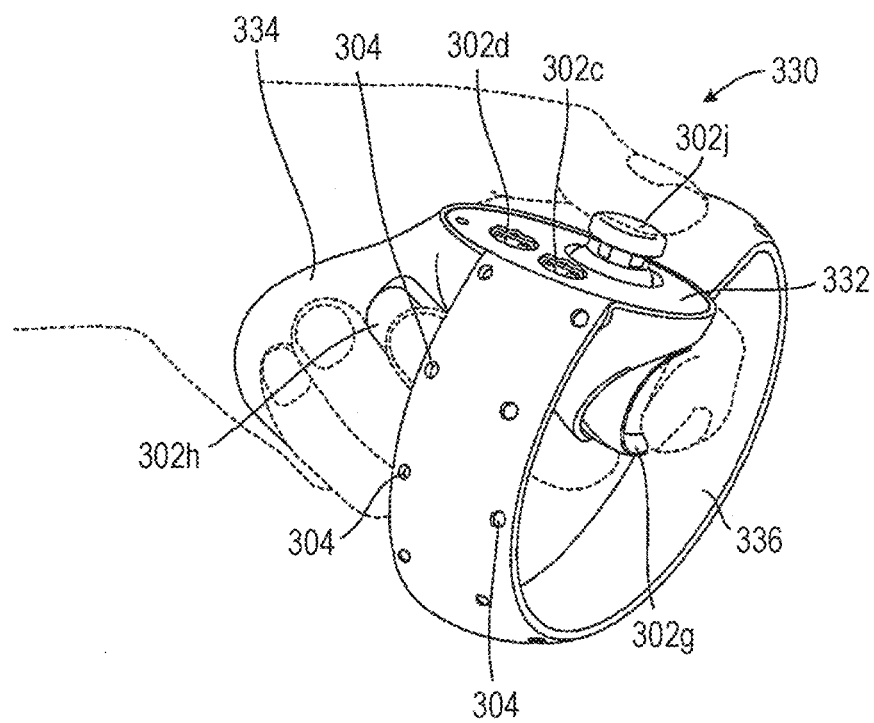
FIG. 7B A diagram of a configuration of a controller according to at least one embodiment.

FIGS. 7A and 7B are diagrams of a configuration of the controller 300 according to at least one embodiment. The controller 300 is an example of a device to be used for controlling movement of the virtual object by detecting movement of a part of the body of the user. In FIGS. 1, 7A and 7B, the controller 300 is formed of a right controller 320 to be used by the user with the right hand and a left controller 330 to be used by the user with the left hand. The right controller 320 and the left, controller 330 are separate devices. The user can freely move the right hand holding the right controller 320 and the left hand holding the left controller 330 independently of each other. The method of detecting movement of a part of the body of the user other than the head is not limited to the example of using a controller including a sensor mounted to the part of the body, but an image recognition technique and other any physical and optical techniques can be used. For example, an external camera can be used to identify the initial position of the part of the body of the user and the position of the part of the body of the user continuously, to thereby detect movement of the part of the body of the user other than the head. In the following description, detection of movement of a part of the body of the user other than the head using the controller 300 is described in detail.

In FIGS. 1, 7A and 7B, the right controller 320 and the left controller 330 each include operation buttons 302, infrared light emitting diodes (LEDs) 304, a sensor 306, and a transceiver 308. As described above, the right controller 320 and the left controller 330 may include only one of the infrared LEDs 304 and the sensor 306.

The operation buttons 302 are a group of a plurality of buttons configured to receive input of an operation on the controller 300 by the user. In at least one embodiment, the operation buttons 302 include a push button, a trigger button, and an analog stick.

The push button is a button configured to be operated by an operation of pushing the button down with the thumb. The right controller 320 includes thumb buttons 302a and 302b on a top surface 322 as push buttons. The left controller 330 includes two thumb buttons 302c and 302d on a top surface 332 as push buttons. The thumb buttons 302a and 302b are each operated (pushed) by the right thumb. The thumb buttons 302c and 302d are each operated (pushed) by the left thumb.

The trigger button is a button configured to be operated by movement of pulling the trigger of the trigger button with the index finger or the middle finger. The right controller 320 includes an index finger button 302e on the front surface of a grip 324 and a middle finger button 302f on the side surface of the grip 324 as trigger buttons. The left controller 330 includes an index finger button 302g on the front surface of a grip 334 and a middle finger button 302h on the side surface of the grip 334 as trigger buttons. The index finger button 302e, the middle finger button 302f, the index finger button 302g, and the middle finger button 302h are operated (pushed) by the index finger of the right hand, the middle finger of the right hand, the index finger of the left hand, and the middle finger of the left hand, respectively.

The right controller 320 is configured to detect push states of the thumb buttons 302a and 302b, the index finger button 302e, and the middle finger button 302f, and to output those detection values to the control circuit unit 200. On the other hand, the left controller 330 is configured to detect push states of the thumb buttons 302c and 302d, the index finger button 302g, and the middle finger button 302h, and to output those detection values to the control circuit unit 200.

In at least one embodiment, the detection values of push states of respective buttons of the right controller 320 and the left controller 330 may take any one of values of from 0 to 1. For example, when the user does not push the thumb button 302a at all, "0" is detected as the push state of the thumb button 302a. On the other hand, when the user pushes the thumb button 302a completely (most deeply), "1" is detected as the push state of the thumb button 302a.

The analog stick is a stick button capable of being tilted by any direction within 360° from a predetermined neutral position. An analog stick 302i is arranged on the top surface 322 of the right controller 320, and an analog stick 302j is arranged on the top surface 332 of the left controller 330. The analog sticks 302i and 302j are operated by thumbs of the right hand and the left hand, respectively.

The right controller 320 and the left controller 330 include frames 326 and 336 forming semicircular rings extending from both side surfaces of the grips (324 and 334) in directions opposite to the top surfaces (322 and 332), respectively. The plurality of infrared LEDs 304 are embedded into each of outer surfaces of the frames 326 and 336. The plurality of (for example, about 10) infrared LEDs 304 are arranged in a line along a circumferential direction of each of the frames 326 and 336. The plurality of lines of (for example, two lines of) infrared LEDs 304 may be arranged along the circumferential directions of the frames 326 and 336.

When the user grips the controller 300, each finger of the user is placed between the grip (324 or 334) and the frame (326 or 336). Therefore, the infrared LEDs 304 arranged on the outer surfaces of the frames 326 and 336 are not covered by the hands or fingers of the user. In addition to the outer surfaces of the frames 326 and 336, the infrared LEDs 304 may be arranged at positions that are not covered by the fingers of the user among the surfaces of the grips 324 and 334. The infrared LED 304 is configured to emit infrared light during play of a computer game. The infrared light emitted by the infrared LED 304 is used to detect the position and inclination of each of the right controller 320 and the left controller 330.

The right controller 320 and the left controller 330 each further incorporate the sensor 306 instead of the infrared LEDs 304 or in addition to the infrared LEDs 304. The sensor 306 may be any one of, for example, a magnetic sensor, an angular velocity sensor, or an acceleration sensor, or a combination of those sensors. The positions and inclinations of the right controller 320 and the left controller 330 can be detected by the sensor 306 as well.

The sensor 306 is configured to output values (a magnetic value, an angular velocity value, and an acceleration value) that correspond to the directions and movement of the right controller 320 and the left controller 330 when the user holds and moves the right controller 320 and the left controller 330 with the right hand and the left hand. The control circuit unit 200 can detect the positions and inclinations of the right controller 320 and the left controller 330 by processing the output values of the sensor 306 by an appropriate method.

The transceiver 308 is configured to enable transmission or reception of data between the right controller 320 or the left controller 330 and the control circuit unit 200. The transceiver 308 transmits, to the control circuit unit 200, data that is based on input of an operation of the right controller 320 or the left controller 330 by the user using the operation button 302. Further, the transceiver 308 receives, from the control circuit unit 200, a command for instructing the right controller 320 or the left controller 330 to cause the infrared LEDs 304 to emit light. Further, the transceiver 308 transmits data on various kinds of values detected by the sensor 306 to the control circuit unit 200.

The right controller 320 and the left controller 330 may each include a vibrator for transmitting haptic feedback to the hand of the user through vibration. In this configuration, the transceiver 308 can receive, from the control circuit unit 200, a command for causing the vibrator to transmit haptic feedback in addition to transmission or reception of each piece of data described above. The transceiver 308 is preferably configured to transmit or receive data via wireless communication. In this configuration, the wired communication cable is not connected to the right controller 320 and the left controller 330, and thus the user can more freely move the right hand holding the right controller 320 and the left hand holding the left controller 330.

The controller sensor 140 has a position tracking function for detecting movement of the right controller 320 and the left controller 330. The controller sensor 140 uses this function to detect the positions and inclinations of the right controller 320 and the left controller 330 in the real space. To implement this detection, the controller sensor 140 detects each of the infrared lights emitted by the infrared LEDs 304 of the right controller 320 and the left controller 330. The controller sensor 140 includes, for example, an infrared camera configured to photograph an image in an infrared wavelength region, and detects positions and inclinations of the right controller 320 and the left controller 330 based on data on an image captured by this infrared camera.

The image captured by the infrared camera is a contrast image that has reflected arrangement of a large number of infrared LEDs 304 embedded in the surfaces of the right controller 320 and the left controller 330. One captured image may contain two bright point groups that are separated from each other. A left group of those two groups corresponds to the infrared LED 304 of the right controller 320 held by the user with the right hand. A right group of those two groups corresponds to the infrared LED 304 of the left controller 330 held by the user with the left hand. The controller sensor 140 detects the inclination of the right controller 320 based on the direction in which bright points forming the left group are arranged. For example, when bright points are arranged in a lateral direction (namely, horizontal direction) in the captured image, the inclination of the right controller 320 may be detected as an inclination of the frame 326 being held horizontally. Further, when the direction of bright points being arranged in the captured image is inclined by a certain angle with respect to the lateral direction, the inclination of the right controller 320 may be detected as an inclination of the frame 326 being inclined by the angle with respect to the horizontal direction. Similarly, the controller sensor 140 detects the inclination of the left controller 330 based on the direction of arrangement of bright points forming the right group in the captured image.

The controller sensor 140 identifies the bright points (infrared LEDs 304) in the photographed image to detect positions of the right controller 320 and the left controller 330. For example, the position of the center of gravity of a plurality of bright points forming the left group among the two groups of bright points detected based on the captured image is detected as the position of the right controller 320. Further, the position of the center of gravity of a plurality of bright points forming the right group is detected as the position of the left controller 330.

The right controller 320 and the left controller 330 may detect the positions and inclinations of themselves using the sensor 306 instead of the controller sensor 140. In this case, for example, a three-axis angular velocity sensor (sensor 306) of the right controller 320 detects rotation of the right controller 320 about three orthogonal axes. The right controller 320 detects how much and in which direction the right controller 320 has rotated based on the detection values, and calculates the inclination of the right controller 320 by integrating the sequentially detected rotation direction and rotation amount. Similarly, the left controller 330 may use the detection values of a three-axis angular velocity sensor (sensor 306) of the left controller 330 to calculate the inclination of the left controller 330. The right controller 320 and the left controller 330 may use, for example, the detection values of a three-axis magnetic sensor and/or a three-axis acceleration sensor in addition to the detect ion values of the three-axis angular velocity sensor.

The right controller 320 can use detection values of the three-axis angular velocity sensor (sensor 306) to detect the position of the right controller 320, which is not described here in detail. Further, the left controller 330 can use detection values of the three-axis angular velocity sensor (sensor 306) to detect the position of the left controller 330.

(Functional Configuration of Control Circuit Unit 200)

Figure 8:
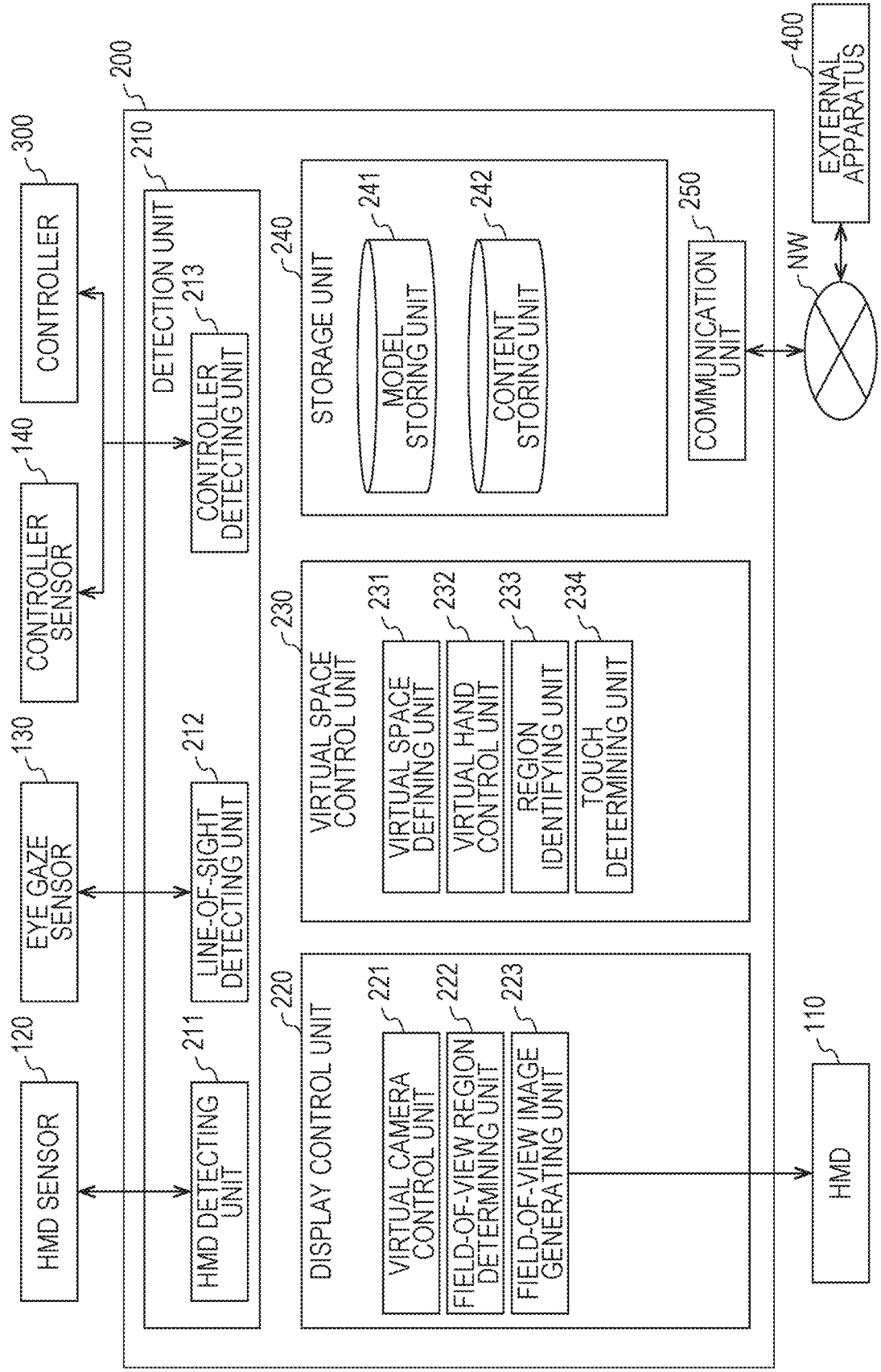
FIG. 8 A block diagram, of a functional configuration of the control circuit unit according to at least one embodiment.

FIG. 8 is a block, diagram of the functional configuration of the control circuit unit 200 according to at least one embodiment. The control circuit, unit 200 is configured to use various types of data received from the HMD sensor 120, the controller sensor 140, the eye gaze sensor 130, and the controller 300 to control the virtual space 2 to be provided to the user, and to control the image display on the display 112 of the HMD 110. In FIG. 8, the control circuit unit 200 includes a detection unit 210, a display control unit 220, a virtual space control unit 230, a storage unit 240, and a communication unit 250. The control circuit unit 200 functions as the detection unit 210, the display control unit 220, the virtual space control unit 230, the storage unit 240, and the communication unit 250 through cooperation between each piece of hardware illustrated in FIG. 2. The detection unit 210, the display control unit 220, and the virtual space control unit 230 may implement their functions mainly through cooperation between the processor and the memory. The storage unit 240 may implement its function mainly through cooperation between the memory and the storage. The communication unit 250 may implement its function mainly through cooperation between the processor and the communication interface.

The detection unit 210 is configured to receive the detection values from various sensors (for example, the HMD sensor 120) connected to the control circuit unit 200. Further, the detection unit 210 is configured to execute predetermined processing using the received detection values as necessary. The detection unit 210 includes an HMD detecting unit 211, a line-of-sight detecting unit 212, and a controller detection unit 213. The HMD detecting unit 211 is configured to receive a detection value from each of the HMD 110 and the HMD sensor 120. The line-of-sight detecting unit 212 is configured to receive a detection value from the eye gaze sensor 130. The controller detection unit 213 is configured to receive the detection values from the controller sensor 104, the right controller 320, and the left controller 330.

The display control unit 220 is configured to control the image display on the display 112 of the HMD 110. The display control unit 220 includes a virtual camera control unit 221, a field-of-view region determining unit 222, and a field-of-view image generating unit 223. The virtual camera control unit 221 is configured to arrange the virtual camera 1 in the virtual space 2, and to control the behavior of the virtual camera 1 in the virtual space 2. The field-of-view region determining unit 222 is configured to determine the field-of-view region 23. The field-of-view image generating unit 223 is configured to generate the field-of-view image 26 to be displayed on the display 112 based on the determined field-of-view region 23.

The virtual space control unit 230 is configured to control the virtual space 2 to be provided to the user. The virtual space control unit 230 includes a virtual space defining unit 231, a virtual hand control unit 232, a region identifying unit 233, and a touch determining unit 234.

The virtual space defining unit 231 is configured to generate virtual space data representing the virtual space 2 to be provided to the user, to thereby define the virtual space 2 in the HMD system 100. The virtual hand control unit 232 is configured to arrange each virtual hand (virtual right hand and virtual left hand) of the user in the virtual space 2 depending on operations of the right controller 320 and the left controller 330 by the user, and to control behavior of each virtual hand in the virtual space 2. The region identifying unit 233 is configured to set a determination region for determining touch with an operation target object (e.g., virtual hand), which is operated by the user, to at least one of objects in the virtual space 26, namely, to at least one of virtual objects. The touch determining unit 234 is configured to determine whether or not the virtual object to which the determination region is set and the operation target object have touched each other based on the positional relationship between the determination region and the operation target object.

The storage unit 240 stores various types of data to be used by the control circuit unit 200 to provide the virtual space 2 to the user. The storage unit 240 includes a model storing unit 241 and a content storing unit 242. The model storing unit 241 stores various types of model data representing the model of the virtual space 2. The content storing unit 242 stores various types of content that can be played in the virtual space 2.

The model data includes spatial structure data that defines the spatial structure of the virtual space 2. The spatial structure data is data that defines, for example, the spatial structure of the entire celestial sphere of 360° about the center 21. The model data further includes data that defines the XYZ coordinate system of the virtual space 2. The model data further includes coordinate data that identifies the position of each mesh section forming the celestial sphere in the XYZ coordinate system. Further, the model data may further include a flag for representing whether or not the virtual object can be arranged in the virtual space 2.

The content is content that can be played in the virtual space 2. In at least one embodiment, the content is game content. The content contains at least a background image of the game and data for defining virtual objects (e.g., character and item) appearing in the game. Each piece of content has a preliminarily defined initial direction toward an image to be presented to the user under the initial state (at the activation) of the HMD 110.

The communication unit 250 is configured to transmit or receive data to or from an external apparatus 400 (for example, a game server) via the network NW.

(Processing Provided for Virtual Space 2)

Figure 9:
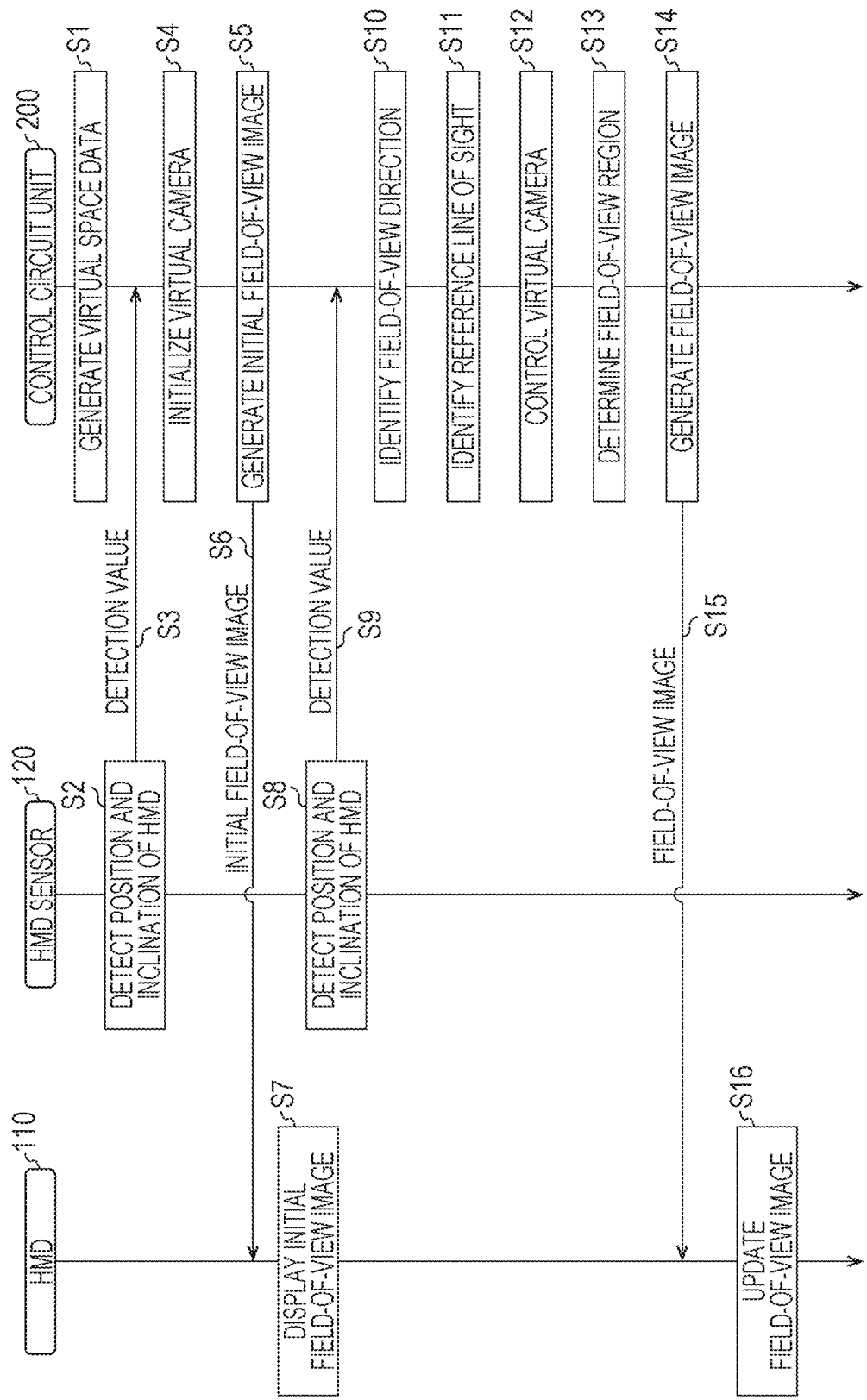
FIG. 9 A sequence diagram of a flow of processing performed by the HMD system, to provide the virtual space to the user according to at least one embodiment.

FIG. 9 is a sequence diagram of a flow of processing performed by the HMD system 100 to provide the virtual space 2 to the user according to at least one embodiment. The virtual space 2 is basically provided to the user through cooperation between the HMD 110 and the control circuit unit 200. When the processing in FIG. 9 is started, first, in Step S1, the virtual space defining unit 231 generates virtual space data representing the virtual space 2 to be provided to the user, to thereby define the virtual space 2. The procedure of the generation is as follows. First, the virtual space defining unit 231 acquires model data of the virtual space 2 from the model storing unit 241, to thereby define the original form of the virtual space 2. The virtual space defining unit 231 further acquires content to be played in the virtual space 2 from the content storing unit 242. In at least one embodiment, the content is game content.

The virtual space defining unit 231 adapts the acquired content to the acquired model data, to thereby generate the virtual space data that defines the virtual space 2. The virtual space defining unit 231 associates as appropriate each partial image forming the background image included in the content with management data of each mesh section forming the celestial sphere of the virtual space 2 in the virtual space data. In at least one embodiment, the virtual space defining unit 231 associates each partial image with each mesh section so that the initial direction defined for the content matches with the Z direction in the XYZ coordinate system of the virtual space 2.

As necessary, the virtual space defining unit 231 further adds the management data of each virtual object included in the content to the virtual space data. At this time, coordinates representing the position at which the corresponding virtual object is arranged in the virtual space 2 are set to the management data. With this, each virtual object is arranged at a position of the coordinates in the virtual space 2.

After that, when the HMD 110 is activated by the user, in Step S2, the HMD sensor 120 detects the position and the inclination of the HMD 110 in the initial state, and in Step S3, outputs the detection values to the control circuit unit 200. The HMD detecting unit 211 receives the detection values. After that, in Step S4, the virtual camera control unit 221 initializes the virtual camera 1 in the virtual space 2.

The procedure of the initialization is as follows. First, the virtual camera control unit 221 arranges the virtual camera 1 at the initial position in the virtual space 2 (for example, the center 21 in FIG. 4). Next, the direction of the virtual camera 1 in the virtual space 2 is set. At this time, the virtual camera control unit 221 may identify the uvw visual-field coordinate system of the HMD 110 in the initial state based on the detection values from the HMD sensor 120, and set, for the virtual camera 1, the uvw visual-field coordinate system that matches with the uvw visual-field coordinate system of the HMD 110, to thereby set the direction of the virtual camera 1. When the virtual camera control unit 221 sets the uvw visual-field coordinate system, for the virtual camera 1, the roll direction (w axis) of the virtual camera 1 is adapted to the Z direction (Z axis) of the XYZ coordinate system. Specifically, the virtual camera control unit 221 matches the direction obtained by projecting the roll direction of the virtual camera 1 on an XZ plane with the Z direction of the XYZ coordinate system, and matches the inclination of the roll direction of the virtual camera 1 with respect to the XZ plane with the inclination of the roll direction of the HMD 110 with respect to a horizontal plane. Such adaptation processing enables adaptation of the roll direction of the virtual camera 1 in the initial state to the initial direction of the content, and hence the horizontal direction in which the user first faces after the playing of the content is started can be matched with the initial direction of the content.

After the initialization processing of the virtual camera 1 is ended, the field-of-view region determining unit 222 determines the field-of-view region 23 in the virtual space 2 based on the uvw visual-field coordinate system of the virtual camera 1. Specifically, the roll direction (w axis) of the uvw visual-field coordinate system of the virtual camera 1 is identified as the reference line of sight 5 of the user, and the field-of-view region 23 is determined based on the reference line of sight 5. In Step S5, the field-of-view image generating unit 223 processes the virtual space data, to thereby generate (render) the field-of-view image 26 corresponding to the part of the entire virtual space image 22 developed in the virtual space 2 to be projected on the field-of-view region 23 in the virtual space 2. In Step S6, the field-of-view image generating unit 223 outputs the generated field-of-view image 26 as an initial field-of-view image to the HMD 110. In Step S7, the HMD 110 displays the received initial field-of-view image on the display 112. With this, the user visually is able to recognize the initial field-of-view image.

After that, in Step S8, the HMD sensor 120 detects the current position and inclination of the HMD 110, and in Step S9, outputs the detection values thereof to the control circuit unit 200. The HMD detecting unit 211 receives each detection value. The virtual camera control unit 221 identifies the current uvw visual-field coordinate system in the HMD 110 based on the detection values of the position and the inclination of the HMD 110. Further, in Step S10, the virtual camera control unit 221 identifies the roll direction (w axis) of the uvw visual-field coordinate system in the XYZ coordinate system as a field-of-view direction of the HMD 110.

In at least one embodiment, in Step S11, the virtual camera control unit 221 identifies the identified field-of-view direction of the HMD 110 as the reference line of sight 5 of the user in the virtual space 2. In Step S12, the virtual camera control unit 221 controls the virtual camera 1 based on the identified reference line of sight 5. The virtual camera control unit 221 maintains the position and the direction of the virtual camera 1 when the position (origin) and the direction of the reference line of sight 5 are the same as those in the initial state of the virtual camera 1. Meanwhile, when the position (origin) and/or the direction of the reference line of sight 5 are/is changed from those in the initial state of the virtual camera 1, the position and/or the inclination of the virtual camera 1 in the virtual space 2 are/is changed to the position and/or the inclination that are/is based on the reference line of sight. 5 obtained after the change. Further, the uvw visual-field coordinate system is reset with respect to the virtual camera 1 subjected to control.

In Step S13, the field-of-view region determining unit 222 determines the field-of-view region 23 in the virtual space 2 based on the identified reference line of sight 5. After that, in Step S14, the field-of-view image generating unit 223 processes the virtual space data to generate (render) the field-of-view image 26 that is a part of the entire virtual space image 22 developed in the virtual space 2 to be projected onto (superimposed with) the field-of-view region 23 in the virtual space 2. In Step S15, the field-of-view image generating unit 223 outputs the generated field-of-view image 26 as a field-of-view image for update to the HMD 110. In Step S16, the HMD 110 displays the received field-of-view image 26 on the display 112 to update the field-of-view image 26. With this, when the user moves the HMD 110, the field-of-view image 26 is updated in synchronization therewith.

(Provision of Virtual Space Game)

In at least one embodiment, the user operates the right controller 320 and the left controller 330 to play a game in the virtual space 2. In this game, the user can use an operation target object that operates in synchronization with movement of a part of the body of the user other than the head, to thereby touch another virtual object. The control circuit, unit 200, sets, to a virtual object that can be touched by the operation target object, the determination region for determining whether or not the virtual object has touched the operation target object, which contains at least a part extending in an extension direction that is based on the position of the virtual camera 1 or the reference line of sight 5. A description thereof is given in detail later. With this, the user can cause the operation target object to touch another virtual object by an intuitive operation. The game may be a card, game, for example. In this case, the operation target object may be a virtual hand, and another virtual object may be a card object (virtual object having appearance and shape that emulate those of real card) that can be selected by the user. Even when the virtual object is a thin card, the user can touch the virtual card object with the virtual hand through an intuitive operation by setting the determination region.

Figure 10:
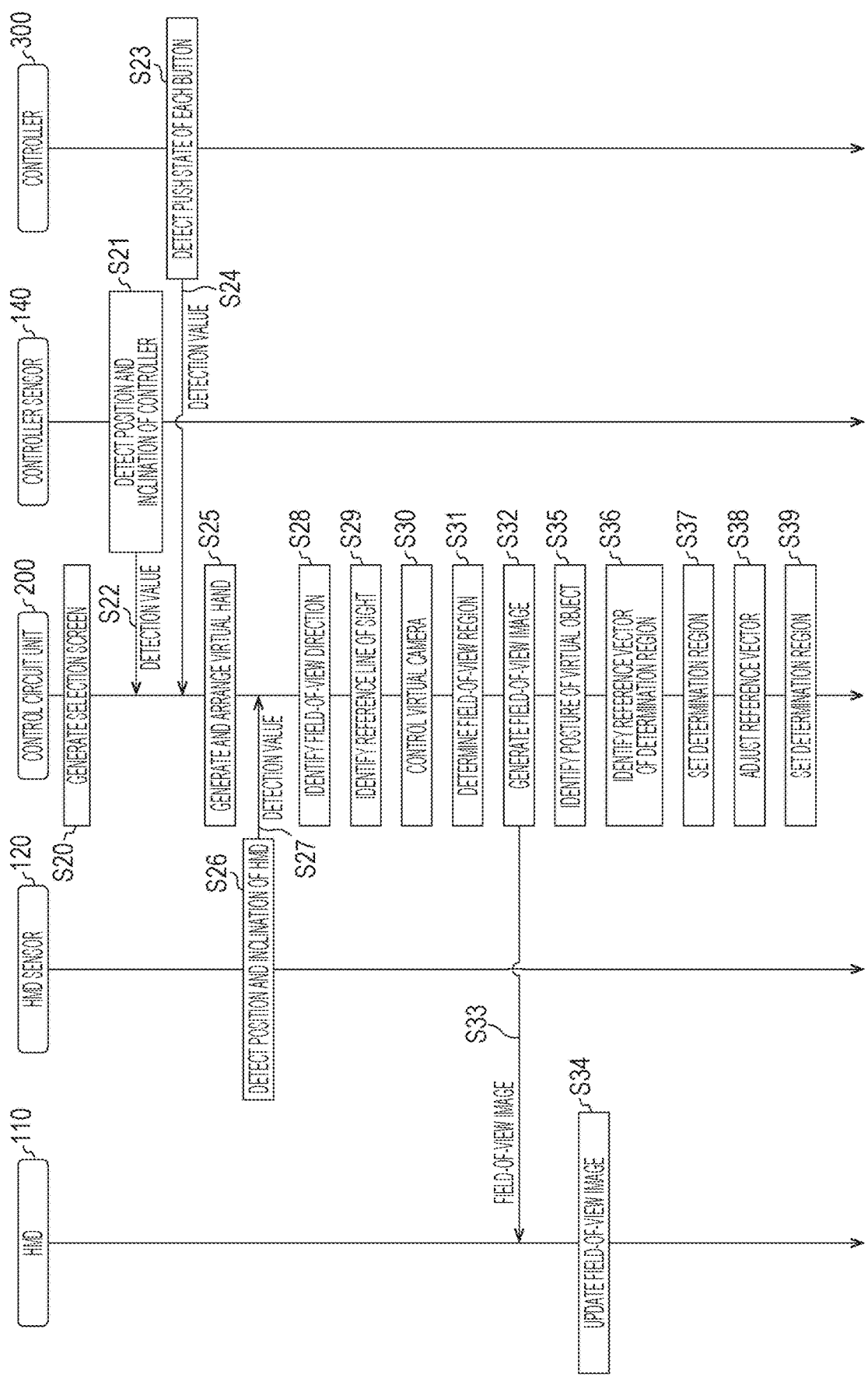
FIG. 10 A sequence diagram of a flow of processing performed during a game in the virtual space according to at least one embodiment.

FIG. 10 is a sequence diagram of a flow of processing performed during the game in the virtual space 2 according to at least one embodiment. In Step S20, the virtual space defining unit 231 reads partial images forming a selection screen from the content storage unit 242, and associates, in the virtual space data, the partial images with management data on meshes forming the celestial sphere of the virtual space 2. Further, the virtual space defining unit 231 adds management data on each virtual object contained in the selection screen to the virtual space data. The management data on each virtual object contains data on the shape of the virtual object and the position (coordinates) and inclination (posture) of the virtual object in the virtual space 2. When the management data is added to the virtual space data, coordinates for representing a position at which the corresponding virtual object is arranged in the virtual space 2 are set to each management data. The virtual object is a virtual object that is selectable by the user, for example, a virtual card object.

In Step S21, the controller sensor 140 detects the position and inclination of the right controller 320, and detects the position and inclination of the left controller 330. In Step S22, the controller sensor 140 transmits the detection values to the control circuit unit 200. The controller detecting unit 213 receives those detection values.

In Step S23, the controller 300 detects the push state of each button. Specifically, the right controller 320 detects the push states of the thumb button 302*a*, the index finger button 302*e*, and the middle finger button 302*f*. On the other hand, the left controller 330 detects the push states of the thumb button 302*c*, the index finger button 302*g*, and the middle finger button 302*h*. In Step S24, the right controller 320 and the left controller 330 transmit those detection values to the control circuit unit 200. The controller detecting unit 213 receives those detection values.

In Step S25, the virtual hand control unit 232 uses the received detection values to generate each virtual hand (virtual right hand and virtual left hand) of the user in the virtual space 2. Specifically, the virtual hand control unit 232 generates the shape of the virtual right hand, data for defining the position and inclination in the virtual space 2, and data for defining the virtual left hand, and adds those pieces of data to the virtual space data.

The virtual hand control unit 232 uses the detection values of the position and inclination of the right controller 320 and the detection values of push states of respective buttons of the right controller 320 to define the virtual right hand of the user. In that case, the position of the right controller 320 in the global coordinate system is defined as the position of the virtual right hand in the virtual space 2. Then, the virtual hand control unit 232 sets the uvw visual-field coordinate system, which is synchronized with the uvw visual-field coordinate system set to the right controller 320, to the virtual right hand based on the detection value of the inclination of the right controller 320, to thereby define the inclination of the virtual right hand in the virtual space 2.

Then, the virtual hand control unit 232 defines the display states of the right, thumb, the right, index finger, and the right, middle finger forming the virtual right hand based on the detection values of the thumb button 302*a*, the index finger button 302*e*, and the middle finger button 302*f* of the right controller 320. The display states of the right ring finger and the right little finger are defined to match the right middle finger.

When the detection value of the push state of a certain button is "0" (indicating no activation of the button), the virtual hand control unit. 232 defines a state of the finger being extended completely, or in a relaxed state, as the display state of the finger of the virtual hand corresponding to the button. On the other hand, when the push state of a certain button is "1" (indicating full activation of the button), the virtual hand control unit 232 defines a state of the finger being folded completely, or in a grasping state, as the display state of the finger of the virtual hand corresponding to the button. Further, when the push state of a certain button is "in-between (value between 0 and 1)" (indicating partial activation of the button for analog detection), the virtual hand control unit 232 defines a display state of the finger being folded to a degree corresponding to the push state as the display state of the finger of the virtual hand corresponding to the button.

Similarly, the virtual hand control unit 232 defines the position and inclination of the virtual left hand and the state of each finger in the virtual space 2 based on the detection values of the left controller 330. With this processing, the virtual hand control unit 232 arranges the virtual right hand and the virtual left hand in the virtual space 2.

Processing of from Step S26 to Step S34 is similar to the processing of from Step S8 to Step S16 of FIG. 9. Through the processing of from Step S26 to Step S34, the field-of-view image 26, which is a part projected (superimposed) on the field-of-view region 23 within the selection screen generated in Step S20, is displayed on the display 112.

In Step S35, the region identifying unit 233 identifies the posture of each virtual object contained in the selection screen. The processing of Step S35 may be performed only for the virtual object that is selected by the user, and does not need to be performed for all the virtual objects contained in the virtual space 2. The same holds true for the processing of from Step S36 to Step S39. The posture of the virtual object can be identified by referring to the management data of the virtual object.

In Step S36, the region identifying unit 233 identifies the reference vector for setting the determination region to be used for determination of whether or not the virtual object and the virtual hand have touched each other. The start point of the reference vector indicates the start point of the determination region, and is determined based on the posture identified in Step S35. Specifically, the region identifying unit 233 identifies the region that is displayed as the field-of-view image 26 in the virtual object based on the posture identified in Step S35, and sets the start point of the reference vector in the region. For example, when the virtual object is a card, the start point may be set to the central position of the card surface (surface facing virtual camera 1). The magnitude of the reference vector indicates the depth of the determination region, and may be determined depending on how far away from the virtual object the determination region is extended. The direction of the reference vector indicates a direction in which the determination region extends. For example, when the virtual object is a card, the normal direction of the card surface may be set as the direction of the reference vector.

In Step S37, the region identifying unit 233 sets the determination region with the identified reference vector serving as the reference. The region identifying unit 233 may set the determination region in a section between the start point and the end point of the reference vector so that the determination region extends in the direction of the reference vector. For example, the determination region may be set as a region formed by passage of a virtual object when the virtual object is moved along the reference vector from the start point to the end point.

In Step S38, the region identifying unit 233 adjusts the reference vector identified in Step S36 based on the position of the virtual camera 1 or the direction of the reference line of sight 5 (direction of virtual camera 1). The adjustment of a reference vector based on the position of the virtual camera 1 is described later with reference to FIGS. 12A and 12B. The adjustment of the reference vector based on the direction of the reference line of sight 5 is described later with reference to FIGS. 13A and 13B and FIGS. 14A and 14B.

In Step S39, the region identifying unit 233 again sets the determination region with the adjusted reference vector serving as the reference, and the determination region is adjusted to an appropriate range that fits the position of the virtual camera 1 or the direction of the reference line of sight 5. Whether or not the virtual object and the virtual hand have touched each other based on the adjusted determination region is determined, which is described in detail later with reference to FIG. 11.

When the position of the virtual camera 1 or the direction of the reference line of sight 5 has changed, the processing of Step S38 or Step S39 is executed again. That is, the processing of from Step S28 to Step S32 is performed based on the detection values newly received from the HMD sensor 120, and when the position of the virtual camera 1 and/or the direction of the reference line of sight 5 have/has changed, processing of Step S38 and Step S39 is performed based on the changed position of the virtual camera 1 and/or the direction of the reference line of sight 5. With this, even when the user wearing the HMD 110 during display of the selection screen has moved or tilted the head in the real space, the user can maintain the state of being capable of touching the virtual object easily with the virtual hand.

(Processing after Determination Region is Set)

Figure 11:
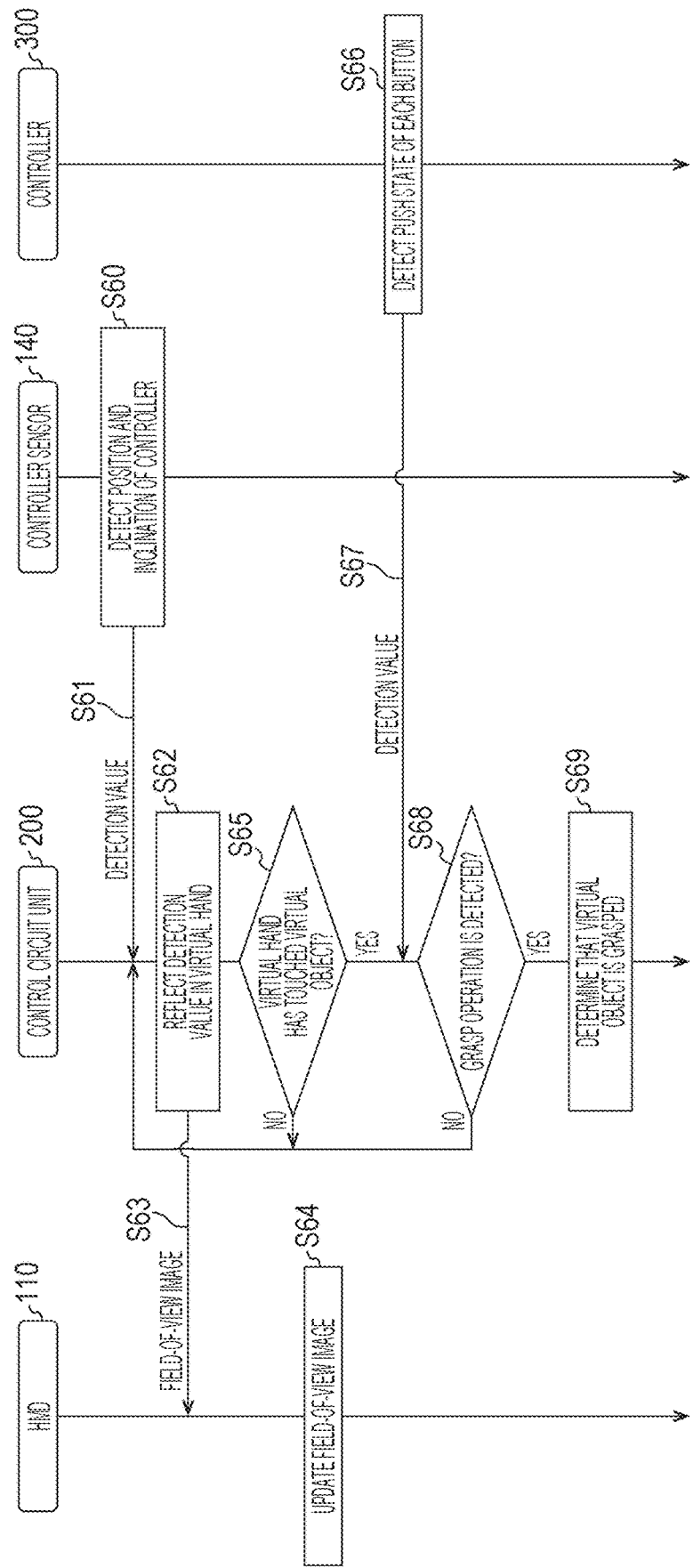
FIG. 11 A sequence diagram of a flow of processing performed after a determination region is set in the game in the virtual space according to at least one embodiment.

Now, a description is given of processing after the region identifying unit 233 has set the determination region with reference to FIG. 11. In Step S60, the controller sensor 140 detects the position and inclination of the right controller 320, and detects the position and inclination of the left controller 330. In Step S61, the controller sensor 140 transmits the detection values to the control circuit unit 200. The controller detecting unit 213 receives those detection values.

In Step S62, the virtual hand control unit 232 uses the received detection values to update the position and inclination of each virtual hand (virtual right hand and virtual left hand) of the user in the virtual space 2. Specifically, the position of the virtual right hand in the virtual space 2 is updated to the current position of the right controller 320 in the global coordinate system. Further, the virtual hand control unit 232 updates the inclination of the virtual right hand in the virtual space 2 based on the detection value of the inclination of the right controller 320. Similarly, the virtual hand control unit 232 updates the position and inclination of the virtual left hand in the virtual space 2 based on the detection values of the left controller 330. In Step S63, the field-of-view image generating unit 223 generates the field-of-view image 26 for which the position and inclination of the virtual hand are updated for output to the HMD 110. Then, in Step S64, the HMD 110 displays the received field-of-view image 26 on the display 112, and thus the field-of-view image 26 recognized by the user is updated in this manner.

In Step S65, the touch determining unit 234 determines whether or not the virtual hand has touched the virtual object. Specifically, the touch determining unit 234 determines whether or not the determination region adjusted in Step S39 of FIG. 10 and the region occupied by the virtual hand in the virtual space 2 overlaps with each other. When the touch determining unit 234 determines that there is no overlapping part (NO in Step S65), the processing returns to the head of the flow in FIG. 11. On the other hand, when the touch determining unit 234 determines that there is an overlapping part (YES in Step S65), the touch determining unit 234 determines whether or not a grasp operation is detected based on the detection values indicating the push states of respective buttons detected (Step S66) and transmitted (Step S67) to the control circuit unit 200 by the controller 300 (Step S68). The kind of operation defined as the grasp operation is not particularly limited, but for example, the operation of pushing buttons corresponding to the thumb, the pointing finger, and the middle finger of the virtual hand until those fingers touch one another may be defined as the grasp operation.

When the touch determining unit 234 determines that a grasp operation is not performed (NO in Step S68), the processing returns to the start of the flow in FIG. 11. On the other hand, when the touch determining unit 234 determines that the grasp operation is performed (YES in Step S68), the touch determining unit 234 determines that a virtual object is grasped (Step S69). Processing to be executed after the touch determining unit 234 determines that the virtual object is grasped may be defined depending on the content of the game. For example, the touch determining unit 234 may associate the grasped virtual object with the grasping virtual hand, and may move the virtual object in synchronization with the virtual hand when the virtual hand is moved. This association may be canceled, for example, when the state of the virtual object being grasped by the virtual hand is canceled (when operation of extending grasping finger is performed).

(Adjustment of Reference Vector based on Position of Virtual Camera 1)

Figure 12A:
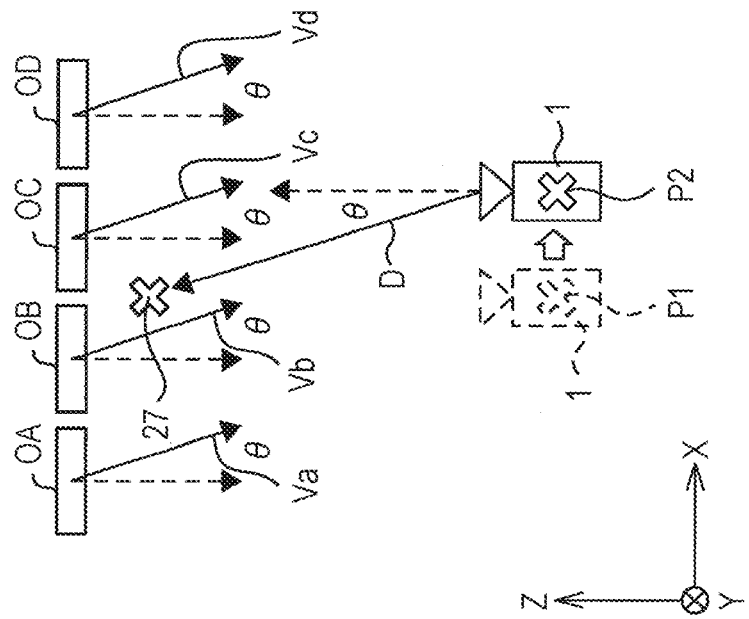
FIG. 12A A diagram of a method of adjusting a reference vector that is based on a position of a virtual camera according to at least one embodiment.
Figure 12B:
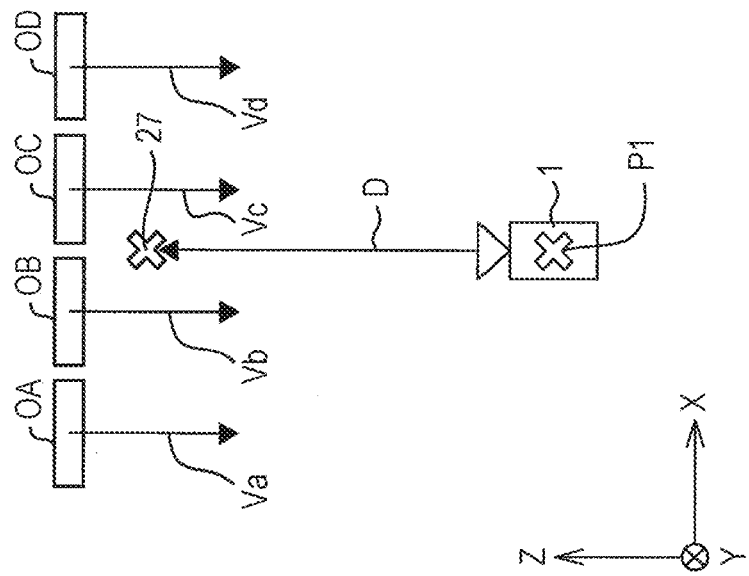
FIG. 12B A diagram of a method of adjusting a reference vector that is based, on a position of a virtual camera according to at least one embodiment.

In FIGS. 12A and 12B, the virtual camera 1, virtual objects OA to OD to be selected by the user, and the reference position 27 as viewed in the Y-axis direction of the virtual space 2 according to at least one embodiment. In FIG. 12A, the solid arrows Va to Vd starting from around the centers of the surfaces (surfaces facing virtual camera 1) of the respective virtual objects OA to OD indicate the reference vectors. The start points of the reference vectors Va to Vd may be surfaces of the virtual objects OA to OD, or may be inside the virtual objects OA to OD at locations other than a center.

In Step S38 of FIG. 10, when the reference vector is adjusted based on the position of the virtual camera 1, the region identifying unit 233 sets the reference position 27 to a corresponding position (e.g., vicinities of virtual object OA to OD) in the virtual space 2. The reference position 27 is set to identify the amount of variation in the direction of the reference line of sight. 5 and the amount of variation in the direction of the reference line of sight that depends on the amount of variation in the position of the virtual camera 1. In the example of FIGS. 12A and 12B, the reference position 27 is set at a position that is closer to the virtual camera 1 than the surfaces of the virtual objects OA to OD, which are arranged in a row in the X-axis direction and facing the virtual camera 1, and is positioned between the virtual objects OB and OC among the four virtual objects OA to OD. The reference position 27 being a position identified based on the positions of the virtual objects OA to OD is sufficient, and may be set in the internal region of the virtual objects OA to OD or may be set in the outer region of the virtual objects OA to OD.

As in at least one example, one reference position 27 can be set to a plurality of virtual objects to adjust the reference vectors of the plurality of virtual objects at the same time and suppress the load of arithmetic processing. When the load of arithmetic processing is large, the reference position 27 may be set to each of the virtual objects.

After the reference position 27 is set, the region identifying unit 233 identifies a direction D extending from the position P1 of the virtual camera 1 to the reference position 27. The direction D is almost the same as the line-of-sight direction of the user when the virtual objects OA to OD are selected. Then, the region identifying unit 233 adjusts the reference vectors Va to Yd so that the reference vectors Va to Vd are parallel and opposite to the direction D. In FIG. 12A, when the direction D is parallel to the Z-axis and pointing in the positive direction of the Z-axis, the region identifying unit 233 adjusts the reference vectors Va to Vd so that the reference vectors Va to Vd are pointing parallel to and in the negative direction of the Z-axis. On the other hand, in FIG. 12B, the position of the virtual camera 1 is moved to P2, and thus the direction D has rotated by θ degrees about the Y-axis. Thus, the region identifying unit 233 adjusts the reference vectors Va to Vd through rotation of the reference vectors Va to Vd. The angle of rotation in this adjustment is θ-degrees and the rotation direction is a counterclockwise direction about the Y-axis. The start points of the reference vectors Va to Vd are not changed by the rotation.

In the example described above, the example of adjusting the reference vector without consideration of the Y-axis component of the direction D is described for simplicity of description. However, the reference vector may also be adjusted in consideration of the Y-axis component. In this case, the region identifying unit 233 adjusts the reference vector of a virtual object at a higher position than the virtual camera 1 in the Y-axis direction so that the reference vector is pointing toward the virtual camera 1 (pointing obliquely downward). Similarly, the region identifying unit 233 adjusts the reference vector of the virtual object at a lower position than the virtual camera 1 so that the reference vector is pointing toward the virtual camera 1 (pointing obliquely upward in the Y-axis direction). The determination region is identified based on the reference vector serving as the reference, and thus the user can easily select both of the virtual object at a higher position and the virtual object at a lower position through the adjustment by an intuitive operation of extending hands toward the virtual hand.

(Adjustment of Reference Vector Based on Reference Line of Sight 5)

Figure 13A:
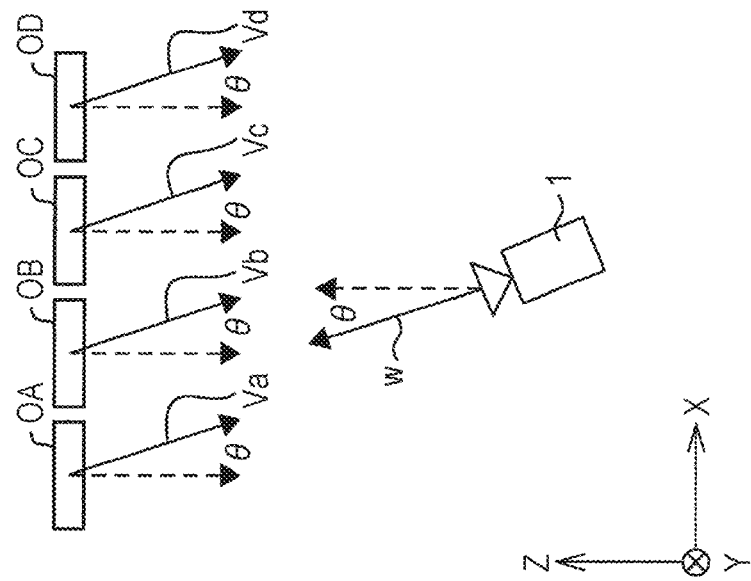
FIG. 13A A diagram of a method of adjusting the reference vector that is based on a direction of the virtual camera and including a virtual object and the virtual camera as viewed in a Y-axis direction of the virtual space according to at least one embodiment.
Figure 13B:
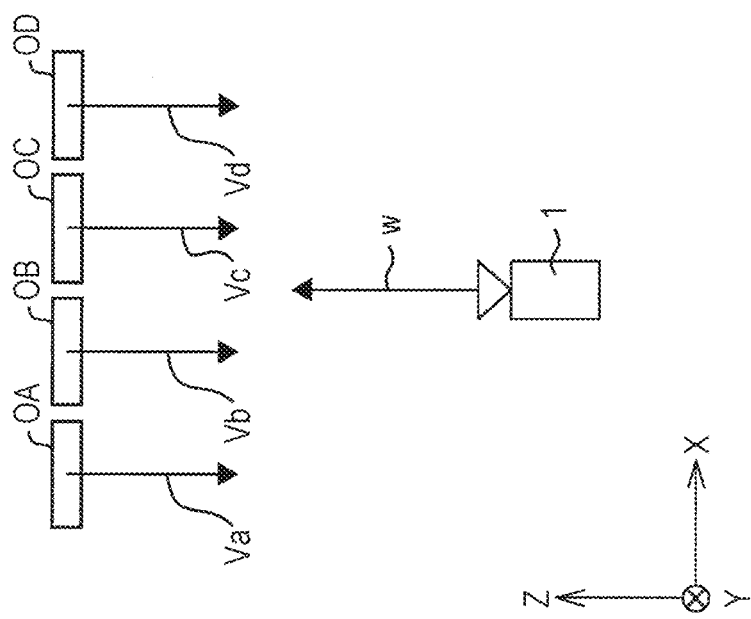
FIG. 13B A diagram of a method of adjusting the reference vector that is based on a direction of the virtual camera and including a virtual object and the virtual camera as viewed in a Y-axis direction of the virtual space according to at least one embodiment.

In FIGS. 13A and 13B, similarly to FIGS. 12A and 12B, the virtual camera 1, the virtual objects OA to OD, and the reference vectors Va to Vd as viewed in the Y-axis direction of the virtual space 2. Further, the roll direction (w-axis direction of FIG. 3 and direction of reference line of sight 5) of the virtual camera 1 is represented by w.

In Step S38 of FIG. 10, when the reference vector is adjusted based on the direction of the reference line of sight 5, the region identifying unit 233 identifies the roll direction w of the virtual camera 1. Then, the region identifying unit 233 adjusts the reference vectors Va to Vd through rotation so that the reference vectors Va to Vd are parallel to the identified roll direction w and are pointing opposite to the roll direction w.

As in the example of FIG. 13A, when the roll direction w is parallel to the Z-axis and is pointing in the positive direction of the Z-axis, the reference vectors Va to Vd are adjusted to be parallel to the Z-axis and pointing in the negative direction of the Z-axis. On the other hand, in the example of FIG. 13B, the roll direction w has rotated by θ degrees in the counterclockwise direction about the Y-axis compared to the example of FIG. 13A. Thus, the region identifying unit 233 adjusts the reference vectors Va to Vd through rotation so that the reference vectors Va to Vd are pointing parallel and opposite to the roll direction w. The angle of rotation in this adjustment is θ, the rotation direction is the counterclockwise direction about the Y-axis, and the start points of the reference vectors Va to Vd are not changed through rotation.

In the example of FIGS. 14A and 14B, the virtual camera 1, virtual objects OE and OF, and reference vectors Ve and Vf of the virtual objects OE and OF as viewed in the X-axis direction. Similarly to the reference vectors Va to Vd described above, the reference vectors Ve and Vf are also adjusted to be parallel and opposite to the roll direction w.

In the example of FIG. 14A, the roll direction w is parallel to the Z-axis and pointing in the positive direction of the Z-axis. Thus, the region identifying unit 233 adjusts the reference vectors Ve and Vf so that the reference vectors Ve and Vf are parallel to the Z-axis and pointing in the negative direction of the Z-axis.

On the other hand, in the example of FIG. 14B, the roll direction w has rotated by θ degrees in the counterclockwise direction about the X-axis (angle of elevation of virtual camera 1 is θ) compared to the example of FIG. 14(a). Thus, the region identifying unit 233 adjusts the reference vectors Ve and Vf through rotation so that the reference vectors Ve and Vf are pointing parallel and opposite to the roll direction w. The angle of rotation in this adjustment is θ-degrees, the rotation direction is the counterclockwise direction about the X-axis, and the start points of the reference vectors Ve and Vf are not changed through rotation.

As a result, the reference vector Ve of the virtual object OE positioned in the roll direction w from the virtual camera 1 (positioned in front of virtual camera 1) is a vector starting from, the virtual object OE toward the virtual camera 1. On the other hand, the reference vector Vf of the virtual object OF positioned off the roll direction w from the virtual camera 1 is a vector pointing downward from the virtual object OF below the virtual camera 1. (pointing away from virtual camera 1).

Conversely to the example of FIG. 14B, when the roll direction w has rotated in the clockwise direction about the X-axis in an XZ plane (when front side of virtual camera 1 faces downward with respect to horizontal direction), the reference vector Ve is a vector pointing upward above the virtual camera 1 (pointing away from virtual camera 1). On the other hand, the reference vector Vf is a vector pointing toward the virtual camera 1.

As described above, the region identifying unit 233 sets, to a virtual object, the determination region that extends from the virtual object toward the virtual camera 1 when the virtual object is positioned in the front direction of the virtual camera 1, namely, in the front direction of the head of the user wearing the HMD 110. Thus, the user can touch the virtual object by an intuitive operation of extending the hand straight ahead toward the virtual object. On the other hand, the determination region is set to a virtual object, which is positioned off the direction, in the direction of becoming away from the virtual camera 1, and thus the user is less likely to touch such a virtual object. Thus, the user is more likely to touch a virtual object that the user desires to touch, and is less likely to touch a virtual object that the user does not desire to touch.

(Example of Setting Determination Region)

Figure 15A:
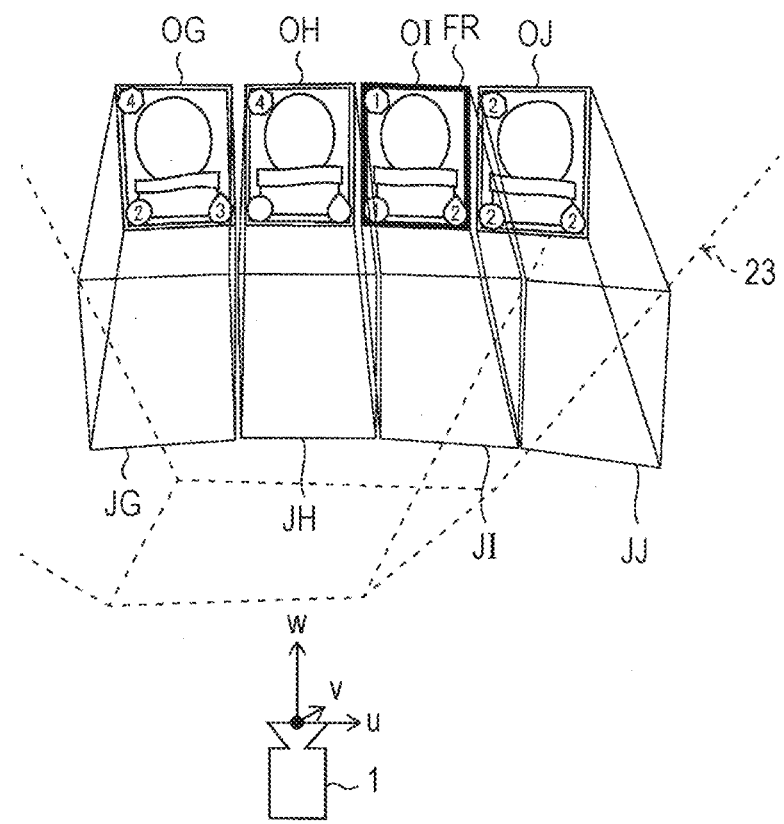
FIG. 15A A diagram of an example of setting the determination region to each of virtual card objects according to at least one embodiment.
Figure 15B:
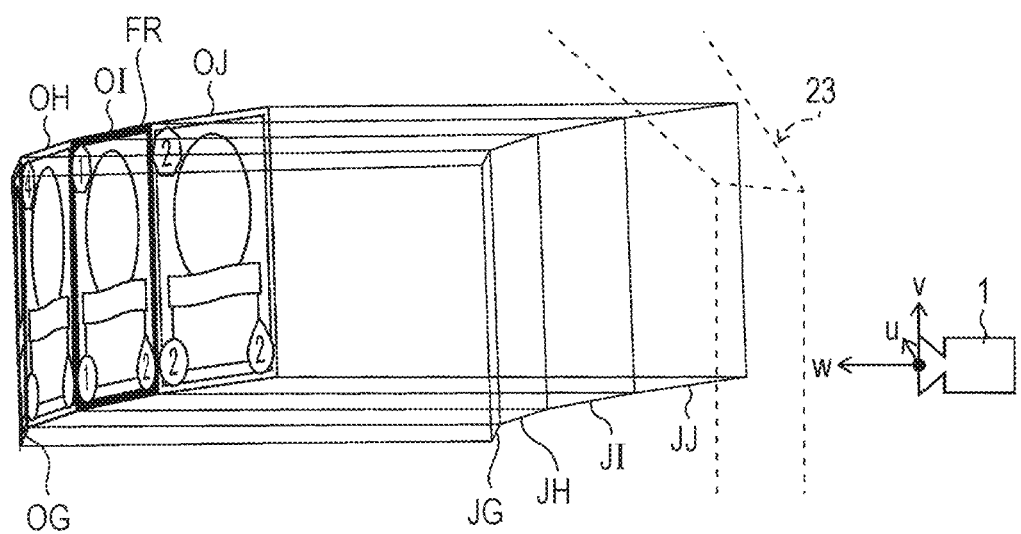
FIG. 15B A diagram of an example of setting the determination region to each of virtual card objects according to at least one embodiment.

FIGS. 15A and 15B are diagrams of an example of setting determination regions JG to JJ to virtual card objects OG to OJ, respectively according to at least one embodiment. In FIG. 15A and FIG. 15B, the set determination regions JG to JJ are the same, and are shown from a different point of view. In FIG. 15B, the virtual objects OG to OJ are arranged on a curve. More specifically, the virtual objects OG to OJ are arranged so that their centers of gravity are arranged on a circular arc or a sphere having the virtual camera 1 as its center and so that the front sides of the virtual objects OG to OJ face the virtual camera 1. Through such an arrangement, the user is more likely to read information displayed on the virtual objects OG to OJ, and is more likely to perform an operation of selecting the virtual objects OG to OJ with a virtual hand. Among the virtual objects OG to OJ, the outer edge of the virtual object OI has a frame line FR. The frame line FP may be displayed, for example, when the virtual hand has entered the determination region JI or when an operation of grasping the virtual object OI is performed with the virtual hand that has entered the determination region JI. The same holds true for the virtual objects OG, OH, and OJ.

The determination regions JG to JJ are regions identified with the reference vector after adjustment (refer to FIGS. 13A and 13B and FIGS. 14A and 14B) in the direction of the reference line of sight 5 serving as the reference. The determination region and the outer edge of the determination region is not displayed as images, in at least one embodiment, but the outer frames of the determination regions JG to JJ are shown in FIGS. 15A and 15B for the sake of clarity. Further, in FIGS. 15A and 15B, the field-of-view region 23 is shown by the broken line.

All of the determination regions JG to JJ are hexahedron regions, and extend from the virtual objects OG to OJ toward the virtual camera 1, respectively. The region identifying unit 233 adjusts the reference vector of the virtual object OG so that the reference vector is pointing parallel and opposite to the roll direction w of the virtual camera 1. Then, the surface of the virtual object OG facing the virtual camera 1 is moved to the end point of the adjusted reference vector along the adjusted reference vector in parallel, and the region identifying unit 233 identifies a side most closest to the virtual camera 1 among the six sides defining the determination region JG. Then, the region identifying unit 233 identifies, as the determination region JG, a hexahedron region having the identified side and a side facing the virtual camera 1 of the virtual object OG as two sides. The determination regions JH to JJ can be identified similarly for the virtual objects OH to OJ.

The roll direction w of the virtual camera 1 is equal to the roll direction of the HMD 110, namely, to the front direction of the face of the user wearing the HMD 110. Thus, in the illustrated example, the user can touch a desired virtual object among the virtual objects OG to OJ displayed in front of the user with the virtual hand (to be precise, user can cause touch determining unit 234 to determine that virtual hand and virtual object have touched each other) by extending the hand holding the right controller 320 or the left controller 330 straight ahead toward the desired virtual object.

In this example, a part of the determination regions JG and JJ is outside the field-of-view region 23, but the determination region may be set only inside the field-of-view region 23. Further, the region identifying unit 233 may identify the determination region without consideration of inside or outside the field-of-view region 23, and may not determine touch with a part outside the field-of-view region 23 at the time of determination of touch (Step S65 of FIG. 11). With this, preventing determination of touch with the virtual object at a position that is not in the field of view of the user is possible. However, those examples include processing of monitoring the field-of-view region 23 and other processing, which results in large processing loads. Thus, identification and touch determination of the determination region are performed, without consideration of the field-of-view region 23 from the viewpoint of suppressing the processing loads, in at least one embodiment.

Figure 16A:
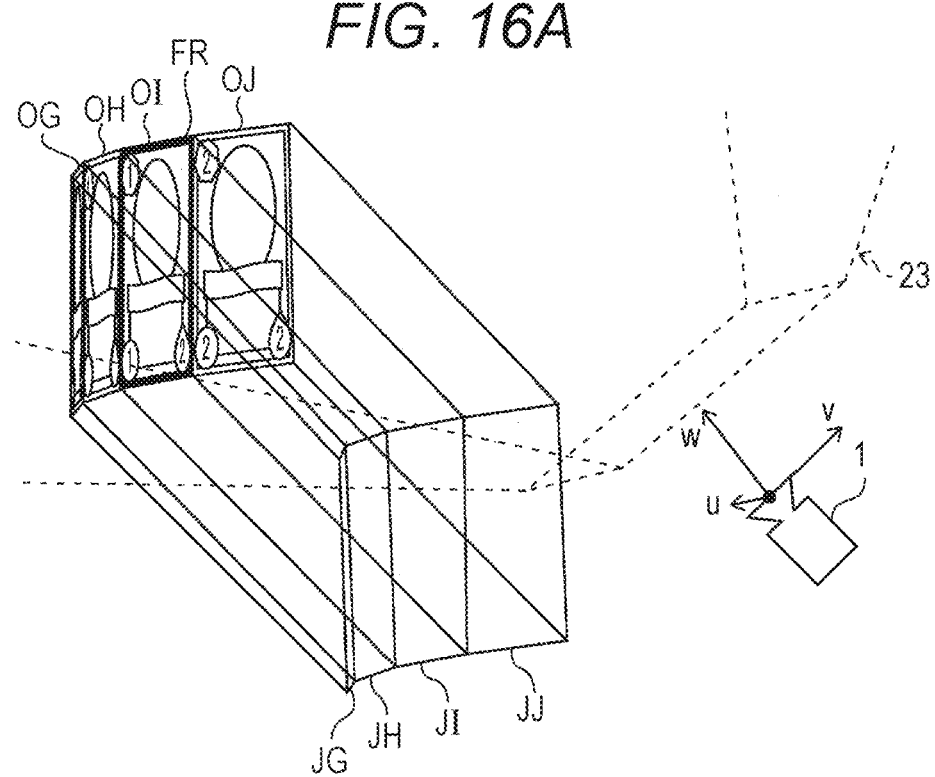
FIG. 16A A diagram of an example of setting the determination region to each of the virtual card objects according to at least one embodiment.

In FIG. 16A, an example of the determination regions JH to JJ in a case where the roll direction of the virtual camera 1 has rotated in the clockwise direction about the X-axis with respect to the XZ plane, namely, in a case where the virtual camera 1 is pointing obliquely upward in the virtual space 2 according to at least one embodiment. In this case, as in FIG. 14B, the reference vectors of the virtual objects OG to OJ are adjusted through rotation in the clockwise direction about the X axis. With this, the determination regions JH to JJ identified with the adjusted reference vectors serving as the reference are regions extending obliquely downward as in FIG. 16A.

Figure 16B:
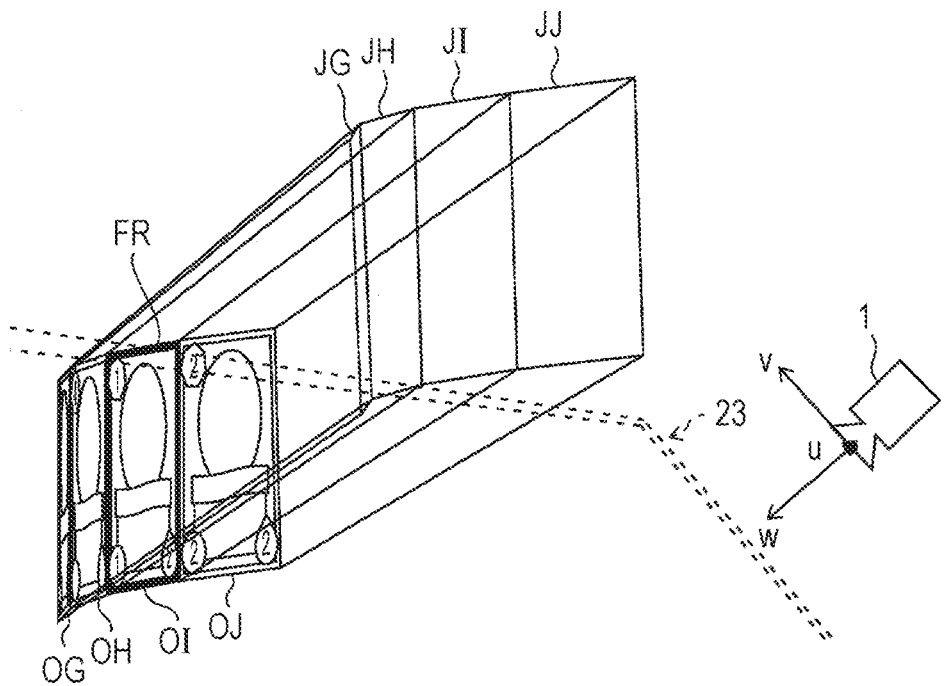
FIG. 16B A diagram of an example of setting the determination region to each of the virtual card objects according to at least one embodiment.

In FIG. 16E, an example of the determination regions JH to JJ in a case where the roll direction of the virtual camera 1 has rotated in the counterclockwise direction about the X-axis with respect to the XZ plane, namely, in a case where the virtual camera 1 is pointing obliquely downward in the virtual space 2 according to at least one embodiment. In this case, the reference vectors of the virtual objects OG to OJ are adjusted through rotation in the counterclockwise direction about the X axis. With this, the determination regions JH to JJ identified with the adjusted reference vectors serving as the reference are regions extending obliquely upward as in FIG. 16B.

FIG. 17 is a sequence diagram of a flow of processing performed during the game in the virtual space 2 according to at least one embodiment. Processing of from Step S20 to Step S34 is similar to the processing of from Step S20 to Step S34 in FIG. 10.

In Step S35-1, similarly to Step S23, the controller 300 detects the push state of each button. In Step S36-1, the controller 300 transmits the detection values to the control circuit unit 200. The controller detecting unit 213 receives those detection values.

In Step S37-1, the virtual space defining unit 231 determines whether or not an object set operation (first operation), which is an operation for setting a virtual object to the virtual hand, is detected based on the received detection values. The type of operation on the controller 300 set as the object set operation may be determined in advance. For example, an operation of pushing the index finger button 302g of the left controller 330 may be set as the object set operation for setting a virtual object to the virtual left hand.

In Step S37-1, when the virtual space defining unit 231 determines that the object set operation is detected (YES in Step S37-1), the virtual space defining unit 231 updates virtual space data so that a plurality of virtual objects are piled up on the virtual hand (preferably, on palm) in the virtual space 2. For example, when virtual objects OA-1 to OD-1 are arranged on the virtual hand in order of OA-1, OB-1, OC-1, and OD-1 from top to bottom, the virtual space defining unit 231 updates the virtual space data by setting the position of the virtual object OD-1 right on the virtual hand. In the same manner, the virtual space defining unit 231 updates the position of the virtual object OC-1 by setting the position of the virtual object OC-1 right on the virtual object OD-1, the position of the virtual object OB-1 right on the virtual object OC-1, and the position of the virtual object OA-1 as right on the virtual object OB-1.

Then, the field-of-view image generating unit 223 generates the field-of-view image 26 based on the updated virtual space data (Step S38-1), and outputs the generated field-of-view image 26 to the HMD 110 as a field-of-view image for update (Step S39-1). In Step S40-1, the HMD 110 displays the received field-of-view image 26 on the display 112 to update the field-of-view image 26. With this, the user recognizes an image in which a plurality of virtual objects are piled up on the virtual hand.

In Step S41-1, similarly to Step S35-1, the controller 300 detects the push state of each button. In Step S42-1, the controller 300 transmits the detection values to the control circuit unit 200. The controller detecting unit 213 receives those detection values.

In Step S43-1, the virtual space defining unit 231 determines whether or not an operation (second operation) of spreading virtual objects set to the virtual hand is detected based on the received detection values. The kind of operation on the controller 300 defined as the operation of spreading virtual objects may be determined in advance. For example, an operation of tilting the analog stick 302j after the thumb button 302c of the left controller 330 is completely pushed down under a state in which the virtual objects are arranged on the virtual left hand may be defined as the operation of spreading virtual objects. Further, for example, when the top surface 332 of the left controller 330 is formed of a touch panel, a swipe operation on the touch panel may be defined as an operation of spreading the virtual objects. In addition to this, for example, the virtual space defining unit 231 may determine that the operation of spreading virtual objects is performed when the thumb of the user is detected to move to spread virtual objects based on a result of optically detecting movement of the thumb of the user. With this, the user can also spread virtual card objects in the virtual space 2 by an intuitive operation of moving the thumb with the same feeling as when the user spreads cards on the real hand.

In Step S43-1, when the virtual space defining unit 231 determines that the operation of expanding virtual objects is detected (YES in Step S43-1), the virtual space defining unit 231 updates the virtual space data so that the plurality of virtual objects piled up on the virtual hand are spread. The state of the plurality of virtual objects being spread is a state in which the area of a part (part overlapping with another virtual object) of a virtual object, which is in a blind spot of the virtual camera 1 caused by another virtual object, becomes smaller. For example, when the virtual objects piled up on the virtual hand are virtual card objects, the state of virtual objects being spread may be a state of the virtual objects being displaced from one another like a fan.

In Step S44-1, the field-of-view image generating unit 223 generates the field-of-view image 26 based on the updated virtual space data, and in Step S45-1, outputs the field-of-view image 26 to the HMD 110 as a field-of-view image for update. In Step S46-1, the HMD 110 displays the received field-of-view image 26 on the display 112 to update the field-of-view image 26. With this, the user recognizes an image in which the plurality of virtual objects are spread in an overlapping manner on the virtual hand.

In Step S47-1, the region identifying unit 233 sets the determination region to be used for determining whether or not the virtual object and the virtual hand have touched each other. Details of processing of setting the determination region are described later with reference to FIG. 19.

(Example of Image to be Displayed)

Figure 18A:
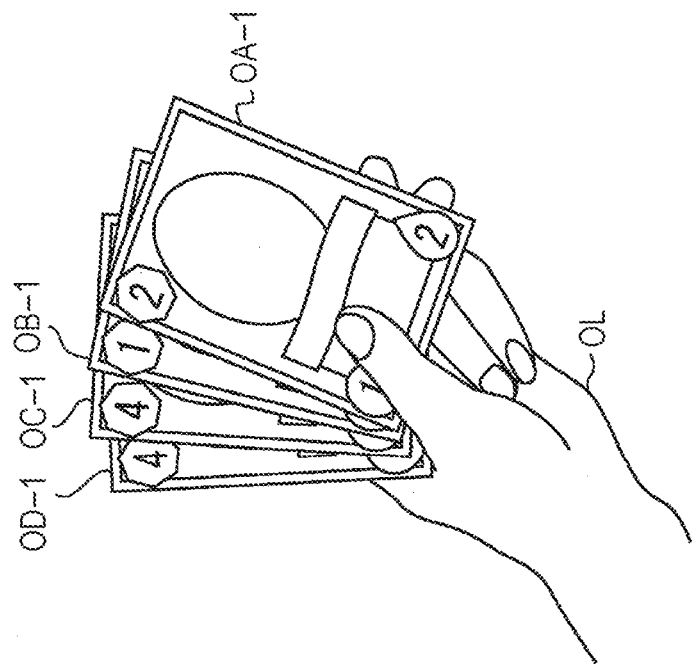
FIG. 18A A diagram of a state of grasping the virtual card objects according to at least one embodiment.

The field-of-view image 26 to be generated in Step S38-1 of FIG. 17 may be, for example, an image of FIG. 18A. In this example, the virtual objects OA-1 and OB-1, which are virtual card objects, are grasped by a virtual left, hand OL. The virtual object OA-1 is arranged so that its picture faces forward (toward virtual camera 1), and thus the user can recognize which card the virtual object OA-1 is. On the other hand, the virtual object OB-1 is positioned back, of the virtual object OA-1, and a large part thereof is a blind spot caused by the virtual object OA-1. Thus, the user cannot recognize which card the virtual object OB-1 is. A plurality of virtual objects are arranged back of the virtual object OB-1 as well and hidden by the virtual objects OA-1 and OB-1. Thus, those virtual objects are not displayed.

Figure 18B:
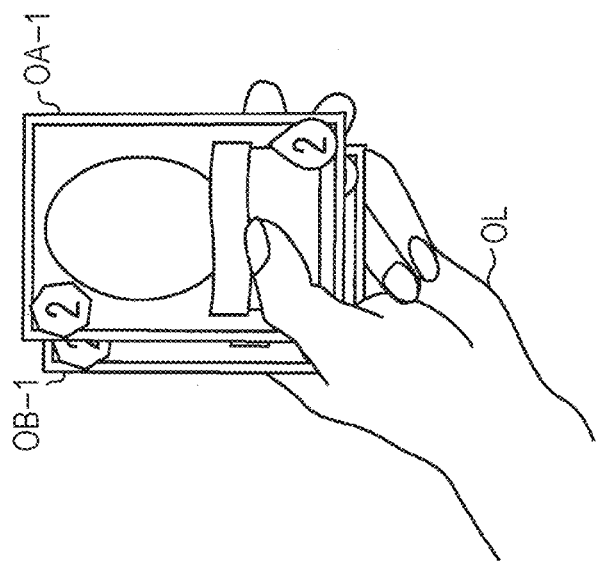
FIG. 18B A diagram of a state of grasping the virtual card objects according to at least one embodiment.

The field-of-view image 26 to be generated in Step S44-1 of FIG. 17 may be, for example, an image of FIG. 18B. In this example, the virtual objects OA-1 to OD-1, which are virtual card objects, are grasped by the virtual left hand OL. Compared to the diagram of FIG. 18A, the positions of the virtual objects OA-1 and OB-1 on the virtual left hand. OL have changed, and thus the area of the over lapping part between the virtual objects OA-1 and OB-1 has become smaller. Further, the virtual objects OC-1 and OD-1, which are hidden by the virtual objects OA-1 and OB-1 and cannot be recognized in FIG. 18A, can now be recognized. As a result, displayed, upper left numbers of the virtual objects OB-1 to OD-1, which cannot, recognized in the image of FIG. 18A, can now be read.

(Processing of Setting Determination Region)

Figure 19:
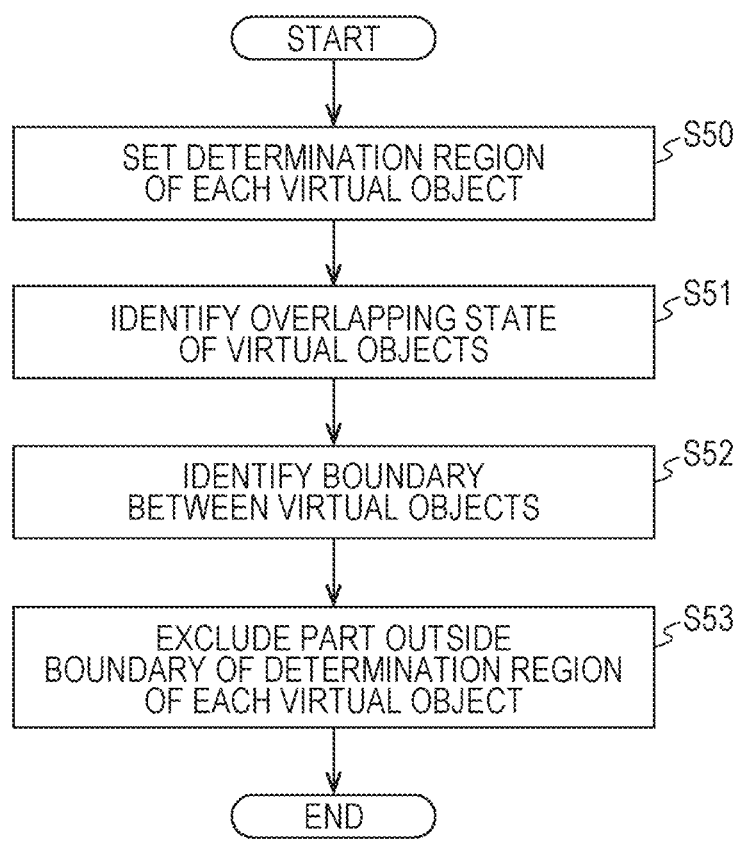
FIG. 19 A diagram of the method of adjusting the reference vector that is based on the position of the virtual camera according to at least one embodiment.

Now, a description is given of details of processing of setting the determination region (Step S47-1 of FIG. 17) by the region identifying unit 233 with reference to FIG. 19. In Step S50, the region identifying unit 233 sets the determination region of each virtual object. The determination region is set to a region surrounding the virtual object so that the region contains at least a part extending from the virtual object toward the virtual camera 1. The region identifying unit 233 associates the set determination region with the corresponding virtual object. The determination region set in Step S50 is described later with reference to FIG. 20.

In Step S51, the region identifying unit 233 identifies the overlapping state of virtual objects, namely, which virtual object overlaps with another virtual object, and which of the overlapping virtual objects is closest to the virtual camera 1 from the viewpoint of the virtual camera 1. Specifically, the region identifying unit 233 identifies the overlapping state based on the positions and postures in the virtual space 2 of the virtual objects for which the determination regions are set in Step S50 and on the roll direction (w-axis direction of FIG. 3, and also direction of reference line of sight 5) of the virtual camera 1.

In Step S52, the region identifying unit 233 identifies the boundary between virtual objects that are identified to be overlapping with each other in Step S51. The identification of the boundary is described later with reference to FIG. 21 and FIG. 22. Then, in Step S53, the region identifying unit 233 excludes a part outside the boundary identified in Step S52 from the determination region identified in Step S50 for each virtual object. The exclusion of a part, outside the boundary from, the determination region of the virtual object means regarding the part outside the boundary as not being a determination region of the virtual object. With this, the determination region of each virtual object is established, and the processing of setting the determination region ends.

(Example of Setting Determination Region (Before Resolving Overlap))

Figure 20:
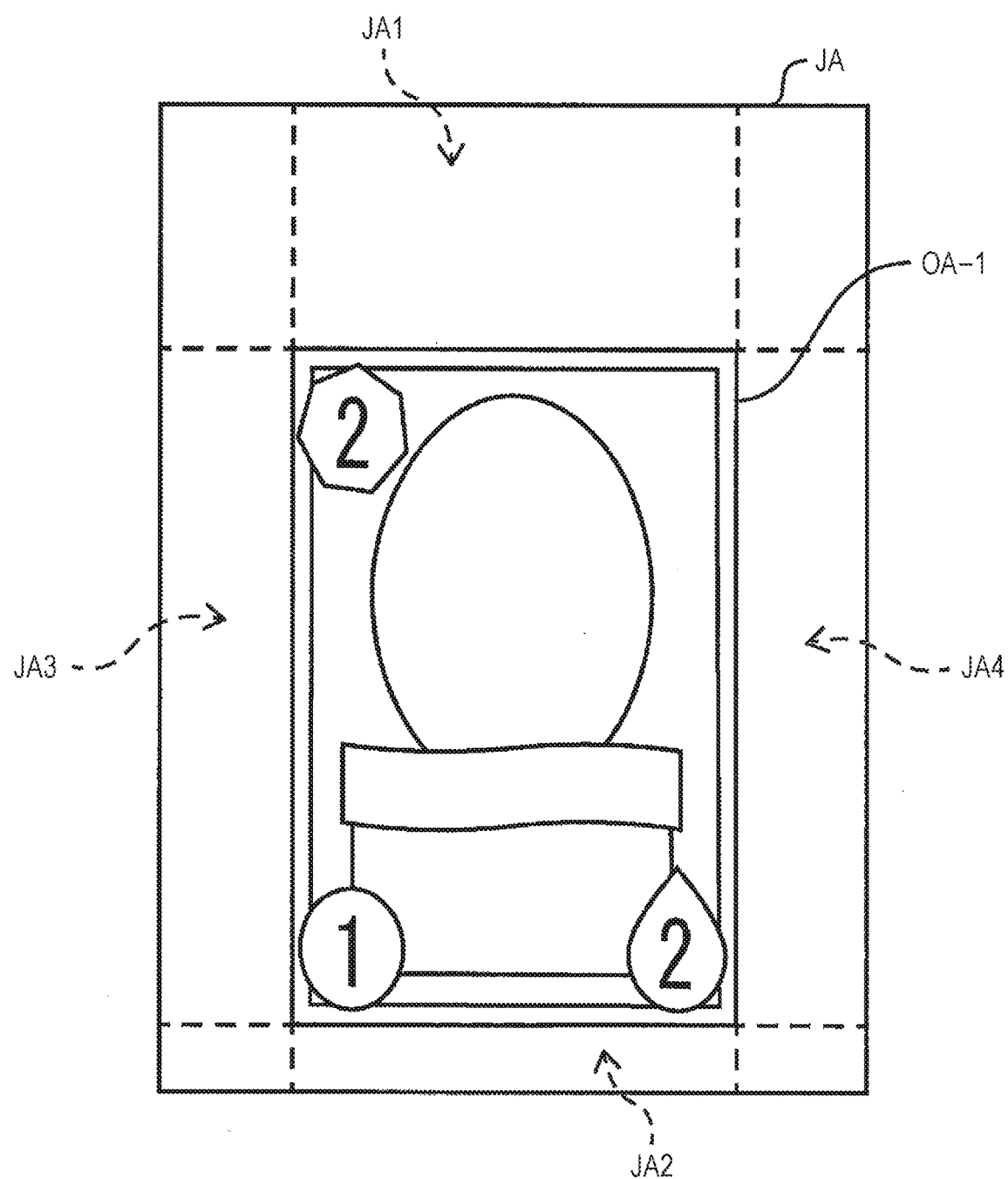
FIG. 20 A diagram of a method of adjusting the reference vector that is based on a direction of a reference line of sight and including the virtual object and the virtual camera as viewed in the Y-axis direction of the virtual space according to at least one embodiment.

The determination region set in Step S50 of FIG. 19 may extend in the vertical and horizontal directions of the virtual object, for example, as in FIG. 20. In FIG. 20, an example of identifying a determination region JA around, the virtual object OA-1 is illustrated. In FIG. 20, the virtual object OA-1 as viewed from the virtual camera 1 is illustrated two-dimensionally, and the determination region JA is a hexahedron region extending toward the front side (toward position of virtual camera 1) of the virtual object OA-1. In FIG. 20, only one virtual object OA-1 and the determination region JA is shown, but the determination region is set similarly for each virtual object to be selected. The shape and range of the determination region set to each virtual object may be different depending on each virtual object.

When virtual objects are grasped with one virtual hand as in FIGS. 18A and 18B, the user often tries to touch the virtual objects from above those virtual objects. Thus, the determination region JA preferably contains a part JA1 positioned above the virtual object OA-1 as in the example of FIG. 20. The term "above" means that the part JA1 is positioned above the virtual object OA-1 in the yaw direction in the visual-field coordinate system of the HMD 110. With this, the user can easily touch the virtual object OA-1 from above the virtual object OA-1.

Further, the determination region JA may contain a part JA2 extending downward from the bottom end of the virtual object OA-1, and parts JA3 and JA4 extending from the lateral ends of the virtual object OA-1 laterally as in the example of FIG. 20. In at least one embodiment, the widths of the parts JA1 to JA4 are set so that the user can intuitively grasp the virtual object OA-1. For example, as in FIG. 20, the width of the part JA1 may be larger than the width of the part JA2 and the widths of the parts JA3 and JA4, and the widths of the parts JA3 and JA4 may be larger than the width of the part JA2. With this, the virtual object OA-1 is most likely to be touched from above the virtual object OA-1, and is second most likely to be touched laterally from the virtual object OA-1. The width of the part JA1 is the length from the top side of the virtual object OA-1 to the top end of the part JA1, the width of the part JA2 is the length from the bottom side of the virtual object OA-1 to the bottom end of the part JA2, the width of the part JA3 is the length from the left side of the virtual object OA-1 to the left end of the part JA3, and the width of the part JA4 is the length from the right side of the virtual object OA-1 to the right end of the part JA4. Further, similarly for another virtual object positioned back of the virtual object OA-1, the determination region containing a part, positioned above (above virtual object in yaw direction of HMD 110) the virtual object, is preferably set.

When the determination region contains a part extending from the outer edge of the virtual object toward outside of the virtual object, the direction in which the part extends may be determined in advance. Further, the region identifying unit 233 may identify the posture of the virtual object in the virtual space 2, and determine the direction of extension of the part depending on the identified posture. In this case, the region identifying unit 233 may change the direction and amount of extension of the determination region depending on the change in posture of the virtual object.

Further, as in the example of FIGS. 18A and 18B, when virtual objects are supported and held by one virtual hand and one virtual object is selected from the virtual objects by another virtual hand, the region identifying unit 233 may set the determination region so that a part of the determination region extending from an end (top end or right top end in example of FIGS. 18A and 18B), which is opposite to an end (bottom end or left bottom end) on which virtual objects are held, is wider than other parts of the determination region. The user can move a virtual hand toward the end of virtual objects, which is opposite to the end on which the virtual objects are held by another virtual hand, without interfering with another virtual hand. Therefore, the user can easily touch the virtual object held by another virtual hand through the setting described above.

(Example of Identifying Boundary)

Figure 21A:
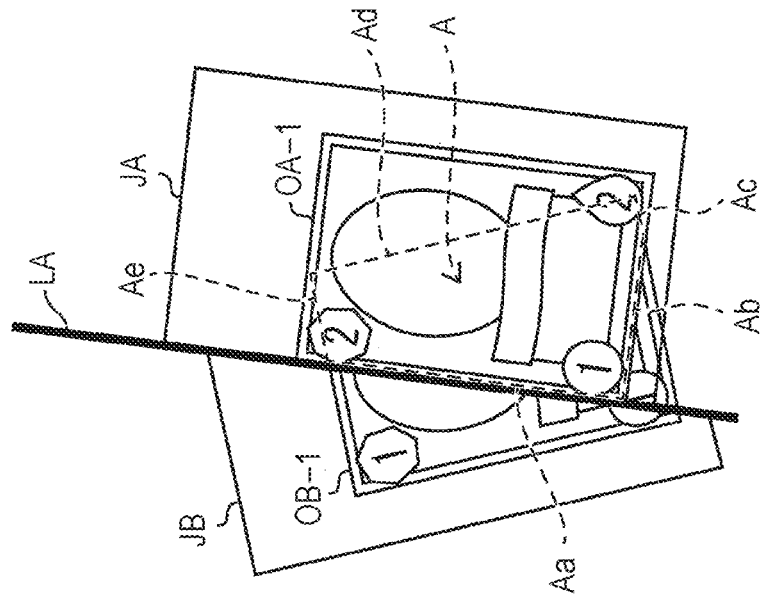
FIG. 21A A diagram of the method of adjusting the reference vector that is based on the direction of the reference line of sight and including the virtual object and the virtual camera as viewed in the X-axis direction of the virtual space according to at least one embodiment.
Figure 21B:
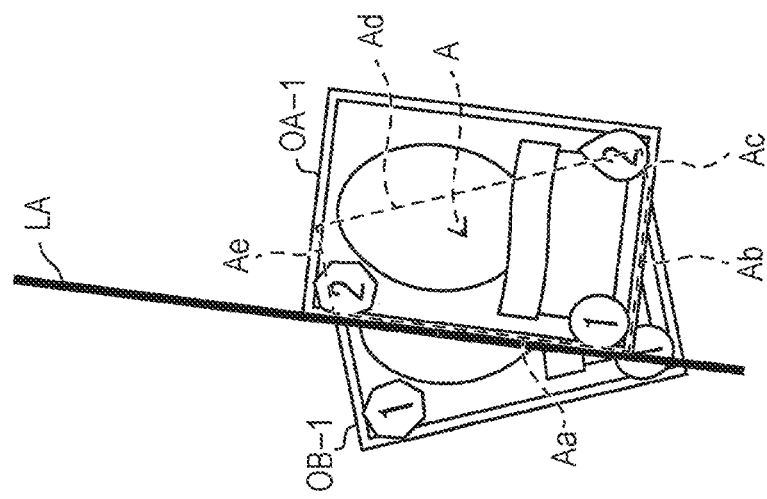
FIG. 21B A diagram of the method of adjusting the reference vector that is based on the direction of the reference line of sight and including the virtual object the virtual camera as viewed in the X-axis direction of the virtual space according to at least one embodiment.

In Step S52 of FIG. 19, for example, a boundary as illustrated in FIG. 21 may be identified. In the example of FIGS. 21A and 21B, the virtual object OA-1 (first virtual object) overlaps with the virtual object OB-1 (second virtual object). An overlapping part A between the virtual object OA-1 and the virtual object OB-1 is a pentagon region defined by line segments Aa, Ab, Ac, Ad, and Ae.

In this example, the region identifying unit 233 identifies outlines for distinguishing between the virtual object OA-1 and the virtual object OB-1, namely, line segments Aa and Ab, among outlines for defining the outer shape of the virtual object OA-1. Then, the region identifying unit 233 identifies a straight line LA containing the line segment Aa, which has the longest part overlapping with the virtual object OB-1, among the line segments Aa and Ab, as illustrated in FIG. 21A. The straight line LA can be said to be a straight line containing a left long side among four sides forming the outer shape of the virtual object OA-1. Then, the region identifying unit 233 identifies a plane passing through this straight line LA as a boundary between the determination region JA and the determination region JB. In at least one embodiment, this plane is parallel to the roll direction (w-axis direction of FIG. 3, and also direction of reference line of sight 5) of the virtual camera 1. With this, setting the determination region JA to a part of the virtual object OA-1 visible from the virtual camera 1 and the determination region JB to a part of the virtual object OB-1 visible from the virtual camera 1 is possible.

The region identifying unit 233, which has identified the boundary, excludes a part (outside virtual object OA-1) to the left of the straight line LA within the determination region JA (refer to FIG. 20) identified all around the virtual object OA-1 as in FIG. 21B. That is, the region identifying unit 233 identifies a part to the left of the straight line LA as not being the determination region JA. As a result, a part (on side of virtual object OA-1) to the right of the straight line LA is set as the determination region JA. That is, the region identifying unit 233 sets the determination region overlapping with the overlapping part A as viewed from the virtual camera 1 to the determination region JA (first region) of the virtual object OA-1 positioned forward of the virtual object OB-1. The determination region JA set in this manner does not overlap with the virtual object OB-1 past the straight line LA on the plane as viewed from the virtual camera 1.

On the other hand, the region identifying unit 233 excludes a part (on side of overlapping part A) to the right of the straight line LA from the determination region JB of the virtual object OB-1. That is, the region identifying unit 233 identifies the part to the right of the straight line LA as not being the determination region JB. As a result, a part (on side of virtual object OB-1) to the left of the straight line LA is set as the determination region JB. That is, the region identifying unit 233 sets the determination region JB (second region) not overlapping with the overlapping part A as viewed from the virtual camera 1 to the virtual object OB-1 positioned back of the virtual object OA-1. The determination region JB set in this manner does not overlap with the virtual object OA-1 past the straight line LA on the plane as viewed from the virtual camera 1.

In this manner, when a plurality of virtual objects overlap with one another, the region identifying unit 233 performs adjustment so that those plurality of virtual objects do not overlap with one another. Thus, the user can intuitively select an intended virtual object.

In the example of FIGS. 21A and 21B, a boundary passing through the line segment Ab is not identified, but the region identifying unit 233 may identify the boundary passing through the line segment Ab. In the example of FIGS. 22A and 22B, as in FIG. 22A, the region identifying unit 233 sets, as the boundary, a half line LB passing through the line segment Aa and a half line LC passing through the line segment Ab. In this case, as in FIG. 22B, the region identifying unit 233 excludes a part to the left of the half line LB and a part below the half line LC from the determination region JA of the virtual object OA-1, and secures a part to the right of the half line LB and a part above the half line LC as the determination region JA. On the other hand, the region identifying unit 233 excludes a part to the right of the half line LB and a part above the half line LC from the determination region JB of the virtual object OB-1, and secures a part to the left of the half line LB and a part below the half line LC as the determination region JB.

The example of FIGS. 21A and 21B has an advantage in that loads on the arithmetic processing for identification of the determination region are smaller because the number of boundaries is reduced compared to the example of FIGS. 22A and 22B. On the other hand, compared to the example of FIGS. 21A and 21B, the example of FIGS. 22A and 22B has an advantage in that selecting the virtual object OB-1 by moving the virtual hand toward the virtual object OB-1 from above, below, or the side of the virtual object OB-1 is easier. As in the example of FIGS. 18A and 18B, when the virtual object OA-1 and the virtual object OB-1 supported by the virtual left hand OL are selected with the virtual right hand, the determination region below those virtual objects overlaps with the position of the virtual left hand OL, and thus has a low importance. Therefore, in at least one, identification of the boundary along the short bottom side of the virtual object OA-1 is not performed as in the example of FIGS. 21A and 21B.

(Example of Setting Determination Region (After Resolving Overlap))

Figure 23:
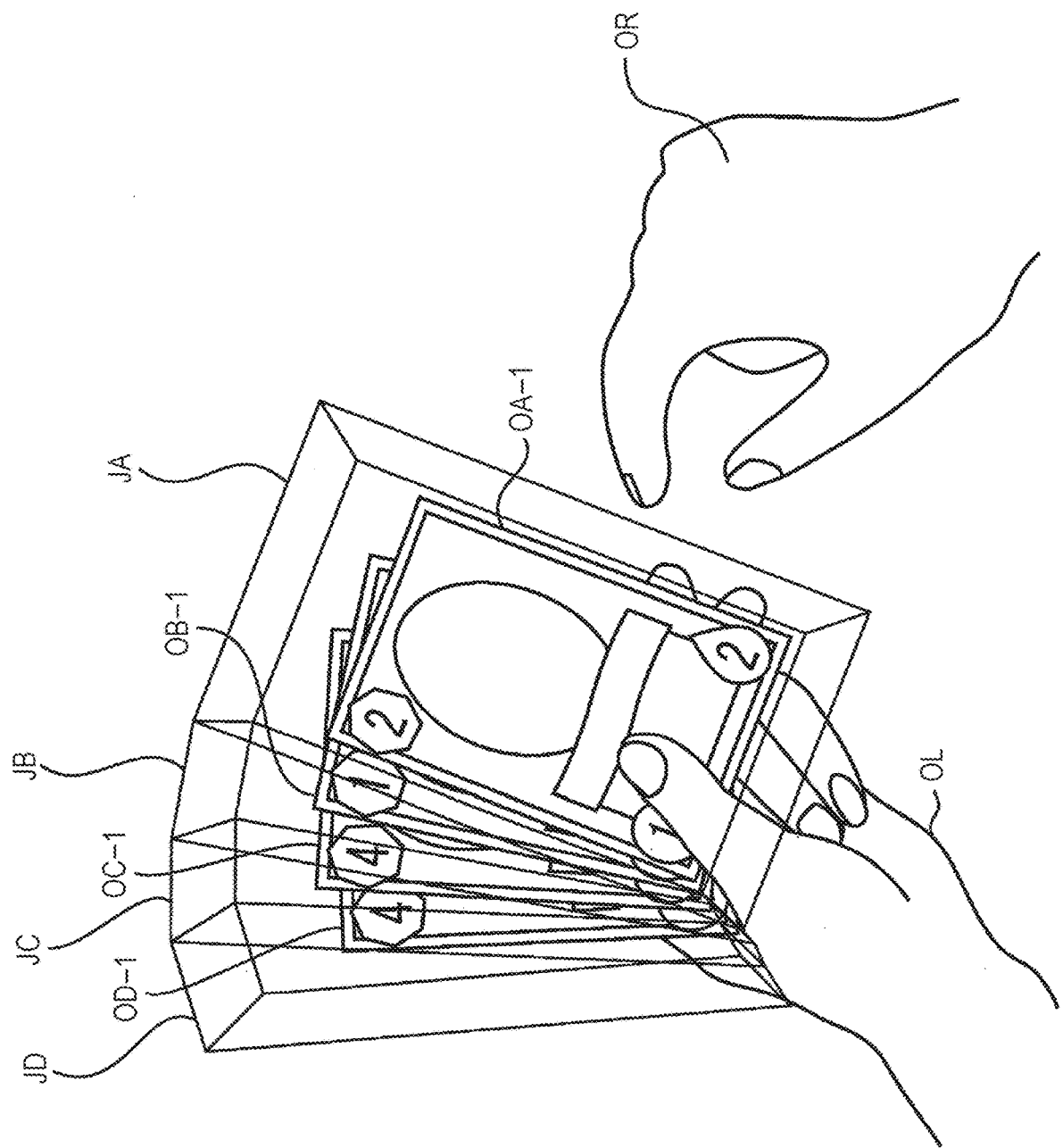
FIG. 23 A diagram of an example of setting the determination region to each of the virtual card objects according to at least one embodiment.

FIG. 23 is a diagram of an example in which the region identifying unit 233 sets the determination regions JA to JD for the spread virtual card objects OA-1 to OD-1 held by the virtual left hand OL according to at least one embodiment. Among the four virtual objects, the virtual object OA-1 is positioned in front (on near side of virtual camera 1), and the virtual objects OB-1, OC-1, and OD-1 are arranged back in the stated order (on far side of virtual camera 1).

In this example, the region identifying unit 233 identifies the boundary between the virtual object OA-1 and the virtual object OB-1 as a plane passing through a left long side of the virtual object OA-1, and sets a region to the right of the plane as the determination region JA of the virtual object OA-1. Further, the region identifying unit 233 identifies the boundary between the virtual object OB-1 and the virtual object OC-1 as a plane passing through a left long side of the virtual object OB-1, and sets, as the determination region JB of the virtual object OB-1, a region to the right of the plane and to the left of a plane defined by the boundary between the virtual object OA-1 and the virtual object OB-1. Similarly to the virtual objects OA-1 and OB-1, regarding the virtual object OC-1, the region identifying unit 233 sets, as the determination region JC of the virtual object OC-1, a region to the right of the plane passing through a left long side of the virtual object OC-1 and to the left of a plane defined by the boundary between the virtual object OB-1 and the virtual object OC-1. Regarding the virtual object OD-1, the region identifying unit 233 sets, as the determination region JD of the virtual object OD-1, a region to the left of the plane defined by the boundary between the virtual object OC-1 and the virtual object OD-1. The plane defined by the boundary between determination regions is desirably to be parallel to the roll direction (w-axis direction of FIG. 3, and also direction of reference line of sight 5) of the virtual camera 1 as described above.

The user can move a virtual right hand OR in the virtual space 2 by moving the position of the right controller 320 in the real space. Then, the user can select a desired virtual object among the virtual objects OA-1 to OD-1 by performing, on the right controller 320, an operation of moving the virtual right hand OR toward the desired virtual object and grasping the desired virtual object.

(Other Processing of Selecting Virtual Object)

Figure 24:
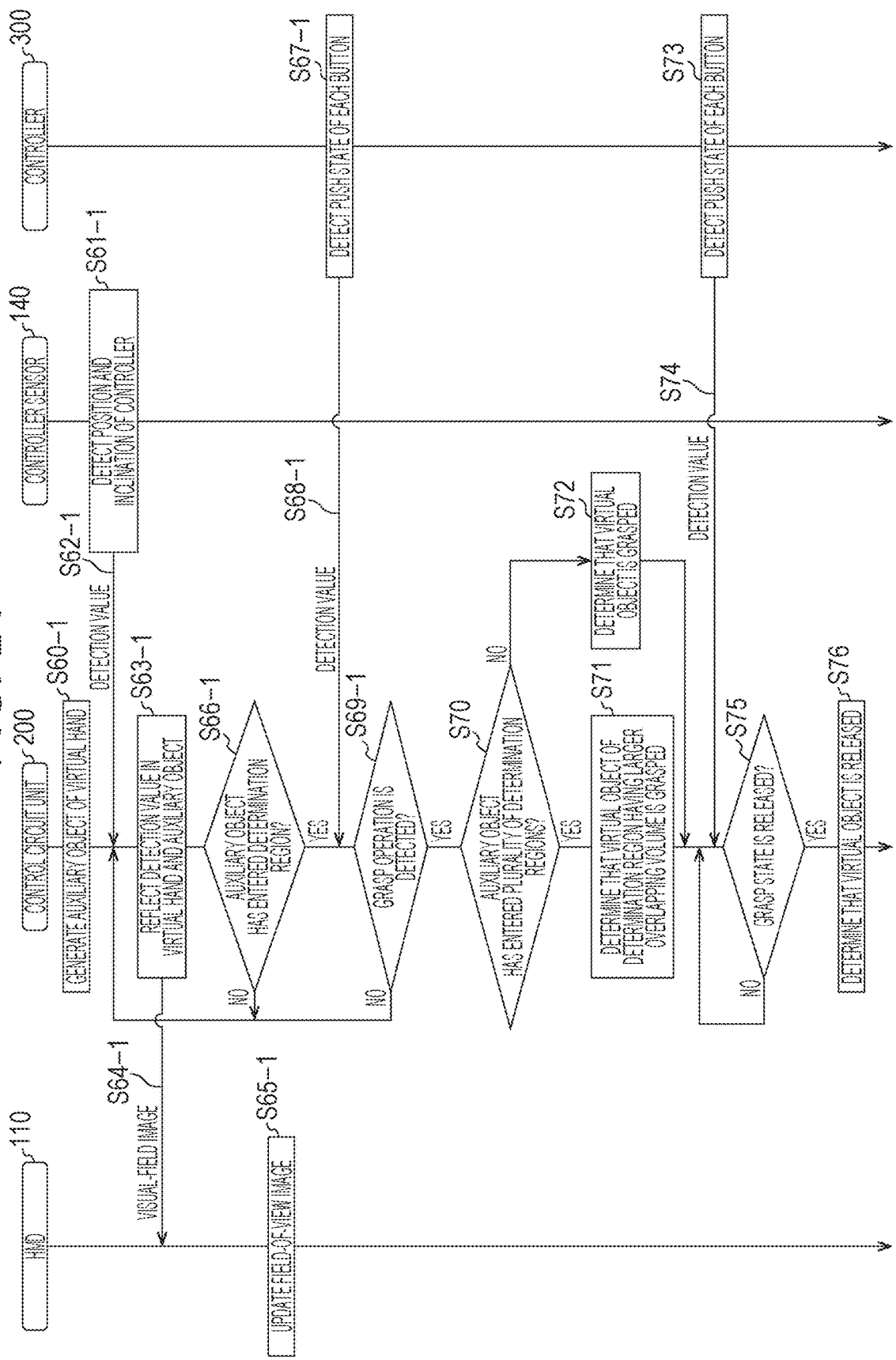
FIG. 24 A sequence diagram of a flow of processing performed when a virtual object is selected in the game in the virtual space according to at least one embodiment.
Figure 26A:
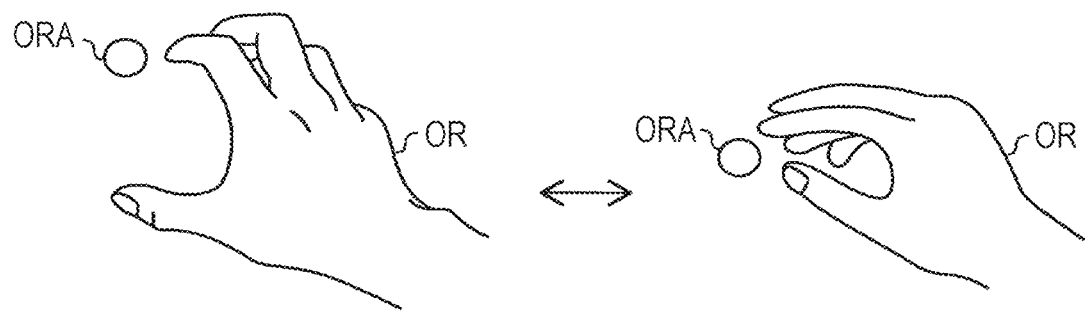
FIG. 26A A diagram of an example of a grasp operation for the auxiliary object, according to at least one embodiment.
Figure 26B:
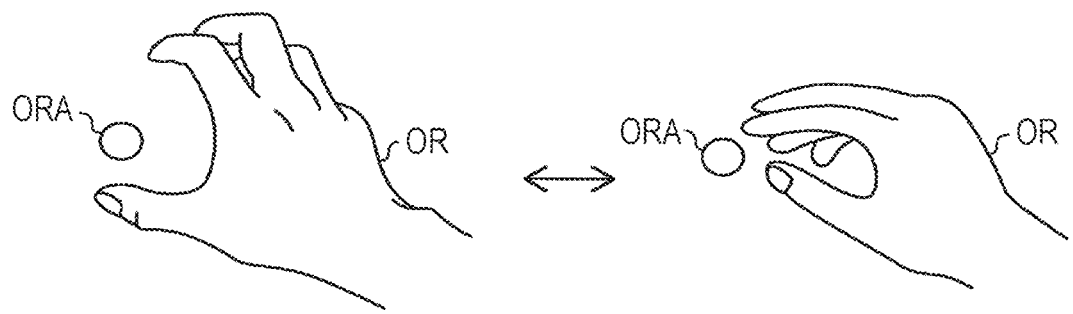
FIG. 26B A diagram of an example of a grasp operation for the auxiliary object according to at least one embodiment.
Figure 26C:
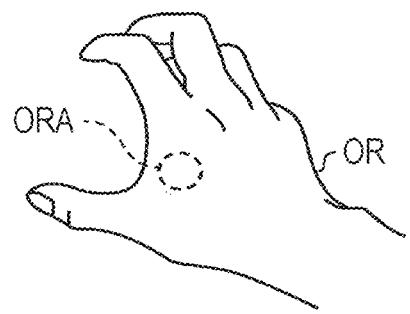
FIG. 26C A diagram of an example of a grasp operation for the auxiliary object according to at least one embodiment.

Now, a description is given of processing of the user selecting a virtual object after the region identifying unit 233 sets a determination region with reference to FIG. 24. In Step S60-1, the touch determining unit 234 generates an auxiliary object for determining whether or not a virtual hand to be used for selecting a virtual object has touched the virtual object. For example, as in the example of FIG. 23, when any one of the virtual objects OA-1 to OD-1 is selected by the virtual right hand OR, the touch determining unit 234 generates an auxiliary object for determining whether or not the virtual right hand OR has touched the objects OA-1 to OD-1. The auxiliary object is a virtual object that moves in synchronization with the virtual hand in the virtual space 2, and a detailed description thereof is described later with reference to FIG. 25 and FIGS. 26A, 26B and 26C.

In Step S61-1, the controller sensor 140 detects the position and inclination of the right controller 320, and detects the position and inclination of the left controller 330. In Step S62-1, the controller sensor 140 transmits the detection values to the control circuit unit 200. The controller detecting unit 213 receives those detection values.

In Step S63-1, the virtual hand control unit 232 uses the received detection values to update the position and inclination of each virtual hand (virtual right hand and virtual left hand) of the user in the virtual space 2. Specifically, the virtual hand control unit 232 updates the position of the virtual right hand in the virtual space 2 to the current position of the right controller 320 in the global coordinate system. Further, the virtual hand, control unit 232 updates the inclination of the virtual, right hand, in the virtual space 2 based on the detection value of the inclination of the right controller 320. Similarly, the virtual hand control unit 232 updates the position and inclination of the virtual left hand in the virtual, space 2 based, on the detection values of the left controller 330. Further, the touch determining unit 234 updates the position of an auxiliary object so that the position moves in synchronization with the position of the virtual hand. In Step S64-1, the field-of-view image generating unit. 223 generates a field-of-view image whose position and inclination of the virtual hand are updated for output to the HMD 110. In Step S65-1, the HMD 110 displays the received field-of-view image on the display 112, and the field-of-view image recognized by the user is updated in this manner.

In Step S66-1, the touch determining unit 234 determines whether or not an auxiliary object has entered the determination region of the virtual object. When the touch determining unit 234 determines that the auxiliary object does not enter the determination region (NO in Step S66-1), the processing returns to Step S61-1. On the other hand, when the touch determining unit 234 determines that the auxiliary object has entered the determination region (YES in Step S66-1), the touch determining unit 234 determines whether or not the grasp operation has been detected based on the detection values indicating the push states of respective buttons detected in Step S67-1 and transmitted in Step S68-1 by the controller 300 (Step S69-1). The kind of operation defined as the grasp operation is not particularly limited, but, for example, the operation of pushing buttons corresponding to the thumb, the pointing finger, and the middle finger of the virtual hand until those fingers touch one another may be defined as the grasp operation.

When the touch determining unit 234 determines that a grasp operation is not performed (NO in Step S69-1), the processing returns to Step S61-1. On the other hand, when the touch determining unit 234 determines that a grasp operation has been performed (YES in Step S69-1), the touch determining unit 234 determines whether or not an auxiliary object has entered determination regions of a plurality of objects (Step S70). Further, the virtual hand control unit 232 performs a grasp operation with the virtual hand in the virtual space 26. Although not shown in the figure, the grasp operation with the virtual hand is reflected in the field-of-view image 26.

When the touch determining unit 234 determines that an auxiliary object has entered a plurality of determination regions (YES in Step S70), the touch determining unit 234 identifies a determination region having a larger overlapping volume with the auxiliary object among the plurality of determination regions. The overlapping volume is a volume of a region in the auxiliary object and in the determination region. For example, when a part of the auxiliary object is contained in a first determination region and another part of the auxiliary object is contained in a second determination region, the touch determining unit 234 determines which of the part contained in the first determination region and another part contained in the second determination region has a larger volume.

Then, the touch determining unit 234 determines that a virtual object corresponding to the determination region that is identified to have a larger overlapping volume is grasped (Step S71). On the other hand, when the touch determining unit 234 determines that an auxiliary object has entered one determination region (NO in Step S70), the touch determining unit 234 determines that a virtual object corresponding to the determination region is grasped (Step S72), and associates the virtual object with a virtual hand corresponding to the auxiliary object. For example, when the grasped virtual object and the grasping virtual hand are associated with each other and the virtual hand has moved, the virtual object may also be caused to move in synchronization with the virtual hand.

In Step S73, the controller 300 detects the detection values indicating the push states of respective buttons. In Step S74, the controller 300 transmits the detection values to the control circuit unit 200. In Step S75, the touch determining unit 234 determines whether or not a grasp operation has been released based on the detection values indicating the push states of respective buttons. The touch determining unit 234 may determine, as an operation of releasing the grasp operation, an operation of causing the push states of respective buttons corresponding to the thumb, the pointing finger, and the middle finger of the virtual hand to approach "0" (no activation of the respective buttons) until those fingers become away from the respective buttons (extending bent fingers of virtual hand), for example, under a state in which the virtual object is grasped (for example, under state in which thumb, pointing finger, and middle finger of virtual hand are in contact with virtual object).

When the touch determining unit 234 determines that the grasp operation is maintained (NO in Step S75), the processing returns to Step S73. On the other hand, when the touch determining unit 234 determines that the grasp operation is released (YES in Step S75), the touch determining unit 234 determines that the virtual object is released by the virtual hand (Step S76), and cancels association between the virtual object and the virtual hand corresponding to the auxiliary object. Further, the virtual hand control unit 232 performs an operation of releasing the virtual object held by the virtual hand in the virtual space 26. Although not shown in the diagram, the operation of releasing the virtual object by the virtual hand is reflected in the field-of-view image 26. The processing to be executed after a determination that the virtual object is released may be defined depending on the content of the game. For example, the field-of-view image generating unit 223 may display, as the field-of-view image 26 on the HMD 110, a moving image in which the virtual object that is held by one virtual hand and then is released by the virtual hand is returned to the other virtual hand (virtual hand on side in which virtual object is set). After that, the processing may return to Step S61-1.

(Example of Auxiliary Object)

In FIG. 25, the virtual objects OA-1 and OB-1 and the determination regions JA and JB corresponding thereto are illustrated, and an auxiliary object ORA of the virtual right hand OR is illustrated. The illustration of the left virtual hand OL grasping the virtual objects OA-1 and OB-1 is omitted. In at least one embodiment, the field-of-view image generating unit 223 does not generate the field-of-view image 26 containing the auxiliary object ORA, and the touch determining unit 234 may identify the position and range of the auxiliary object ORA. Further, in FIG. 25, the auxiliary object ORA of the virtual right hand OR is shown as an example, but when a virtual object is selected by the left virtual hand OL, the touch determining unit 234 generates an auxiliary object corresponding to the left virtual hand OL similarly to the auxiliary object ORA. The same holds true for the examples of FIGS. 26A, 26B, 26C and FIG. 27 described later.

The auxiliary object ORA, is a ball object, and the touch determining unit 234 generates the auxiliary object ORA so that the virtual right hand OR and the auxiliary object ORA has a predetermined positional relationship. The shape of the auxiliary object ORA is not particularly limited, and may be, for example, a polyhedron. The initial position of the auxiliary object ORA can be identified based on the position of the virtual right hand OR. For example, the touch determining unit 234 may arrange the auxiliary object ORA at a position along the direction of extension of the arm of the virtual right hand OR and at a predetermined distance from the wrist.

Further, when the position of the virtual right hand OR has moved, the touch determining unit 234 updates the position of the auxiliary object ORA so that the positional relationship between the moved virtual right hand OR and the auxiliary object ORA maintains the predetermined positional relationship. With this, as in FIG. 25, when the position of the virtual right hand OR has moved, the position of the auxiliary object ORA also moves in synchronization therewith, and the auxiliary object ORA is maintained to be arranged at a predetermined distance from the virtual right hand OR.

The touch determining unit 234 may or may not move the position of the auxiliary object in synchronization with movement of a part of the virtual hand (e.g., finger). For example, among the examples of the virtual right hand OR and the auxiliary object ORA in FIGS. 26A, 26B and 26C, in the example of FIG. 26A, when a grasp operation is performed with the virtual right hand OR, the touch determining unit 234 changes the position of the auxiliary object ORA in synchronization with the position of the tips of fingers of the virtual right hand OR. In other words, the touch determining unit 234 changes the position of the auxiliary object ORA in accordance with movement of the virtual right hand OR during the grasp operation. On the contrary, in the example of FIG. 26B, the touch determining unit 234 maintains the position of the auxiliary object ORA before and after the grasp operation with the virtual right hand OR. When a virtual object is selected by performing the grasp operation with the virtual right hand OR, the position of the auxiliary object ORA is preferably not changed during the grasp operation. In some instances, when the position of the auxiliary object is changed during the grasp operation, the virtual object to be selected may change contrary to the intention of the user. On the other hand, when a virtual object is selected by an operation of pinching the virtual object OR with the tips of fingers of the virtual right hand OR, the position of the auxiliary object ORA is preferably changed in synchronization with the position of the tips of fingers of the virtual right hand OR. Further, as in the example of FIG. 26C, the touch determining unit 234 may arrange the auxiliary object ORA within the virtual right hand OR. At which position the auxiliary object ORA is arranged within the internal region of the virtual right hand OR is not particularly limited, but, for example, the touch determining unit 234 may arrange the auxiliary object ORA at the positions of the tips of fingers within the internal region of the virtual right hand OR. In this case, the touch determining unit 234 can perform touch determination in accordance with fine movement of the tips of fingers of the virtual right hand OR. Further, the touch determining unit 234 uses the tips of fingers of the virtual right hand OR, which can be recognized by the user, for touch determination, and thus the user can intuitively select the virtual object. Those examples can be said to be examples of setting a part of the virtual right hand OR as the determination region for determining touch with the virtual object. Further, the touch determining unit 234 may arrange the auxiliary object ORA at a position where a part of the auxiliary object ORA is in the virtual right hand OR or another part of the auxiliary object ORA is outside the virtual right hand OR, (Example of Determination when Auxiliary Object has Entered Plurality of Determination Regions)

Figure 27:
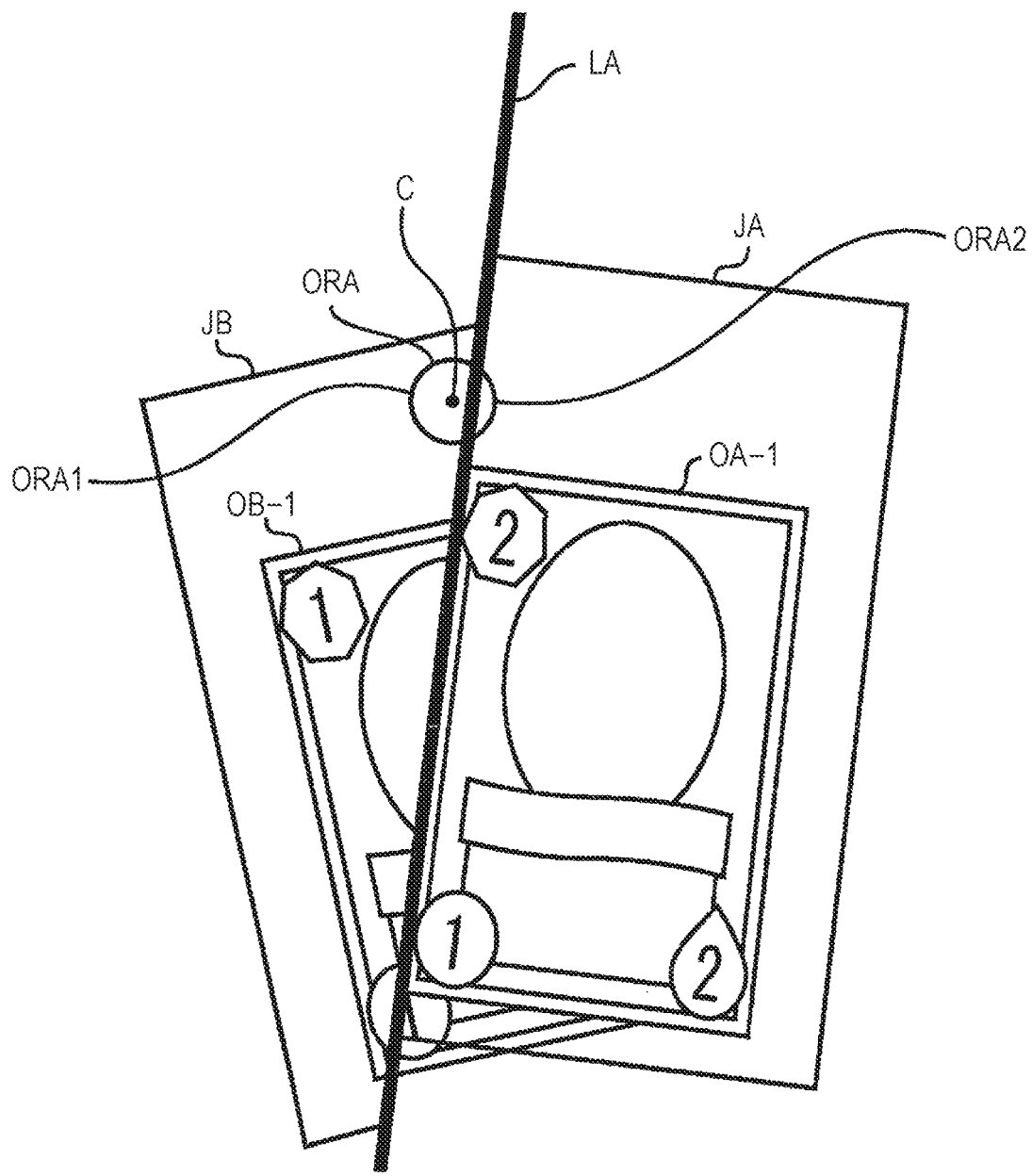
FIG. 27 A diagram of a process of determining which virtual object of a determination region the auxiliary object has touched when the auxiliary object, entered a plurality of determination regions according to at least one embodiment.

FIG. 27 is a diagram of the virtual objects OA-1 and OB-1 and those determination regions JA and JB, and includes the auxiliary object ORA of the virtual right hand OR according to at least one embodiment. The left virtual hand OL grasping the virtual objects OA-1 and OB-1 and the virtual right hand OR corresponding to the auxiliary object ORA is omitted for clarity. In this example, the auxiliary object ORA has entered, both of the determination regions JA and JB, and thus, as described in Step S71 of FIG. 24, the touch determining unit 234 identifies a determination region having a larger overlapping volume with the auxiliary object ORA among the determination regions JA and JB.

In the example of FIG. 27, the boundary between the determination regions JA and JB is a plane passing through the straight line LA, and a part ORA1 to the left, of the plane is contained in the determination region JB and a part ORA2 to the right of the plane is contained in the determination region JA. Further, the center of the auxiliary object ORA, which has a ball shape, is represented by C. In this example, the touch determining unit 234 calculates volumes of the part ORA1 and the part ORA2, and compares the calculated volumes with each other, to thereby identify a determination region having a larger overlapping volume with the auxiliary object ORA.

In the example of FIG. 27, the auxiliary object ORA, which has a ball shape, is separated into the two parts ORA1 and ORA2 by a plane passing through the straight line LA, and the entire part ORA1 and the entire part ORA2 are contained in the determination region JA and the determination region JB, respectively. Thus, the touch determining unit 234 determines at which determination region the center C of the auxiliary object ORA is positioned with respect to the plane, thereby being capable of identifying a determination region having a larger overlapping volume with the auxiliary object ORA. In the example of FIG. 27, the center C of the auxiliary object ORA is to the left (on the determination region JB) of the plane passing through the straight line LA, and thus the touch determining unit 234 can identify that the determination region JB has a larger overlapping volume with the auxiliary object ORA. In this manner, formation of the auxiliary object ORA having a ball shape may enable a determination region having a larger overlapping volume to be calculated easily.

When the auxiliary object has entered three or more determination regions, the touch determining unit 234 calculates overlapping volumes between the auxiliary object and each determination region, to thereby identify a determination region having the largest overlapping volume. The touch determining unit 234 may determine whether or not the virtual object has touched a virtual hand without using an auxiliary object. In this case, when the virtual hand has entered determination regions of a plurality of virtual objects, the touch determining unit 234 calculates overlapping volumes between the virtual hand and each virtual object, thereby being capable of identifying a determination region having the largest overlapping volume. The virtual hand is a virtual object having a complex shape, and calculation of overlapping volumes between the virtual hand and the determination region is complex. Therefore, in at least one embodiment, determination using the auxiliary object is adopted in terms of suppressing the calculation amount.

(Display when Virtual Object is Determined to be Grasped)

Figure 28:
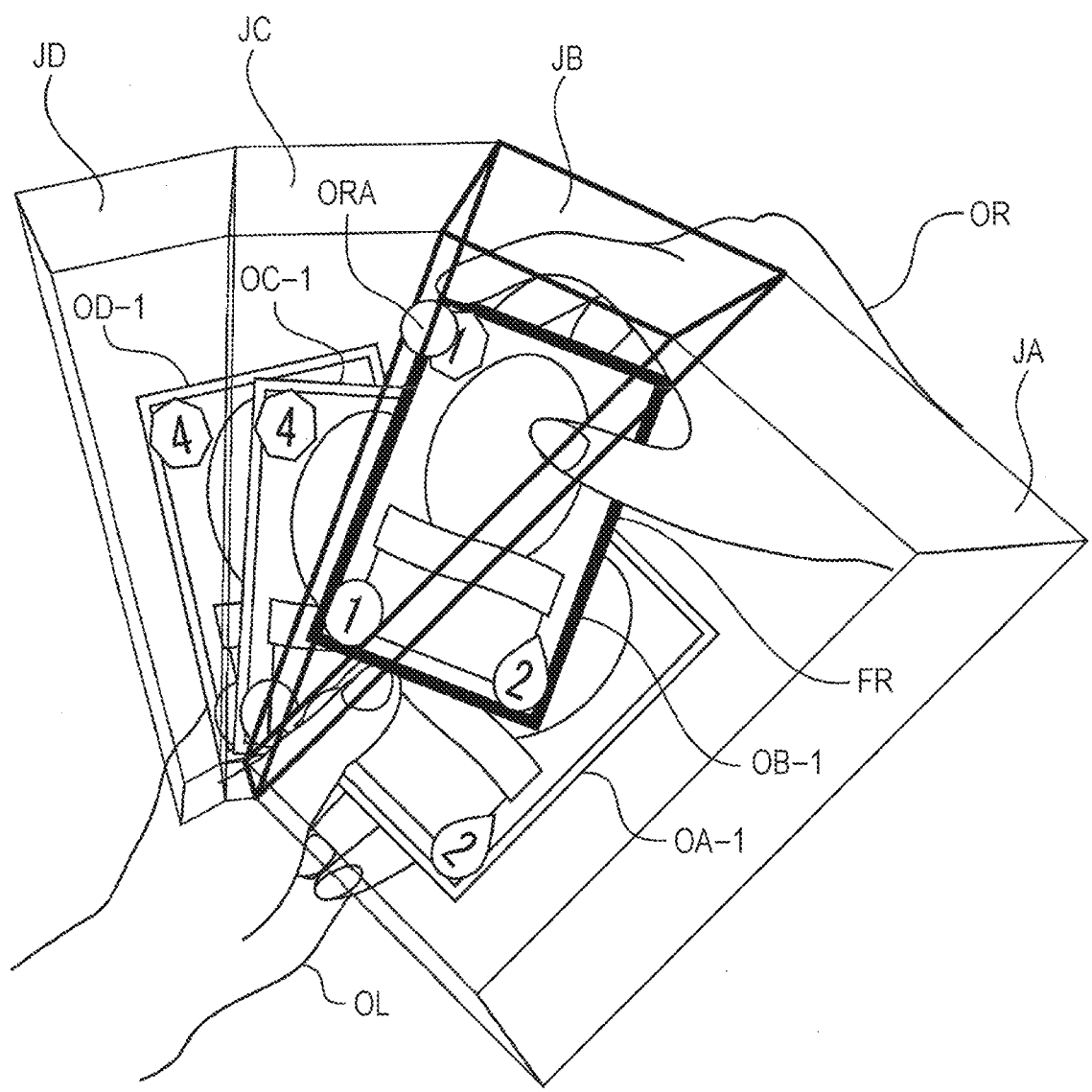
FIG. 28 A diagram of content to be displayed when the virtual object is grasped according to at least one embodiment.

Now, a description is given of display in a case where the touch determining unit 234 determines that the virtual object is grasped in Step S72 of FIG. 24. In the example of FIG. 28, the left virtual hand OL grasps four cards, namely, the virtual objects OA-1 to OD-1, and determination regions of those virtual objects are the determination regions JA to JD. The left side surface of the determination region JA is a boundary surface between the determination regions JA and JB, the left side surface of the determination region JB is a boundary surface between the determination region JB and the determination region JC, the left side surface of the determination region JC is a boundary surface between the determination region JC and the determination region JD. Further, the auxiliary object ORA is positioned near the virtual right hand OR. The determination regions JA to JD and the auxiliary object ORA do not need to be displayed as the field-of-view image 26.

The virtual right hand OR has a shape of grasping the virtual object (shape of bending fingers until the thumb and the middle finger are in contact with each other) by the right controller 320, which is not shown, performing a grasp operation. The auxiliary object ORA, which accompanies the virtual right hand OR, is contained in both of the determination regions JB and JC, but has a larger overlapping volume with the determination region JB. Thus, in this example, the touch determining unit 234 determines that the virtual right hand OR grapes the virtual object OB-1.

In this case, as in FIG. 28, the field-of-view image generating unit 223 may generate and display the field-of-view image 26 in which the virtual object OB-1 determined to be grasped is moved above and on the upper surface sides of the other virtual objects OA-1, OC-1, and OD-1. With this, the user can clearly recognize the fact that the virtual object OB-1 is grasped, and the user can check pictures and characters described on the virtual object OB-1. Further, in the example of FIG. 28, the frame line FR is displayed around the grasped virtual object OB-1, and this enables the user to clearly recognize the fact that the virtual object OB-1 is grasped.

The frame line FR may be displayed when the auxiliary object has entered a determination region. In this case, in the processing of FIG. 24, when the touch determining unit 234 determines that the auxiliary object has entered a determination region (YES in Step S66-1), the touch determining unit 234 may determine whether or not the auxiliary object has entered a plurality of determination regions. Then, when the touch determining unit 234 determines that the auxiliary object has entered a plurality of determination regions, the field-of-view image generating unit 223 may generate the field-of-view image 26 in which a virtual object corresponding to a determination region having a larger over lapping volume is assigned with the frame line FR. In this case, the user can confirm that the frame line FR is displayed on a desired virtual object, and then perform an operation of grasping the virtual object. Thus, grasping the desired virtual object more reliably is possible in comparison with other approaches.

Display for allowing the user to identify a virtual object grasped by the virtual hand or a virtual object capable of being grasped by a grasp operation is not limited to display of the frame line FR. Further, in the example of FIG. 28, the virtual object OB-1 is caused to move in front (position closest to virtual camera 1 among virtual objects grasped by left virtual hand OL), but the determination region JB is not updated from the state before movement. This is because determination of touch with the virtual object does not need to be performed under a state in which the virtual right hand OR grasps the virtual object OB-1. Suppressing the load of arithmetic processing by reducing updating the determination is possible.

This disclosure is not limited to the embodiments described above, and various changes may be made thereto within the appended claims. At least one embodiment that, can be obtained by combining as appropriate technical means disclosed in different embodiments is also included in the technical scope of this disclosure. A new technical feature may also be formed by combining the technical means disclosed in each of the above described embodiments.

In the above-mentioned embodiments, there is an example in which the region identifying unit 233 sets the determination region to each virtual object, and then performs adjustment (excludes overlapping part) so as not to cause an overlapping part between the set determination regions, but the method of setting the determination regions that do not overlap with each other is not limited to this example. For example, in at least one embodiment, the region identifying unit 233 may first identify the boundary between virtual objects, and set the determination region of each virtual object such that those set determination regions do not exceed, the identified, boundary (such that determination region of each virtual object is extended from part, thereof visible to virtual camera 1 so as not to reach another virtual object).

In at least one embodiment, the virtual object operated, by the user only moves in the virtual space 2 in synchronization with movement of a part, of the body other than the head of the user, and is not limited to the virtual hand. For example, when the game involves the user fighting an enemy character (virtual object) in the virtual space 2 using a weapon, the weapon is a virtual object operated by the user.

For that, kind of virtual object, the determination region is not particularly limited, and the determination regions of all the virtual objects in the virtual space 2 may be identified, or determination regions of a part of the virtual objects may be identified. Further, the shape of the virtual object is not particularly limited as well. The virtual object occupying a larger volume in the virtual space 2 can be selected by the user easily without identification of the determination region, and thus the determination region may be identified only for a virtual object having a volume of a threshold value or less, or for a virtual object having a thickness of a threshold value or less.

Further, when a virtual experience is provided by applying an operation by touch with a virtual object to, for example, MR, a part, of the body other than the actual head of the user may be detected by, for example, a physical/optical technique, in place of the operation target object, and whether or not a part of the body and a virtual object have touched each other may be determined based on the positional relationship between the part of the body and the virtual object. When a virtual experience is provided using a transmissive HMD, the reference line of sight of the user may be identified by detecting movement of the HMD or the line of sight of the user similarly to a non-transmissive HMD. The method of setting a determination region to the virtual object and the method of determining whether or not a part of the body of the user and the virtual object have touched each other based on the set determination region is similar to the methods described in the above-mentioned embodiments.

The control blocks of the control circuit unit 200 (detection unit 210, display control unit 220, virtual space control unit 230, storage unit 240, and communication unit 250) may be implemented by a logic circuit (hardware) formed on an integrated circuit (IC chip) or the like, or may be implemented by a CPU executing instructions.

In the latter case, the control blocks include a CPU configured to execute a command of a program, which is software for implementing each function, a ROM or a storage device (those components are referred to as "recording medium") having recorded thereon the above-mentioned program and various types of data that are readable by a computer (or the CPU), and a RAM to which the above-mentioned program is to be loaded. The computer (or the CPU) reads the above-mentioned program from the above-mentioned recording medium to execute the program, and thus the object of this disclosure is achieved. As the above-mentioned recording medium, "non-transitory tangible media" such as a tape, a disk, a card, a semiconductor memory, and a programmable logic circuit may be used. Further, the above-mentioned program may be supplied to the above-mentioned computer via any transmission medium (for example, a communication network or broadcast waves) that is capable of transmitting the program. This disclosure may be achieved by the above-mentioned program in the form of a data signal embedded in a carrier wave, which is embodied by electronic transmission.

Specifics according to at least one embodiment of this disclosure encompass at least the following.

(Item 1) A method of providing a virtual space to a user wearing a head mounted display on a head. The method includes identifying a plurality of virtual objects arranged in the virtual space and arranging, in the virtual space, an operation target object configured to operate in synchronization with movement of a part of a body other than the head of the user. The method further includes identifying a reference line of sight of the user in the virtual space. The method further includes identifying a virtual camera arranged in the virtual space and configured to define a field-of-view region to be recognized by the user based on the reference line of sight. The method further includes setting a region for determining touch with the operation target object to at least one of the plurality of virtual objects, the region containing at least a part extending in an extension direction that is based on a position of the virtual camera or a direction of the reference line of sight. The method further includes determining whether or not the at least one of the plurality of virtual objects to which the region is set and the operation target object have touched each other based on a positional relationship between the region and the operation target object. The region containing at least the part extending in the extension direction that is based on the position of the virtual camera or the direction of the reference line of sight is set. A determination is made whether or not the virtual object and the operation target object have touched each other based on the positional relationship between the region and the operation target object. Therefore, the user can touch a desired virtual object by an intuitive operation.

(Item 2) A method according to Item 1, in which the part extends in the extension direction, which is opposite to the direction of the reference line of sight, from the at least one of the plurality of virtual objects to which the region is set. With this, a virtual object (virtual object paid attention to by user) positioned in the direction of the reference line of sight with respect to the virtual camera is more likely to be selected, and a virtual object (virtual object not paid attention to by user) positioned outside the direction of the reference line of sight with respect to the virtual camera is less likely to be selected.

(Item 3) A method according to Item 1 or 2, the method further including identifying a reference vector for defining the extension direction, in which the step of setting a region includes setting the region by rotating the reference vector based on the position of the virtual camera or the direction of the reference line of sight and setting the region based on the rotated reference vector. With this, enabling the user to touch a desired virtual object by operating an operation target object intuitively in the virtual space through calculation using the reference vector is possible.

(Item 4) A method according to Item 3, in which the setting the region includes rotating the reference vector such that the reference vector points parallel to and in a direction opposite to the direction of the reference line of sight. The calculation using the reference vector enables a virtual object positioned in the direction of the reference line of sight with respect to the virtual camera to be more likely to be selected, and a virtual object positioned outside the direction of the reference line of sight with respect to the virtual camera to be less likely to be selected.

(Item 5) A method according to Item 3, in which the setting the region includes rotating the reference vector such that the reference vector points parallel to and in a direction opposite to a direction from the position of the virtual camera toward a position of the at least one of the plurality of virtual objects to which the region is set or toward a position identified based on the position of the at least one of the plurality of virtual objects. Even when the user moves the operation target object in front of the virtual object (on virtual camera side with respect to virtual object) without grasping a sense of distance to the virtual object, determining that the operation target object and the virtual object have touched each other in consideration of the intention of the user trying to touch the virtual object is possible.

(Item 6) A method according to any one of Items 1 to 5, the method further including extending, when the position of the virtual camera or the direction of the reference line of sight is changed, the part in the extension direction that is based on a changed position of the virtual camera or a changed direction of the reference line of sight. Also when the position of the virtual camera or the direction of the reference line of sight is changed, the user can maintain the state of being capable of touching a desired virtual object by an intuitive operation.

(Item 7) A method of providing a virtual experience to a user wearing a head mounted display on a head. The method includes identifying a plurality of virtual objects. The method further includes identifying a position of a part of a body other than the head of the user; identifying a reference line of sight of the user. The method further includes setting, to at least one of the plurality of virtual objects, a region containing at least a part extending in an extension direction that is based on a direction of the reference line of sight. The method further includes determining whether or not the at least one of the plurality of virtual objects to which the region is set and the part of the body have touched each other based on a positional relationship between the region and a position of the part of the body. The region containing at least the part extending in the extension direction that is based on the direction of the reference line of sight is set, and a determination is made whether or not the virtual object and the operation target object have touched each other based on the positional relationship between the region and the position of the part of the body of the user. Therefore, the user can touch a desired virtual object intuitively.

(Item 8) A method according to Item 7, in which the part extends in the extension direction, which is opposite to the direction of the reference line of sight, from the at least one of the plurality of virtual objects to which the region is set. With this, a virtual object (virtual object paid attention to by user) positioned in the direction of the reference line of sight is more likely to be selected, and a virtual object (virtual object not paid attention to by user) positioned outside the direction of the reference line of sight is less likely to be selected.

(Item 9) A method according to Item 7 or 8, the method further including identifying a reference vector for defining the extension direction, in which the step of setting a region includes setting the region by rotating the reference vector based on the direction of the reference line of sight, and setting the region based on the rotated reference vector. With this, enabling the user to touch a desired virtual object intuitively through calculation using the reference vector is possible.

(Item 10) A method according to Item 9, in which the setting the region includes rotating the reference vector such that the reference vector points parallel to and in a direction opposite to the direction of the reference line of sight. The calculation using the reference vector enables a virtual object positioned in the direction of the reference line of sight to be more likely to be selected, and a virtual object positioned outside the direction of the reference line of sight to be less likely to be selected.

(Item 11)

A method of providing a virtual experience according to any one of Items 7 to 10, the method further including extending, when the direction of the reference line of sight is changed, the part in the extension direction that is based on a changed direction of the reference line of sight. Even when the direction of the reference line of sight has changed, the user can maintain the state of being capable of touching a desired virtual object.

(Item 12) A system for executing each step of the method of any one of Items 1 to 11.

(Item 13) A non-transitory computer-readable recording medium having stored thereon instructions for execution by Item 12.

Specifics according to at least one embodiment of this disclosure are encompassed by at least the following.

(Item 21) A method of providing a virtual space to a user wearing a head mounted display on a head. The method includes identifying a plurality of virtual objects including a first virtual object and a second virtual object arranged in the virtual space and arranging an operation target object configured to operate in synchronization with movement of a part of a body other than the head of the user in the virtual space. The method further includes identifying a reference line of sight of the user in the virtual space. The method further includes identifying a virtual camera, which is arranged in the virtual space, and is configured to set a field-of-view region to be recognized by the user based on the reference line of sight. The method further includes setting a first region associated with the first virtual object, for determining whether or not the first virtual object and the operation target object have touched each other. The method further includes setting a second region associated with the second virtual object, for determining whether or not the second virtual object and the operation target object have touched each other. The method further includes determining whether or not the first virtual object or the second virtual object and the operation target object have touched each other based on a positional relationship between the first virtual object or the second virtual object and the operation target object, in which the first virtual object includes an overlapping part overlapping with the second virtual object and positioned in front of the second virtual object as viewed from the virtual camera, and in which the step of setting a first region and a second region includes setting the first region overlapping with the overlapping part as viewed from the virtual camera and setting the second region not overlapping with the overlapping part as viewed from the virtual camera. The first region overlapping with the overlapping part is set to the overlapping part in the first virtual object, which is in front of the second virtual object, and the second region is set so as not to overlap with the overlapping part. Therefore, the user can touch a desired virtual object by an intuitive operation.

(Item 22) A method according to Item 21, in which the first region includes a part positioned, above the first virtual object, in a yaw direction of the head mounted display. With this, the user can easily cause the operation target object to touch the first virtual object from, above the first virtual object.

(Item 23) A method according to Item 21 or 22, in which the second region includes a part positioned above the second virtual object in a yaw direction of the head mounted display. With this, the user can easily cause the operation target object, to touch the second virtual object from above the second virtual object.

(Item 24) A method according to Item 21 or 22, the method further including identifying a line segment for defining an outer shape of the first virtual object and overlapping with the second virtual object as viewed from the virtual camera, in which the step of setting a first region and a second region includes setting the first region and the second region based on the line segment. The line segment is a line segment for defining the outer shape of the first virtual object and overlapping with the second virtual object as viewed from the virtual camera, and serves as a boundary between the first virtual object and the second, virtual object as viewed from, the virtual camera. Therefore, appropriately setting the first region and the second region is possible.

(Item 25) A method according to Item 24, in which the setting the first region and the second region includes setting the first region and the second region based on the longest line segment when the plurality of line segments are identified. With this, appropriately setting the first region and the second region while suppressing a calculation amount required for setting the first, region and the second region compared to a case in which the first region and the second region are set based on the plurality of line segments is possible.

(Item 26) A method according to Item 24 or 25, in which the setting the first region and the second region includes setting the first region not overlapping with the second virtual object past, the line segment, as viewed from, the virtual camera and the second region not overlapping with the first virtual object past the line segment as viewed from the virtual camera. The user can touch the second virtual object by causing the operation target object to approach the second virtual object past the line segment as viewed from the virtual camera. The user can also touch the first virtual object by causing the operation target object to approach the first virtual object past the line segment. Therefore, the user can cause the operation target object to touch a desired virtual object by an intuitive operation.

(Item 27) A method according to any one of Items 21 to 26, in which the operation target object includes a first virtual hand configured to operate in synchronization with movement of one hand of the user and a second virtual hand configured to operate in synchronization with movement of another hand of the user. The method further includes arranging the first virtual object and the second virtual object in an overlapping manner as viewed from the virtual camera in association with the first virtual hand based on a first operation on the first virtual hand by the user and a step of narrowing an area of the overlapping part by moving at least one of the first virtual object and the second virtual object based on a second operation on the first virtual hand by the user after the first operation, and in which the step of determining includes determining whether or not the first virtual object or the second virtual object and the second virtual hand have touched each other based on a third operation on the second virtual hand by the user after the second operation. With this, the user can touch a desired object among a plurality of virtual objects with the second virtual hand by performing the first operation on the first virtual hand, the second operation on the first virtual hand, and the third operation on the second virtual hand in the stated order.

(Item 28) A method of providing a virtual experience to a user wearing a head mounted display on a head. The method includes identifying a plurality of virtual objects including at least a first virtual object and a second virtual object. The method further includes identifying a position of a part of a body other than the head of the user. The method further includes identifying a reference line of sight of the user. The method further includes setting a first region associated with the first virtual object, for determining whether or not the first virtual object and the part of the body have touched each other. The method further includes setting a second region associated with the second virtual object, for determining whether or not the second virtual object and the part of the body have touched each other. The method further includes determining whether or not the first virtual object or the second virtual object and the part of the body have touched each other based on a positional relationship between the first region or the second region and the part of the body, in which the first virtual object includes an overlapping part overlapping with the second virtual object and positioned in front of the second virtual object as viewed from the user, and in which the step of setting a first region and a second region includes setting the first region overlapping with the overlapping part as viewed from the user and the second region not overlapping with the over lapping part as viewed from the user. The first region overlapping with the overlapping part is set to the overlapping part in the first virtual object, which is in front of the second virtual object, and the second region is set so as not to overlap with the overlapping part. Therefore, the user can touch a desired virtual object by an intuitive operation.

(Item 29) A system, for executing each step of the method of any one of Items 21 to 28.

(Item 30) A non-transitory computer-readable recording medium having recorded thereon instructions for execution by the system, of Item 29.

Specifics according to at least one embodiment of this disclosure encompass at least the following.

(Item 31) A method of providing a virtual space to a user wearing a head mounted display on a head. The method includes identifying a plurality of virtual, objects including at least a first virtual object and a second virtual object arranged in the virtual space and arranging an operation target object configured to operate in synchronization with movement of a part of a body other than the head of the user in the virtual space. The method further includes setting a first, region associated, with the first, virtual object, for determining whether or not the first virtual object and the operation target object have touched each other. The method further includes setting a second region associated with the second virtual object, for determining whether or not the second virtual object, and the operation target object have touched each other. The method further includes determining that the operation target object has touched the first virtual object when a first part of the operation target object or an auxiliary object accompanying the operation target object contained in the first, region is larger than a second part of the operation target object or the auxiliary object accompanying the operation target object contained in the second region. When the first part of the operation target object or the auxiliary object contained in the first, region is larger than the second part of the operation target object or the auxiliary object contained in the second region, the user is considered to intend to cause the operation target object to touch the first virtual object. Therefore, the user can touch a desired object, by an intuitive operation.

(Item 32) A method according to Item 31, the method further including associating the first virtual object with the operation target object by causing the operation target object to perform a first operation after a determination that the operation target object has touched the first, virtual object in the step of determining. The user performs an operation for causing the operation target object to perform the first operation to associate the first virtual object with the operation target object. Therefore, preventing the user from performing unintentional association is possible.

(Item 33) A method according to Item 32, the method further including canceling association between the first virtual object and the operation target object by causing the operation target object to perform a second operation after the step of associating the first virtual object with the operation target object is performed. The user performs an operation for causing the operation target object to perform the second operation to cancel the association, and thus preventing the user from canceling the association unintentionally is possible.

(Item 34) A method according to Item 32 or 33, in which the auxiliary object is arranged at a position a fixed distance away from the operation target object. The method further includes maintaining the position of the auxiliary object before and after the first operation is performed. With this, causing the operation target object to perform the first operation while maintaining a state of the operation target object being determined to have touched the object is possible.

(Item 35) A method according to Item 32 or 33, the method further includes moving a position of the auxiliary object based on movement of the operation target object during the first operation. With this, performing fine touch determination that depends on movement of the operation target object is possible.

(Item 36) A method according to any one of Items 31 to 33 and 35, in which the auxiliary object is arranged in the operation target object. With this, preventing determination that the operation target object has touched an object to be touched by the user when the operation target object and the object are away from each other is possible.

(Item 37) A method according to any one of Items 31 to 36, in which the first region and the second region are hexahedron regions, and the auxiliary object is a ball object.

With this, identifying which of the first part and the second part is larger with a simple calculation is possible.

(Item 38) A method, of providing a virtual experience to a user wearing a head mounted display on a head. The method includes identifying a plurality of virtual objects including at least a first virtual object and a second virtual object. The method further includes identifying a position of a part of a body other than the head of the user. The method further includes setting a first region to be associated with the first virtual object, for determining whether or not the first, virtual object and the part of the body have touched, each other. The method further includes setting a second region associated with the second virtual object, for determining whether or not the second virtual object and the part of the body have touched each, other. The method, further includes determining that the part of the body has touched, the first virtual object, when a first part of the part of the body or an auxiliary object accompanying the part of the body contained in the first region is larger than a second part of the part of the body or the auxiliary object contained in the second region. When the first part of the part of the body or the auxiliary object contained in the first region is larger than the second part of the part of the body or the auxiliary object contained in the second region, the user is considered to intend to cause the part of the body to touch the first virtual object. Therefore, the user can touch a desired virtual object intuitively.

(Item 39) A system for executing each step of the method of any one of Items 31 to 38.

(Item 40) A non-transitory computer-readable recording medium having recorded thereon instructions for execution by the system of Item 39.

What is claimed is:

1. A method comprising:
defining a virtual space including a virtual camera, a plurality of virtual objects and an operation object;
detecting movement of a part of a user's body other than the user's head;
moving the operation object in response to the detected movement;
setting a first region for determining a touch of a first virtual object of the plurality of virtual objects based on a position of the virtual camera in the virtual space;
determining whether the first virtual object touches the operation object based on a positional relationship between the first region and the operation object; and
moving the first region in a first direction in response to movement of the virtual camera in a second direction, wherein the second direction is not parallel to the first direction, and the movement of the first region includes a rotational movement.

2. The method of claim 1, further comprising:
determining whether the first virtual object overlaps with a second virtual object of the plurality of virtual objects in the virtual space;
setting a second region for the second virtual object in response to a determination that the first virtual object overlaps the second virtual object; and
determining whether the second virtual object touches an operation target object based on a positional relationship between the second region and the operation target object.

3. The method of claim 2, wherein the setting the second region comprises:
defining a first line along a first edge of the first virtual object; and setting the second region to be located on a single side of the first line.

4. The method of claim 2, wherein the setting the first region comprises:
defining a first line along a first edge of the first virtual object;
defining a second line along a second edge of the first virtual object, wherein the second edge is angled with respect to the first edge; and
setting the first region to be bounded by the first line and the second line.

5. The method of claim 2, further comprising obscuring a portion of the second virtual object in response to a determination that the first virtual object overlaps with the second virtual object.

6. The method of claim 1, further comprising extending the first region in response to a change of the position of the virtual camera.

\* \* \* \* \*